(12) United States Patent
Park et al.

(10) Patent No.: US 12,316,465 B2
(45) Date of Patent: *May 27, 2025

(54) PACKET DUPLICATION CONTROL

(71) Applicant: Comcast Cable Communications, LLC, Philadelphia, PA (US)

(72) Inventors: Kyungmin Park, Vienna, VA (US); Esmael Hejazi Dinan, McLean, VA (US); Hyoungsuk Jeon, Centreville, VA (US); Hua Zhou, Vienna, VA (US); Alireza Babaei, Fairfax, VA (US); Ali Cagatay Cirik, Chantilly, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,302

(22) Filed: Feb. 13, 2024

(65) Prior Publication Data

US 2024/0187147 A1    Jun. 6, 2024

Related U.S. Application Data

(63) Continuation of application No. 17/572,211, filed on Jan. 10, 2022, now Pat. No. 11,943,066, which is a (Continued)

(51) Int. Cl.
*H04L 1/1867* (2023.01)
*H04L 5/00* (2006.01)
(Continued)

(52) U.S. Cl.
CPC ............ *H04L 1/189* (2013.01); *H04L 5/0098* (2013.01); *H04W 24/08* (2013.01); *H04W 76/11* (2018.02);
(Continued)

(58) Field of Classification Search
CPC ...... H04L 1/189; H04L 5/0098; H04W 24/08; H04W 76/11; H04W 76/12; H04W 76/27; H04W 76/15; H04W 80/02; H04W 80/08
(Continued)

(56) References Cited

U.S. PATENT DOCUMENTS 8,798,093 B2    8/2014    Wu
9,432,847 B2    8/2016    Yi et al.
(Continued)

FOREIGN PATENT DOCUMENTS

CN    102448060 A    5/2012
WO    2018143703 A1    8/2018
(Continued)

OTHER PUBLICATIONS

R3-180599 3GPP TSG-RAN WG3 NR Ad Hoc, Sophia Antipolis, France, Jan. 22-26, 2018, Source: Huawei, Title: pCR to 38.473 on UE context management for mobility handling for SA operation.
(Continued)

*Primary Examiner* — Candal Elpenord
(74) *Attorney, Agent, or Firm* — Banner & Witcoff, Ltd.

(57) ABSTRACT

Wireless communications are described. A central unit control plane (CU-CP) node of a base station may activate and/or deactivate packet duplication based on status information from self-monitoring, from a distributed unit (DU), from a wireless device, and/or from a central unit user plane (CU-UP) node. The CU-UP node and/or the DU may activate and/or deactivate packet duplication based on status information from self-monitoring, from each other, from the wireless device, and/or from the CU-CP node. The CU-UP node and/or the DU, after activating and/or deactivating packet duplication, may report the activation and/or deactivation to the CU-CP node.

36 Claims, 31 Drawing Sheets

Related U.S. Application Data continuation of application No. 16/409,260, filed on May 10, 2019, now Pat. No. 11,258,549.

(60) Provisional application No. 62/669,927, filed on May 10, 2018.

(51) Int. Cl.
| | | |
|---|---|---|
| *H04W 24/08* | (2009.01) | |
| *H04W 76/11* | (2018.01) | |
| *H04W 76/12* | (2018.01) | |
| *H04W 76/27* | (2018.01) | |
| *H04W 80/02* | (2009.01) | |
| *H04W 80/08* | (2009.01) | |

(52) U.S. Cl.
CPC .......... *H04W 76/12* (2018.02); *H04W 76/27* (2018.02); *H04W 80/02* (2013.01); *H04W 80/08* (2013.01)

(58) Field of Classification Search
USPC ................................................. 370/329–330
See application file for complete search history.

(56) References Cited

U.S. PATENT DOCUMENTS

| | | | |
|---|---|---|---|
| 9,596,674 | B2 | 3/2017 | Somasundaram et al. |
| 2008/0310367 | A1 | 12/2008 | Meylan |
| 2009/0175163 | A1 | 7/2009 | Sammour et al. |
| 2009/0190480 | A1 | 7/2009 | Sammour et al. |
| 2010/0034169 | A1 | 2/2010 | Maheshwari et al. |
| 2012/0069732 | A1 | 3/2012 | Xu et al. |
| 2013/0250828 | A1 | 9/2013 | Chou et al. |
| 2014/0079022 | A1 | 3/2014 | Wang et al. |
| 2014/0192775 | A1 | 7/2014 | Li et al. |
| 2015/0016312 | A1 | 1/2015 | Li et al. |
| 2017/0041767 | A1 | 2/2017 | Vajapeyam et al. |
| 2017/0150408 | A1 | 5/2017 | Joseph et al. |
| 2017/0202053 | A1 | 7/2017 | Rune |
| 2018/0006770 | A1 | 1/2018 | Guo et al. |
| 2018/0124642 | A1 | 5/2018 | Phuyal et al. |
| 2018/0124825 | A1 | 5/2018 | Lee et al. |
| 2018/0279168 | A1 | 9/2018 | Jheng et al. |
| 2018/0279169 | A1 | 9/2018 | Wang et al. |
| 2018/0279193 | A1 | 9/2018 | Park et al. |
| 2018/0279204 | A1 | 9/2018 | Kim et al. |
| 2018/0279218 | A1 | 9/2018 | Park et al. |
| 2018/0279262 | A1 | 9/2018 | Babaei et al. |
| 2018/0279401 | A1 | 9/2018 | Hong et al. |
| 2018/0287677 | A1 | 10/2018 | Nagaraja et al. |
| 2018/0352601 | A1 | 12/2018 | Park et al. |
| 2018/0367288 | A1 | 12/2018 | Vrzic et al. |
| 2018/0368107 | A1 | 12/2018 | Babaei et al. |
| 2018/0376457 | A1 | 12/2018 | Tseng et al. |
| 2019/0037635 | A1 | 1/2019 | Guo et al. |
| 2019/0053325 | A1 | 2/2019 | Yu et al. |
| 2019/0132790 | A1 | 5/2019 | Lee et al. |
| 2019/0182211 | A1* | 6/2019 | Yang ..................... H04L 69/326 |
| 2019/0215726 | A1 | 7/2019 | Park et al. |
| 2019/0253926 | A1 | 8/2019 | Kim et al. |
| 2019/0268799 | A1 | 8/2019 | Hong et al. |
| 2020/0029252 | A1 | 1/2020 | Marquezan et al. |
| 2020/0084682 | A1 | 3/2020 | Wang et al. |
| 2020/0119864 | A1 | 4/2020 | Xu et al. |
| 2020/0127766 | A1 | 4/2020 | Jonsson et al. |
| 2020/0154498 | A1* | 5/2020 | Wang .................... H04W 76/27 |
| 2020/0162211 | A1 | 5/2020 | Wang et al. |
| 2020/0382240 | A1 | 12/2020 | Centonza et al. |
| 2021/0084515 | A1 | 3/2021 | Yokoyama et al. |
| 2021/0092667 | A1 | 3/2021 | Zhu et al. |

FOREIGN PATENT DOCUMENTS

| | | |
|---|---|---|
| WO | 2018147677 A1 | 8/2018 |
| WO | 2018175199 A1 | 9/2018 |
| WO | 2018183085 A1 | 10/2018 |
| WO | 2018202933 A1 | 11/2018 |
| WO | 2018203736 A1 | 11/2018 |
| WO | 2018231425 A1 | 12/2018 |
| WO | 2018237001 A1 | 12/2018 |
| WO | 2019139530 A1 | 7/2019 |

OTHER PUBLICATIONS

R3-180606 3GPP TSG-RAN WG3 NR Ad Hoc, Sophia Antipolis, France, Jan. 22-26, 2018, Source: NTT Docomo, Inc., Title: Summary of offline discussion on CU-DU QoS handling.

R3-180807 3GPP TSG-RAN WG3 Meeting #99, Athens, Greece, Feb. 26-Mar. 2, 2018, Source: CATT, Title: Discussion on activation of PDCP Duplication.

R3-181732 3GPP TSG RAN WG3 Meeting #99bis, Sanya, China, Apr. 16-20, 2018, Source: ZTE, Title: Bearer Context Modification over E1 interface for TS38.460.

R3-181733 3GPP TSG RAN WG3 Meeting #99bis, Sanya, China, Apr. 16-20, 2018, Source: ZTE, Title: Bearer Context Modification over E1 interface for TS38.463.

R3-181735 3GPP TSG RAN WG3 Meeting #99bis, Sanya, China, Apr. 16-20, 2018, Source: ZTE, Title: Discussion on PDCP Count wrap around.

R3-181736 3GPP TSG RAN WG3 Meeting #99bis, Sanya, China, Apr. 16-20, 2018, Source: ZTE, Title: Discussion on E1 interface setup.

R3-181833 3GPP TSG RAN WG3 Meeting #99bis, Sanya, China, Apr. 16-20, 2018, Source: NEC (Rapporteur), Title: Baseline CR for June version of TS 38.401 covering agreements of RAN3#99 on CPUP_Split.

R3-181842 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) Support of change of gNB-CU-UP.

R3-181843 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) FFS resolution for E1 overall procedures.

R3-181844 3GPP TSG RAN WG3 Meeting #99bis, Sanya, China, Apr. 16-20, 2018, Source: Nokia, Nokia Shanghai Bell, Title: Definition of gNB-CU-CP/UP.

R3-181845 3GPP TSG RAN WG3 Meeting #99bis, Sanya, China, Apr. 16-20, 2018, Source: Nokia, Nokia Shanghai Bell, Title: E1 non-UE associated functions.

R3-181846 3GPP TSG RAN WG3 Meeting #99bis, Sanya, China, Apr. 16-20, 2018, Source: Nokia, Nokia Shanghai Bell, Title: E1 non-UE associated procedures.

R3-181847 3GPP TSG RAN WG3 Meeting #99bis, Sanya, China, Apr. 16-20, 2018, Source: Nokia, Nokia Shanghai Bell, Title: gNB-CU-UP notification function.

R3-181848 3GPP TSG RAN WG3 Meeting #99bis, Sanya, China, Apr. 16-20, 2018, Source: Nokia, Nokia Shanghai Bell, Title: gNB-CU-UP notification procedure.

R3-181849 3GPP TSG RAN WG3 Meeting #99bis, Sanya, China, Apr. 16-20, 2018, Source: Nokia, Nokia Shanghai Bell, Title: Bearer Context Management procedures.

R3-181850 3GPP TSG RAN WG3 Meeting #99bis, Sanya, China, Apr. 16-20, 2018, Source: Nokia, Nokia Shanghai Bell, Title: Signalling transport for E1.

R3-181893 3GPP TSG RAN WG3 Meeting #99bis, Sanya, China, Apr. 16-20, 2018, Source: LG Electronics, KT Corp., Title: Procedures for Security Support in CU-CP/UP Separation.

R3-182056 3GPP TSG RAN WG3 Meeting #99bis, Sanya, China, Apr. 16-20, 2018, Source: LG Electronics, KT Corp., Title: Discussion on Bearer Context Modification.

R3-182078 3GPP TSG RAN WG3 Meeting #99bis, Sanya, China, Apr. 16-20, 2018, Source: Samsung, Title: E1 interface management procedures.

R3-182079 3GPP TSG RAN WG3 Meeting #99bis, Sanya, China, Apr. 16-20, 2018, Source: Samsung, Title: CU-UP Security Capability indication to CU-CP.

(56) References Cited

OTHER PUBLICATIONS

R3-182080 3GPP TSG RAN WG3 Meeting #99bis, Sanya, China, Apr. 16-20, 2018, Source: Samsung, Title: TP for TS 38.463 on E1 interface management.
R3-182081 3GPP TSG RAN WG3 Meeting #99bis, Sanya, China, Apr. 16-20, 2018, Source: Samsung, Title: Additional UE-associated E1 procedures.
R3-182082 3GPP TSG RAN WG3 Meeting #99bis, Sanya, China, Apr. 16-20, 2018, Source: Samsung, Title: TP for TS 38.463 on additional UE-associated E1 procedures.
R3-182109 3GPP TSG RAN WG3 Meeting #99bis, Sanya, China, Apr. 16-20, 2018, Source: Huawei, Title: Initial TPs to 38.462.
R3-182110 3GPP TSG RAN WG3 Meeting #99bis, Sanya, China, Apr. 16-20, 2018, Source: Huawei, Title: Rapporteur editorial updates to 38.462.
R3-182129 3GPP TSG RAN WG3 Meeting #99bis, Sanya, China, Apr. 16-20, 2018, Source: Huawei, Title: Inactivity monitoring in CP/UP separation.
R3-182130 3GPP TSG RAN WG3 Meeting #99bis, Sanya, China, Apr. 16-20, 2018, Source: Huawei, Title: (TP for NR BL CR for TS 38.401) On RRC state transition for CP-UP separation.
R3-182131 3GPP TSG RAN WG3 Meeting #99bis, Sanya, China, Apr. 16-20, 2018, Source: Huawei, Title: Data Forwarding in CP/UP separation.
R3-182132 3GPP TSG RAN WG3 Meeting #99bis, Sanya, China, Apr. 16-20, 2018, Source: Huawei, Title: pCR to 38.460 on QoS handling over E1.
R3-182134 3GPP TSG RAN WG3 Meeting #99bis, Sanya, China, Apr. 16-20, 2018, Source: Huawei, Title: pCR to 38.460 on secondary node modification triggered by gNB-CU-CP.
R3-182136 3GPP TSG RAN WG3 Meeting #99bis, Sanya, China, Apr. 16-20, 2018, Source: Huawei, Title: pCR to 38.460 on centralized retransmission for CP-UP separation.
R3-182224 3GPP TSG RAN WG3 Meeting #99bis, Sanya, China, Apr. 16-20, 2018, Source: Ericsson, Title: E1 support for RRC-inactive.
R3-182225 3GPP TSG RAN WG3 Meeting #99bis, Sanya, China, Apr. 16-20, 2018, Source: Ericsson, Title: Dual-connectivity configuration over E1.
R3-182226 3GPP TSG RAN WG3 Meeting #99bis, Sanya, China, Apr. 16-20, 2018, Source: Ericsson, Title: Potentials of RAN UP network function virtualization.
R3-182227 3GPP TSG RAN WG3 Meeting #99bis, Sanya, China, Feb. 26-Mar. 2, 2018, Source: Ericsson, Title: PDCP duplication configuration.
R3-182228 3GPP TSG RAN WG3 Meeting #99bis, Sanya, China, Apr. 16-20, 2018, Source: Ericsson, Vodafone, KT, At&T, Title: Support of RAN UP network function virtualization at handover.
R3-182229 3GPP TSG RAN WG3 Meeting #99bis, Sanya, China, Apr. 16-20, 2018, Source: Ericsson, Title: Support of RAN UP network function virtualization at handover—for 38.300.
R3-182230 3GPP TSG RAN WG3 Meeting #99bis, Sanya, China, Apr. 16-20, 2018, Source: Ericsson, Title: Support of RAN UP network function virtualization at handover—for 38.413.
R3-182231 3GPP TSG RAN WG3 Meeting #99bis, Sanya, China, Apr. 16-20, 2018, Source: Ericsson, Title: Support of RAN UP network function virtualization at handover—for 38.423.
R3-182232 3GPP TSG RAN WG3 Meeting #99bis, Sanya, China, Apr. 16-20, 2018, Source: Ericsson, Title: Support of RAN UP network function virtualization at handover—for 36.300.
R3-182233 3GPP TSG RAN WG3 Meeting #99bis, Sanya, China, Apr. 16-20, 2018, Source: Ericsson, Title: Bearer Context definition.
R3-182234 3GPP TSG RAN WG3 Meeting #99bis, Sanya, China, Apr. 16-20, 2018, Source: Ericsson, Title: Resolve FFS in procedures in TS 38.401.
R3-182235 3GPP TSG RAN WG3 Meeting #99bis, Sanya, China, Apr. 16-20, 2018, Source: Ericsson, Title: Multiple TNL associations over E1.
R3-182237 3GPP TSG RAN WG3 Meeting #99bis, Sanya, China, Apr. 16-20, 2018, Source: Ericsson, Title: E1 Setup procedure.
R3-182238 3GPP TSG RAN WG3 Meeting #99bis, Sanya, China, Apr. 16-20, 2018, Source: Ericsson, Title: E1 Reset procedure.
R3-182239 3GPP TSG RAN WG3 Meeting #99bis, Sanya, China, Apr. 16-20, 2018, Source: Ericsson, Title: E1 Release procedure.
R3-182240 3GPP TSG RAN WG3 Meeting #99bis, Sanya, China, Apr. 16-20, 2018, Source: Ericsson, Title: E1 Error Indication.
R3-182241 3GPP TSG RAN WG3 Meeting #99bis, Sanya, China, Apr. 16-20, 2018, Source: Ericsson, Title: Bearer Context Modification procedure.
R3-182242 3GPP TSG RAN WG3 Meeting #99bis, Sanya, China, Apr. 16-20, 2018, Source: Ericsson, Title: E1 Configuration Update.
R2-1800898 3GPP TSG-RAN WG2 AH, Vancouver, Canada, Jan. 22-26, 2018, Source: vivo, Title: Text proposal for repetition of the configured grant.
R2-1800902 3GPP TSG-RAN WG2 AH, Vancouver, Canada, Jan. 22-26, 2018, Source: vivo, Title: Collision between dynamic grant and configured grant.
R2-1800925 3GPP TSG-RAN WG2 AH, Vancouver, Canada, Jan. 22-26, 2018, Source: Intel Corporation, Title: URLLC exception for dynamic grant.
R2-1801032 3GPP TSG-RAN WG2 AH, Vancouver, Canada, Jan. 22-26, 2018, Source: Huawei, HiSilicon, Title: Leftovers of HARQ Transmission with Configured Grant Timer.
R2-1801033 3GPP TSG-RAN WG2 AH, Vancouver, Canada, Jan. 22-26, 2018, Source: Huawei, HiSilicon, Title: Corrections on HARQ Transmission with ConfiguredGrantTimer in TS 38.321.
R2-1801034 3GPP TSG-RAN WG2 AH, Vancouver, Canada, Jan. 22-26, 2018, Source: Huawei, HiSilicon, Title: Corrections on Retransmission for Configured Grant.
R2-1801035 3GPP TSG-RAN WG2 AH, Vancouver, Canada, Jan. 22-26, 2018, Source: Huawei, HiSilicon, Title: Corrections on calculations of transmission occasions of configured grant.
R2-1801036 3GPP TSG-RAN WG2 AH, Vancouver, Canada, Jan. 22-26, 2018, Source: Huawei, HiSilicon, Title: Further discussion on configuration of ConfiguredGrantTimer.
R2-1801037 3GPP TSG-RAN WG2 AH, Vancouver, Canada, Jan. 22-26, 2018, Source: Huawei, HiSilicon, Title: Corrections on flexible occasion of initial transmission and repetition for configured grant.
R2-1801038 3GPP TSG-RAN WG2 AH, Vancouver, Canada, Jan. 22-26, 2018, Source: Huawei, HiSilicon, Title: Impact of SUL on configured grant.
R2-1801039 3GPP TSG-RAN WG2 AH, Vancouver, Canada, Jan. 22-26, 2018, Source: Huawei, HiSilicon, Title: Configured grant Type1 operation with BWP switch.
R2-1801052 3GPP TSG-RAN WG2 AH, Vancouver, Canada, Jan. 22-26, 2018, Source: LG Electronics Inc., Title: Correction on ConfiguredGrantTimer.
R2-1801063 3GPP TSG-RAN WG2 AH, Vancouver, Canada, Jan. 22-26, 2018, Source: LG Electronics Inc., Title: Repetition transmission on configured uplink grant.
R2-1801081 3GPP TSG-RAN WG2 AH, Vancouver, Canada, Jan. 22-26, 2018, Source: ZTE, Title: Consideration on the configured grant for supporting SUL.
R2-1801125 3GPP TSG-RAN WG2 AH, Vancouver, Canada, Jan. 22-26, 2018, Source: InterDigital Inc., Title: Correction on override of configured assignment by dynamic assignment.
R2-1801126 3GPP TSG-RAN WG2 AH, Vancouver, Canada, Jan. 22-26, 2018, Source: InterDigital Inc., Title: Override of configured grant by dynamic grant in case of URLLC.
R2-1801239 3GPP TSG-RAN WG2 AH, Vancouver, Canada, Jan. 22-26, 2018, Source: LG Electronics Inc., Title: Prioritization between dynamic grant and configured grant for URLLC.
R2-1801277 3GPP TSG-RAN WG2 AH, Vancouver, Canada, Jan. 22-26, 2018, Source: LG Electronics Inc., Title: Restart condition of sCellDeactivationTimer with skipping operation.
R2-1801371 3GPP TSG-RAN WG2 AH, Vancouver, Canada, Jan. 22-26, 2018, Source: Samsung, Title: Remaining Issue on SPS/Grant-free: How to Handle Dynamic Grant Coinciding with Configured Grant.
R2-1801475 3GPP TSG-RAN WG2 AH, Vancouver, Canada, Jan. 22-26, 2018, Source: LG Electronics Inc., Title: Prevention of using CS grant.

(56) References Cited

OTHER PUBLICATIONS

R3-174356 3GPP TSG-RAN WG3 Meeting #98, Reno, USA, Nov. 27-Dec. 1, 2017, Source: Nokia, Nokia Shanghai Bell, Title: Transport layer protocol for F1-C.
R3-174357 3GPP TSG-RAN WG3 Meeting #98, Reno, USA, Nov. 27-Dec. 1, 2017, Source: Nokia, Nokia Shanghai Bell, Title: Transport layer protocol for F1-U.
R3-174359 3GPP TSG-RAN WG3 Meeting #98, Reno, USA, Nov. 27-Dec. 1, 2017, Source: Nokia, Nokia Shanghai Bell, Title: UE Initial Access procedure.
R3-174360 3GPP TSG-RAN WG3 Meeting #98, Reno, USA, Nov. 27-Dec. 1, 2017, Source: Nokia, Nokia Shanghai Bell, KT, Title: FFS resolution in intra-gNB-CU mobility.
R3-174361 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.470).
R3-174362 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.473).
R3-174364 3GPP TSG-RAN WG3 Meeting #98, Reno, USA, Nov. 27-Dec. 1, 2017, Source: Nokia, Nokia Shanghai Bell, Title: FFS resolution in Centralized Retransmission.
R3-174396 3GPP TSG-RAN WG3 Meeting #98, Reno, USA, Nov. 27-Dec. 1, 2017, Source: ZTE, China Telecom, Title: Solution for UE Initial Access.
R3-174397 3GPP TSG-RAN WG3 Meeting #98, Reno, USA, Nov. 27-Dec. 1, 2017, Source: ZTE, Title: Update on UE Context Management for TS38.470.
R3-174398 3GPP TSG-RAN WG3 Meeting #98, Reno, USA, Nov. 27-Dec. 1, 2017, Source: ZTE, Title: Update on UE Context Management for TS38.473.
R3-174405 3GPP TSG-RAN WG3 Meeting #98, Reno, USA, Nov. 27-Dec. 1, 2017, Source: ZTE, China Unicom, Title: Remaining Issues of Mobility Aspects.
R3-174408 3GPP TSG-RAN WG3 Meeting #98, Reno, USA, Nov. 27-Dec. 1, 2017, Source: ZTE, Title: Consideration on the activation or deactivation of duplication.
R3-174409 3GPP TSG-RAN WG3 Meeting #98, Reno, USA, Nov. 27-Dec. 1, 2017, Source: ZTE, China Telecom, Title: Remaining Issues of Centralized Retransmissions.
R3-174410 3GPP TSG-RAN WG3 Meeting #98, Reno, USA, Nov. 27-Dec. 1, 2017, Source: ZTE, Title: TP for Centralized Retransmissions kept in TS38.475.
R3-174411 3GPP TSG-RAN WG3 Meeting #98, Reno, USA, Nov. 27-Dec. 1, 2017, Source: ZTE, Title: TP for Centralized Retransmissions kept in TS38.425.
R3-174473 3GPP TSG-RAN WG3 Meeting #98, Reno, USA, Nov. 27-Dec. 1, 2017, Source: Huawei, Title: pCR on open issues for PDCP duplication over F1 to 38.473.
R3-174482 3GPP TSG-RAN WG3 Meeting #98, Reno, USA, Nov. 27-Dec. 1, 2017, Source: Huawei, Title: Further discussions on radio link outage indication.
R3-174533 3GPP TSG-RAN WG3 Meeting #98, Reno, USA, Nov. 27-Dec. 1, 2017, Source: CATT, Title: Discussion on CA based PDCP Duplication.
R3-174535 3GPP TSG-RAN WG3 Meeting #98, Reno, USA, Nov. 27-Dec. 1, 2017, Source: CATT, Title: Discussion on F1 Setup procedure.
R3-174536 3GPP TSG-RAN WG3 Meeting #98, Reno, USA, Nov. 27-Dec. 1, 2017, Source: CATT, Title: Discussion on Initial UE Access.
R3-174537 3GPP TSG-RAN WG3 Meeting #98, Reno, USA, Nov. 27-Dec. 1, 2017, Source: CATT, Title: Introduction of UE Reconfiguration Complete procedure.
R3-174538 3GPP TSG-RAN WG3 Meeting #98, Reno, USA, Nov. 27-Dec. 1, 2017, Source: CATT, Title: TP for 38.473 on UE Reconfiguration Completion procedure.
R3-174542 3GPP TSG-RAN WG3 Meeting #98, Reno, USA, Nov. 27-Dec. 1, 2017, Source: CATT, Title: Discussion on inter-DU mobility without MN involved.
R3-174543 3GPP TSG-RAN WG3 Meeting #98, Reno, USA, Nov. 27-Dec. 1, 2017, Source: CATT, Title: Stage 3 TP on inter-DU mobility without MN involved.
R3-174545 3GPP TSG-RAN WG3 Meeting #98, Reno, USA, Nov. 27-Dec. 1, 2017, Source: CATT, Title: Discussion on the Intra-cell HO and SCG change procedure.
R3-174546 3GPP TSG-RAN WG3 Meeting #98, Reno, USA, Nov. 27-Dec. 1, 2017, Source: CATT, Title: TP for 38.473 on Intra-cell HO and SCG change procedure.
R3-174606 3GPP TSG-RAN WG3 Meeting #98, Reno, USA, Nov. 27-Dec. 1, 2017, Source: Samsung, KT, Title: Initial access procedure considering CU-DU split.
R3-174607 3GPP TSG-RAN WG3 Meeting #98, Reno, USA, Nov. 27-Dec. 1, 2017, Source: Samsung, KT, Title: Stage 3 TP for TS38.473 to reflect initial access procedure.
R3-174608 3GPP TSG-RAN WG3 Meeting #98, Reno, USA, Nov. 27-Dec. 1, 2017, Source: Samsung, KT, Title: RRC connection resume procedure considering CU-DU split.
R3-174609 3GPP TSG-RAN WG3 Meeting #98, Reno, USA, Nov. 27-Dec. 1, 2017, Source: Samsung, KT, Title: RRC connection reestablishment procedure considering CU-DU split.
3GPP TS 38.331 V15.0.0 (Dec. 2017), Technical Specification, 3rd Generation Partnership Project; Technical Specification Group Radio Access Network; NR; Radio Resource Control (RRC) Protocol Specification (Release 15).
3GPP TS 38.331 V15.3.0 (Sep. 2018), Technical Specification, 3rd Generation Partnership Project; Technical Specification Group Radio Access Network; NR; Radio Resource Control (RRC) Protocol Specification (Release 15).
3GPP TS 38.463 V0.2.0 (Apr. 2018), Technical Specification, 3rd Generation Partnership Project; Technical Specification Group Radio Access Network; NG-RAN; E1 application protocol (E1AP) (Release 15).
3GPP TS 38.473 V15.0.0 (Dec. 2017), Technical Specification, 3rd Generation Partnership Project; Technical Specification Group Radio Access Network; NG-RAN; F1 application protocol (F1AP) (Release 15).
3GPP TS 38.473 V15.3.0 (Sep. 2018), Technical Specification, 3rd Generation Partnership Project; Technical Specification Group Radio Access Network; NG-RAN; F1 application protocol (F1AP) (Release 15).
R2-1801279 3GPP TSG-RAN WG2 AH, Vancouver, Canada, Jan. 22-26, 2018, Source: LG Electronics Inc., Title: Restart condition of sCellDeactivationTimer with skipping operation.
R2-1712238 3GPP TSG-RAN WG2 Meeting #100, Reno, USA, Nov. 27-Dec. 1, 2017, Source: OPPO, Title: Discussion on Detailed Issues on RLM.
R2-1712276 3GPP TSG-RAN WG2 Meeting #100, Reno, USA, Nov. 27-Dec. 1, 2017, Source: Spreadtrum Communications, Title: Discussions on the IS and OOS Counting Procedure.
R2-1712308 3GPP TSG-RAN WG2 Meeting #100, Reno, USA, Nov. 27-Dec. 1, 2017, Source: TCL, Title: Interaction between PDCP and RLC Entities for duplication in NR-NR DC.
R2-1712435 3GPP TSG-RAN WG2 Meeting #100, Reno, USA, Nov. 27-Dec. 1, 2017, Source: ZTE Corporation, Title: Consideration on PDCP Duplication in NR.
R2-1712559 3GPP TSG-RAN WG2 Meeting #100, Reno, USA, Nov. 27-Dec. 1, 2017, Source: Huawei, HiSilicon, Title: RLF for NR.
R2-1712736 3GPP TSG-RAN WG2 Meeting #100, Reno, USA, Nov. 27-Dec. 1, 2017, Source: Huawei, ASUSTek, HiSilicon, Title: PDCP operation for packet duplication.
R2-1712737 3GPP TSG-RAN WG2 Meeting #100, Reno, USA, Nov. 27-Dec. 1, 2017, Source: Huawei, HiSilicon, Title: PDCP data volume calculation for packet duplication.
R2-1712738 3GPP TSG-RAN WG2 Meeting #100, Reno, USA, Nov. 27-Dec. 1, 2017, Source: Huawei, HiSilicon, Title: Clarification on bearer type for packet duplication.

(56) References Cited

OTHER PUBLICATIONS

R2-1712739 3GPP TSG-RAN WG2 Meeting #100, Reno, USA, Nov. 27-Dec. 1, 2017, Source: Huawei, HiSilicon, Title: Enhancements for DL packet duplication.
R2-1712753 3GPP TSG-RAN WG2 Meeting #100, Reno, USA, Nov. 27-Dec. 1, 2017, Source: vivo, Title: RLM/RLF in NR.
R2-1712914 3GPP TSG-RAN WG2 Meeting #100, Reno, USA, Nov. 27-Dec. 1, 2017, Source: Lenovo, Motorola Mobility, Title: PDCP packet duplication.
R2-1712926 3GPP TSG-RAN WG2 Meeting #100, Reno, USA, Nov. 27-Dec. 1, 2017, Source: Ericsson, Title: PDCP duplication and discard.
R2-1712928 3GPP TSG-RAN WG2 Meeting #100, Reno, USA, Nov. 27-Dec. 1, 2017, Source: Ericsson, Title: PDCP duplication for AM operation.
R2-1712929 3GPP TSG-RAN WG2 Meeting #100, Reno, USA, Nov. 27-Dec. 1, 2017, Source: Ericsson, Title: PDCP duplication transmit procedure.
R2-1712932 3GPP TSG-RAN WG2 Meeting #100, Reno, USA, Nov. 27-Dec. 1, 2017, Source: Ericsson, Title: PDCP data volume reporting in duplication.
R2-1712964 3GPP TSG-RAN WG2 Meeting #100, Reno, USA, Nov. 27-Dec. 1, 2017, Source: Samsung, Title: Discussion on PDCP data volume calculation during PDCP Duplication.
R2-1712965 3GPP TSG-RAN WG2 Meeting #100, Reno, USA, Nov. 27-Dec. 1, 2017, Source: Institute for Information Industry (III), Title: Discussion on Uplink Packet Duplication.
R2-1713004 3GPP TSG-RAN WG2 Meeting #100, Reno, USA, Nov. 27-Dec. 1, 2017, Source: vivo, Title: Layer-2 behaviors of PDCP duplication deactivation.
R2-1713005 3GPP TSG-RAN WG2 Meeting #100, Reno, USA, Nov. 27-Dec. 1, 2017, Source: vivo, Title: PDCP duplication impacts on LCP.
R2-1713006 3GPP TSG-RAN WG2 Meeting #100, Reno, USA, Nov. 27-Dec. 1, 2017, Source: vivo, Title: Discussion on the PDCP data volume.
R2-1713009 3GPP TSG-RAN WG2 Meeting #100, Reno, USA, Nov. 27-Dec. 1, 2017, Source: vivo, Title: UE layer-2 behaviors at Scell-failure.
R2-1713584 3GPP TSG-RAN WG2 Meeting #100, Reno, USA, Nov. 27-Dec. 1, 2017, Source: Qualcomm Incorporated, Title: PDCP duplication.
R2-1713588 3GPP TSG-RAN WG2 Meeting #100, Reno, USA, Nov. 27-Dec. 1, 2017, Source: Ericsson, Title: Remaining open issues of RLM and RLF in NR.
R2-1713641 3GPP TSG-RAN WG2 Meeting #100, Reno, USA, Nov. 27-Dec. 1, 2017, Source: ITL, Title: Configuration of PDCP duplication on default DRB.
R2-1713829 3GPP TSG-RAN WG2 Meeting #100, Reno, USA, Nov. 27-Dec. 1, 2017, Source: Samsung, Title: Activation and Deactivation of PDCP Duplication.
R2-1713830 3GPP TSG-RAN WG2 Meeting #100, Reno, USA, Nov. 27-Dec. 1, 2017, Source: Samsung, Title: Discussion on CA Duplication.
R2-1713831 3GPP TSG-RAN WG2 Meeting #100, Reno, USA, Nov. 27-Dec. 1, 2017, Source: Samsung, Title: Initial State of Uplink Packet Duplication.
R2-1713848 3GPP TSG-RAN WG2 Meeting #100, Reno, USA, Nov. 27-Dec. 1, 2017, Source: Samsung, Title: The Necessity of Fast RLF Recovery based on T312 in NR.
R2-1800155 3GPP TSG-RAN WG2 AH, Vancouver, Canada, Jan. 22-26, 2018, Source: OPPO, Title: Discussion on behaviour of ConfiguredGrantTimer.
R2-1800165 3GPP TSG-RAN WG2 AH, Vancouver, Canada, Jan. 22-26, 2018, Source: CATT, Title: UE behavior on configured grant timer upon DCI reception.
R2-1800334 3GPP TSG-RAN WG2 AH, Vancouver, Canada, Jan. 22-26, 2018, Source: Ericsson, Title: SPS and BWP inactivity timer interaction.
R2-1800373 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R2-1800374 3GPP TSG-RAN WG2 AH, Vancouver, Canada, Jan. 22-26, 2018, Source: Samsung Electronics R&D Institute UK, Title: Corrections to preventing simultaneous Type 1 configured grants on SUL and UL.
R2-1800566 3GPP TSG-RAN WG2 AH, Vancouver, Canada, Jan. 22-26, 2018, Source: LG Electronics Inc., Title: BWP timer restart for DL SPS.
R2-1800586 3GPP TSG-RAN WG2 AH, Vancouver, Canada, Jan. 22-26, 2018, Source: Nokia, Nokia Shanghai Bell, Title: Prioritization between dynamic grant and configured grant.
R2-1800587 3GPP TSG-RAN WG2 AH, Vancouver, Canada, Jan. 22-26, 2018, Source: Nokia, Nokia Shanghai Bell, Title: Correction on prioritization between dynamic grant and configured grant.
R2-1800622 3GPP TSG-RAN WG2 AH, Vancouver, Canada, Jan. 22-26, 2018, Source: Samsung, Title: Correction for SPS and Type-2 Configured Grant Calculation.
R2-1800624 3GPP TSG-RAN WG2 AH, Vancouver, Canada, Jan. 22-26, 2018, Source: Samsung, Title: Impact of Flexible Transmission on Configured Grant Operation.
R2-1800659 3GPP TSG-RAN WG2 AH, Vancouver, Canada, Jan. 22-26, 2018, Source: Samsung, Title: Draft CR for correction on SPS and Type-2 configured grant.
R2-1800661 3GPP TSG-RAN WG2 AH, Vancouver, Canada, Jan. 22-26, 2018, Source: Samsung, Title: Draft CR for flexible configured grant transmission.
R2-1800708 3GPP TSG-RAN WG2 AH, Vancouver, Canada, Jan. 22-26, 2018, Source: Ericsson, Title: Confirmation of Configured UL Grant Type 2 Activation for Multiple Aggregated Cells.
R2-1800709 3GPP TSG-RAN WG2 AH, Vancouver, Canada, Jan. 22-26, 2018, Source: Ericsson, Title: Alignment of terminology for Configured Scheduling and SPS.
R2-1800818 3GPP TSG-RAN WG2 AH, Vancouver, Canada, Jan. 22-26, 2018, Source: Samsung Electronics R&D Institute UK, Title: Corrections to prevent simultaneous Type 1 configured grants on SUL and UL.
R2-1800819 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R2-162709 3GPP TSG-RAN WG2 Meeting #93bis, Dubrovnik, Croatia, Apr. 11-15, 2016, Source: Beam support in NR.
May 27, 2019—Extended European Search Report—19155025.0.
NTT Docomo, Inc.: "F1 interface: Radio resource configuration management", May 15-19, 2017.
CMCC: "System information generation and delivery in CU-DU split architecture", Aug. 21-25, 2017.
ZTE: "Discussion on the solution for UE Initial Access", Oct. 9-13, 2017.
Feb. 27, 2019—EP Search Report—19151430.6.
May 14, 2017—TP for UE Radio Bearer Management.
Nokia—May 1, 2010—"Enabling MRO in case of re-establishment request in unprepared eNB".
Apr. 8, 2019—Extended European Search Report—EP 19151473.6.
ZTE—Consideration on the activation or deactivation of duplication—Nov. 17, 2017.
CATT—Discussion on CA based PDCP Duplication—Sep. 30, 2017.
3GPP Standard—"3rd Generation Partnership Project: Technical Specification Group Radio Access Network; NG-RAN; F1 application protocol (F1AP) (Release 15)"—Dec. 11, 2017.
3GPP Standard—"3rd Generation Partnership Project; Technical Specification Group Radio Access Network NR Radio Resource Control (RRC) protocol specification (Release 15)"—Jan. 4, 2018.
Aug. 6, 2019—European Extended Search Report—EP 19157448.2.
3GPP TSG-RAN WG2 #100: "Discussion on Inter-nodeRRC container", Dec. 1, 2017.
3GPP TSG-RAN Meeting #76: "Miscellaneous general corrections and clarifications resulting from ASN. 1 review", Jun. 5, 2017.

(56) References Cited

OTHER PUBLICATIONS

R1-1704159 3GPP TSG-RAN WG2 Meeting #98, Hangzhou, China, May 15-19, 2017, Source: Samsung, Title: Random Access Response in NR.
R1-1704672 3GPP TSG-RAN WG2 Meeting #98, Hangzhou, China, May 15-19, 2017, Source: ZTE, Title: Consideration on the 4-step random access procedure.
R2-1704901 3GPP TSG-RAN WG2 Meeting #98, Hangzhou, China, May 15-19, 2017, Source: Qualcomm Incorporated, Title: Prioritized random access in NR.
R3-172102 3GPP TSG-RAN3 NR AdHoc Meeting, Qingdao, China, Jun. 27-29, 2017, Source: China Telecom, Title: On the preliminary transport comparison between F1-C and F1-U protocols.
R3-172176 3GPP TSG-RAN3 NR AdHoc Meeting, Qingdao, China, Jun. 27-29, 2017, Source: Huawei, Title: F1AP procedures for RRC Connection Setup.
R3-172178 3GPP TSG-RAN3 NR AdHoc Meeting, Qingdao, China, Jun. 27-29, 2017, Source: Huawei, Title: TP on Transmitting RRC Connection Setup message over F1 to 38.470.
R3-172198 3GPP TSG-RAN3 NR AdHoc Meeting, Qingdao, China, Jun. 27-29, 2017, Source: Huawei, Title: Discussions on F1 interface management.
R3-172199 3GPP TSG-RAN3 NR AdHoc Meeting, Qingdao, China, Jun. 27-29, 2017, Source: Huawei, Title: TP on F1 interface management to 38.470.
R3-172200 3GPP TSG-RAN3 NR AdHoc Meeting, Qingdao, China, Jun. 27-29, 2017, Source: Huawei, HiSilicon, Title: TP on F1 interface management procedures to 38.473.
R3-172209 3GPP TSG-RAN3 NR AdHoc Meeting, Qingdao, China, Jun. 27-29, 2017, Source: Chinatelecom, Title: gNB and gNB-CU ID discussion.
R3-172218 3GPP TSG-RAN3 NR AdHoc Meeting, Qingdao, China, Jun. 27-29, 2017, Source: CATT, Title: Discussion on the F1AP functions necessary for Option 3.
R3-172244 3GPP TSG-RAN3 NR AdHoc Meeting, Qingdao, China, Jun. 27-29, 2017, Source: Samsung, KT, SK Telecom, Title: Centralized retransmission of lost PDUs.
R3-172250 3GPP TSG-RAN3 NR AdHoc Meeting, Qingdao, China, Jun. 27-29, 2017, Source: Samsung, KT, SK Telecom, Title: On-demand SI support in high layer functional split.
R3-172251 3GPP TSG-RAN3 NR AdHoc Meeting, Qingdao, China, Jun. 27-29, 2017, Source: Samsung, KT, SK Telecom, Title: Stage 2 text proposal for TS38.401 on mechanism of centralized retransmission of lost PDUs.
R3-172256 3GPP TSG-RAN3 NR AdHoc Meeting, Qingdao, China, Jun. 27-29, 2017, Source: Samsung, KT, SK Telecom, Title: Stage 2 text proposal for TS38.401 on supporting on-demand SI.
R3-172266 3GPP TSG-RAN3 NR AdHoc Meeting, Qingdao, China, Jun. 27-29, 2017, Source: LG Electronics Inc., Title: Issue on C-RNTI allocation for RRC connection resume.
R3-172309 3GPP TSG-RAN3 NR AdHoc Meeting, Qingdao, China, Jun. 27-29, 2017, Source: Nokia, Alcatel-Lucent Shanghai Bell, Title: Inter-gNB-DU Mobility procedure.
R3-172310 3GPP TSG-RAN3 NR AdHoc Meeting, Qingdao, China, Jun. 27-29, 2017, Source: Nokia, Alcatel-Lucent Shanghai Bell, Title: TP of Inter-gNB-DU Mobility procedure (TS 38.401).
R3-172321 3GPP TSG-RAN3 NR AdHoc Meeting, Qingdao, China, Jun. 27-29, 2017, Source: Nokia, Alcatel-Lucent Shanghai Bell, Title: Retransmission procedure in radio link outage.
R3-172322 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.401).
R3-172323 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.475).
R3-172324 3GPP TSG-RAN3 NR AdHoc Meeting, Qingdao, China, Jun. 27-29, 2017, Source: Nokia, Title: [Draft] LS on retransmission procedure in radio link outage.
R3-172333 3GPP TSG-RAN3 NR AdHoc Meeting, Qingdao, China, Jun. 27-29, 2017, Source: Nokia, Alcatel-Lucent Shanghai Bell, Title: UE Initial Access Procedure.
R3-172334 3GPP TSG-RAN3 NR AdHoc Meeting, Qingdao, China, Jun. 27-29, 2017, Source: Nokia, Alcatel-Lucent Shanghai Bell, Title: TP of UE Initial Access procedure (TS 38.401).
R3-172342 3GPP TSG-RAN3 NR AdHoc Meeting, Qingdao, China, Jun. 27-29, 2017, Source: LG Electronics Inc., Title: Consideration on C-RNTI during initial UE access.
R3-172343 3GPP TSG-RAN3 NR AdHoc Meeting, Qingdao, China, Jun. 27-29, 2017, Source: LG Electronics Inc., Title: TP for consideration on C-RNTI during initial UE access.
R3-172344 3GPP TSG-RAN3 NR AdHoc Meeting, Qingdao, China, Jun. 27-29, 2017, Source: LG Electronics Inc., Title: TP for consideration on C-RNTI during initial UE access.
R3-172345 3GPP TSG-RAN3 NR AdHoc Meeting, Qingdao, China, Jun. 27-29, 2017, Source: ZTE, Title: RRC message transmission over F1 interface for TS 38.401.
R3-172346 3GPP TSG-RAN3 NR AdHoc Meeting, Qingdao, China, Jun. 27-29, 2017, Source: ZTE, Title: RRC message transmission over F1 interface for TS 38.470.
R3-172347 3GPP TSG-RAN3 NR AdHoc Meeting, Qingdao, China, Jun. 27-29, 2017, Source: ZTE, Title: RRC message transmission over F1 interface for TS 38.473.
R3-172356 3GPP TSG-RAN3 NR AdHoc Meeting, Qingdao, China, Jun. 27-29, 2017, Source: ZTE, China Telecom, Title: Discussion on flow control over F1-U.
R3-172357 3GPP TSG-RAN3 NR AdHoc Meeting, Qingdao, China, Jun. 27-29, 2017, Source: ZTE, Title: Update on flow control over F1 interface for TS 38.401.
R3-172358 3GPP TSG-RAN3 NR AdHoc Meeting, Qingdao, China, Jun. 27-29, 2017, Source: ZTE, Title: Flow control over F1 interface for TS 38.475.
R3-172399 3GPP TSG-RAN3 NR AdHoc Meeting, Qingdao, China, Jun. 27-29, 2017, Source: NEC, Title: How many gNB-DUs can be operated by one gNB-CU.
R3-174611 3GPP TSG-RAN WG3 Meeting #98, Reno, USA, Nov. 27-Dec. 1, 2017, Source: Samsung, KT, Title: Mobility procedures with high layer split.
R3-174612 3GPP TSG-RAN WG3 Meeting #98, Reno, USA, Nov. 27-Dec. 1, 2017, Source: Samsung, KT, Title: Stage 2 TP for TS38.470 on mobility related procedures.
R3-174613 3GPP TSG-RAN WG3 Meeting #98, Reno, USA, Nov. 27-Dec. 1, 2017, Source: Samsung, KT, Title: Stage 3 TP for TS38.473 on mobility related procedures.
R3-174618 3GPP TSG-RAN WG3 Meeting #98, Reno, USA, Nov. 27-Dec. 1, 2017, Source: Samsung, KT, Title: Further discussions on PDCP duplication in high-layer split.
R3-174637 3GPP TSG-RAN WG3 Meeting #98, Reno, USA, Nov. 27-Dec. 1, 2017, Source: Intel Corporation, Title: Flow Control enhancements for downlink PDCP duplication.
R3-174638 3GPP TSG-RAN WG3 Meeting #98, Reno, USA, Nov. 27-Dec. 1, 2017, Source: Intel Corporation, Title: Flow Control enhancements for uplink PDCP duplication.
R3-174663 3GPP TSG-RAN WG3 Meeting #98, Reno, USA, Nov. 27-Dec. 1, 2017, Source: CMCC, Title: UE initial access procedure for CU-DU architecture.
R3-174769 3GPP TSG-RAN WG3 Meeting #98, Reno, USA, Nov. 27-Dec. 1, 2017, Source: Ericsson, Title: Discard the duplicated transmissions of PDCP PDUs.
R3-174772 3GPP TSG-RAN WG3 Meeting #98, Reno, USA, Nov. 27-Dec. 1, 2017, Source: Ericsson, Title: Benefits of F1AP Transaction IDs.
R3-174773 3GPP TSG-RAN WG3 Meeting #98, Reno, USA, Nov. 27-Dec. 1, 2017, Source: Ericsson, Title: Further discussion about TNL solution for F1-C.
R3-174774 3GPP TSG-RAN WG3 Meeting #98, Reno, USA, Nov. 27-Dec. 1, 2017, Source: Ericsson, Title: On parallel transactions over F1.
R3-174781 3GPP TSG-RAN WG3 Meeting #98, Reno, USA, Nov. 27-Dec. 1, 2017, Source: Ericsson, Title: Mobility procedures.

(56) References Cited

OTHER PUBLICATIONS

R3-174782 3GPP TSG-RAN WG3 Meeting #98, Reno, USA, Nov. 27-Dec. 1, 2017, Source: Ericsson, Title: Content for UE mobility command messages.
R3-174786 3GPP TSG-RAN WG3 Meeting #98, Reno, USA, Nov. 27-Dec. 1, 2017, Source: NTT Docomo, Inc., Title: How to acquire status of re-transmitted packets.
R3-174850 3GPP TSG-RAN WG3 Meeting #98, Reno, USA, Nov. 27-Dec. 1, 2017, Source: NTT Docomo, Inc., Title: Consideration on data volume reporting.
R3-174854 3GPP TSG-RAN WG3 Meeting #98, Reno, USA, Nov. 27-Dec. 1, 2017, Source: KT Corp., Title: Considerations for F1 Setup Procedure.
R3-180123 3GPP TSG-RAN WG3 NR Ad Hoc, Sophia Antipolis, France, Jan. 22-26, 2018, Source: ZTE, Title: QoS information transfer over F1 interface.
R3-180124 3GPP TSG-RAN WG3 NR Ad Hoc, Sophia Antipolis, France, Jan. 22-26, 2018, Source: ZTE, Title: Update on QoS information transfer for TS38.473.
R3-180139 3GPP TSG-RAN WG3 NR Ad Hoc, Sophia Antipolis, France, Jan. 22-26, 2018, Source: ZTE, Title: NW slicing for high layer functional split.
R3-180164 3GPP TSG-RAN WG3 NR Ad Hoc, Sophia Antipolis, France, Jan. 22-26, 2018, Source: CATT, Title: TP for 38.401 BL on UE Reconfiguration Completion procedure.
R3-180179 3GPP TSG-RAN WG3 NR Ad Hoc, Sophia Antipolis, France, Jan. 22-26, 2018, Source: CATT, Title: Discussion on UE Context Management procedure.
R3-180180 3GPP TSG-RAN WG3 NR Ad Hoc, Sophia Antipolis, France, Jan. 22-26, 2018, Source: CATT, Title: TP for TS 38.473 on UE Context Management procedure.
R3-180188 3GPP TSG-RAN WG3 NR Ad Hoc, Sophia Antipolis, France, Jan. 22-26, 2018, Source: Nokia, Nokia Shanghai Bell, Title: QoS handling for F1.
R3-180189 3GPP TSG-RAN WG3 NR Ad Hoc, Sophia Antipolis, France, Jan. 22-26, 2018, Source: Nokia, Nokia Shanghai Bell, Title: TP of QoS handling for F1 (TS38.473).
R3-180190 3GPP TSG-RAN WG3 NR Ad Hoc, Sophia Antipolis, France, Jan. 22-26, 2018, Source: Nokia, Nokia Shanghai Bell, KT, Title: User inactivity monitoring.
R3-180234 3GPP TSG-RAN WG3 NR Ad Hoc, Sophia Antipolis, France, Jan. 22-26, 2018, Source: LG Electronics Inc., KT Corp., Title: QoS aspect in UE context management function.
R3-180235 3GPP TSG-RAN WG3 NR Ad Hoc, Sophia Antipolis, France, Jan. 22-26, 2018, Source: LG Electronics Inc., KT Corp., Title: Stage 3 on QoS aspect in UE context management function.
R3-180244 3GPP TSG-RAN WG3 NR Ad Hoc, Sophia Antipolis, France, Jan. 22-26, 2018, Source: Samsung, KT, Title: UE context management update considering parameters over X2 for EN-DC.
R3-180285 3GPP TSG-RAN WG3 NR Ad Hoc, Sophia Antipolis, France, Jan. 22-26, 2018, Source: Samsung, KT, Title: User inactivity monitoring in CU-DU architecture.
R3-180286 3GPP TSG-RAN WG3 NR Ad Hoc, Sophia Antipolis, France, Jan. 22-26, 2018, Source: Samsung, KT, Title: TP for TS 38.473 on user inactivity monitoring.
R3-180300 3GPP TSG-RAN WG3 NR Ad Hoc, Sophia Antipolis, France, Jan. 22-26, 2018, Source: NEC, Title: RLC Mode indication in F1AP.
R3-180330 3GPP TSG-RAN WG3 NR Ad Hoc, Sophia Antipolis, France, Jan. 22-26, 2018, Source: CMCC, Title: QoS management over F1.
R3-180343 3GPP TSG-RAN WG3 NR Ad Hoc, Sophia Antipolis, France, Jan. 22-26, 2018, Source: Huawei, Title: Further discussions on QoS info transfer over F1.
R3-180344 3GPP TSG-RAN WG3 NR Ad Hoc, Sophia Antipolis, France, Jan. 22-26, 2018, Source: Huawei, Title: pCR to 38.473 on QoS info transfer over F1.
R3-180352 3GPP TSG-RAN WG3 NR Ad Hoc, Sophia Antipolis, France, Jan. 22-26, 2018, Source: Huawei, Title: Further discussions on UE context management.
R3-180355 3GPP TSG-RAN WG3 NR Ad Hoc, Sophia Antipolis, France, Jan. 22-26, 2018, Source: Huawei, Title: CR to BL 38.473 on inter-gNB-DU or intra-gNB-DU handover case for SA operation.
R3-180356 3GPP TSG-RAN WG3 NR Ad Hoc, Sophia Antipolis, France, Jan. 22-26, 2018, Source: Huawei, Title: pCR to 38.473 on the introduction of Handover Preparation Information for SA Operation.
R3-180357 3GPP TSG-RAN WG3 NR Ad Hoc, Sophia Antipolis, France, Jan. 22-26, 2018, Source: Huawei, Title: Further discussions on the content of serving cell info.
R3-180367 3GPP TSG-RAN WG3 NR Ad Hoc, Sophia Antipolis, France, Jan. 22-26, 2018, Source: Huawei, Title: Further discussions on confirmation to gNB-DU about completion of RRC messages.
R3-180425 3GPP TSG-RAN WG3 NR Ad Hoc, Sophia Antipolis, France, Jan. 22-26, 2018, Source: Ericsson, Title: UE radio capabilities over F1.
R3-180426 3GPP TSG-RAN WG3 NR Ad Hoc, Sophia Antipolis, France, Jan. 22-26, 2018, Source: Ericsson, Title: Cell information over F1.
R3-180427 3GPP TSG-RAN WG3 NR Ad Hoc, Sophia Antipolis, France, Jan. 22-26, 2018, Source: Ericsson, Title: UE Context Setup over the F1.
R3-180428 3GPP TSG-RAN WG3 NR Ad Hoc, Sophia Antipolis, France, Jan. 22-26, 2018, Source: Ericsson, Title: UE Reject Indication and gNB-DU admission result.
R3-180429 3GPP TSG-RAN WG3 NR Ad Hoc, Sophia Antipolis, France, Jan. 22-26, 2018, Source: Ericsson, Title: Further analysis on inactivity monitoring.
R3-180430 3GPP TSG-RAN WG3 NR Ad Hoc, Sophia Antipolis, France, Jan. 22-26, 2018, Source: Ericsson, Title: Creation of signalling connection.
R3-180431 3GPP TSG-RAN WG3 NR Ad Hoc, Sophia Antipolis, France, Jan. 22-26, 2018, Source: Ericsson, Title: RRC Container in UE Context Setup Request.
R3-180432 3GPP TSG-RAN WG3 NR Ad Hoc, Sophia Antipolis, France, Jan. 22-26, 2018, Source: Ericsson, Title: RLC mode indication.
R3-180433 3GPP TSG-RAN WG3 NR Ad Hoc, Sophia Antipolis, France, Jan. 22-26, 2018, Source: Ericsson, Title: Introduction of UE Reconfiguration Complete procedure.
R3-180518 3GPP TSG-RAN WG3 NR Ad Hoc, Sophia Antipolis, France, Jan. 22-26, 2018, Source: Ericsson, Vodafone, Title: UE context Setup over the F1.
R3-180596 3GPP TSG-RAN WG3 NR Ad Hoc, Sophia Antipolis, France, Jan. 22-26, 2018, Source: Ericsson, Title: UE Reject Indication.
R3-172401 3GPP TSG-RAN3 NR AdHoc Meeting, Qingdao, China, Jun. 27-29, 2017, Source: CMCC, Title: gNB ID and NCGI considering CU-DU split.
R3-172417 3GPP TSG-RAN3 NR AdHoc Meeting, Qingdao, China, Jun. 27-29, 2017, Source: ZTE, China Unicom, Title: Discussion on CU DU ID and NCGI.
R3-172418 3GPP TSG-RAN3 NR AdHoc Meeting, Qingdao, China, Jun. 27-29, 2017, Source: ZTE, China Unicom, Title: CUDU ID and NCGI for TS 38.300.
R3-172481 3GPP TSG-RAN3 NR AdHoc Meeting, Qingdao, China, Jun. 27-29, 2017, Source: Samsung, Title: Identification of gNB, gNB-CU/DU, and NR cell.
R3-172484 3GPP TSG-RAN3 NR AdHoc Meeting, Qingdao, China, Jun. 27-29, 2017, Source: Vodafone, Title: Common Radio Resource Management Functional Split for Different Deployment Scenarios.
R3-172511 3GPP TSG-RAN3 NR AdHoc Meeting, Qingdao, China, Jun. 27-29, 2017, Source: Ericsson, Title: Resilience and scalability in a disaggregated gNB.
3GPP TS 36.300 V14.3.0 (Jun. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).

(56) References Cited

OTHER PUBLICATIONS

3GPP TS 38.300 V1.0.0 (Sep. 2017), Technical Specification, 3rd Generation Partnership Project; Technical Specification Group Radio Access Network; NR; NR and NG-RAN; Overall Description; Stage 2 (Release 15).
R2-1707705 3GPP TSG-RAN2 Meeting #99, Berlin, Germany, Aug. 21-25, 2017, Source: OPPO, Title: Control on UL packet duplication for split bearer.
R2-1707708 3GPP TSG-RAN2 Meeting #99, Berlin, Germany, Aug. 21-25, 2017, Source: OPPO, Title: PDCP operation for UL packet duplication.
R2-1707717 3GPP TSG-RAN2 Meeting #99, Berlin, Germany, Aug. 21-25, 2017, Source: Huawei, HiSilicon, Title: UE behaviors upon deactivation of DC duplication.
R2-1707718 3GPP TSG-RAN2 Meeting #99, Berlin, Germany, Aug. 21-25, 2017, Source: Huawei, ASUSTeK, HiSilicon, Title: RLC behaviors upon duplicate deactivation.
R2-1707719 3GPP TSG-RAN2 Meeting #99, Berlin, Germany, Aug. 21-25, 2017, Source: Huawei, ASUSTek, HiSilicon, Title: PDCP operation for packet duplication.
R2-1707720 3GPP TSG-RAN2 Meeting #99, Berlin, Germany, Aug. 21-25, 2017, Source: Huawei, HiSilicon, Title: PDCP data volume calculation for packet duplication (Revision of R2-1706484).
R2-1707924 3GPP TSG-RAN2 Meeting #99, Berlin, Germany, Aug. 21-25, 2017, Source: CATT, Title: PDCP Status Report for Duplication.
R2-1707925 3GPP TSG-RAN2 Meeting #99, Berlin, Germany, Aug. 21-25, 2017, Source: CATT, Title: Duplication Bearer Type.
R2-1707982 3GPP TSG-RAN2 Meeting #99, Berlin, Germany, Aug. 21-25, 2017, Source: Nokia, Mediatek, Nokia Shanghai Bell, Title: Initial State of PDCP Duplication (Revision of R2-1706545).
R2-1707990 3GPP TSG-RAN2 Meeting #99, Berlin, Germany, Aug. 21-25, 2017, Source: Nokia, Nokia Shanghai Bell, Title: Duplication Impacts to PDCP.
R2-1708017 3GPP TSG-RAN2 Meeting #99, Berlin, Germany, Aug. 21-25, 2017, Source: Ericsson, Title: Aligned duplication support for DRBs and SRBs.
R2-1708097 3GPP TSG-RAN2 Meeting #99, Berlin, Germany, Aug. 21-25, 2017, Source: MediaTek Inc., Title: Stage-2 aspects of data duplication (Revision of R2-1707260).
R2-1708098 3GPP TSG-RAN2 Meeting #99, Berlin, Germany, Aug. 21-25, 2017, Source: MediaTek Inc., Title: Data duplication in NR (Revision of R2-1707261).
R2-1708329 3GPP TSG-RAN2 Meeting #99, Berlin, Germany, Aug. 21-25, 2017, Source: Ericsson, Title: PDCP and RLC behaviour for PDCP data duplication.
R2-1708333 3GPP TSG-RAN2 Meeting #99, Berlin, Germany, Aug. 21-25, 2017, Source: Ericsson, Title: Packet duplication in CA (Revision of R2-1707172).
R2-1708335 3GPP TSG-RAN2 Meeting #99, Berlin, Germany, Aug. 21-25, 2017, Source: Ericsson, Title: PDCP dynamic link switching.
R2-1708336 3GPP TSG-RAN2 Meeting #99, Berlin, Germany, Aug. 21-25, 2017, Source: Ericsson, Title: PDCP data volume reporting in duplication (Revision of R2-1704370).
R2-1708337 3GPP TSG-RAN2 Meeting #99, Berlin, Germany, Aug. 21-25, 2017, Source: Ericsson, Title: PDCP duplication control related to SCell control.
R2-1708444 3GPP TSG-RAN2 Meeting #99, Berlin, Germany, Aug. 21-25, 2017, Source: Samsung, Title: Discussion on PDCP data volume calculation.
R2-1708489 3GPP TSG-RAN2 Meeting #99, Berlin, Germany, Aug. 21-25, 2017, Source: Vivo, Title: Duplication deactivation due to SCell or BWP deactivation.
R2-1708508 3GPP TSG-RAN2 Meeting #99, Berlin, Germany, Aug. 21-25, 2017, Source: Vivo, Title: Layer-2 behaviors of PDCP duplication activation deactivation.
R2-1708573 3GPP TSG-RAN2 Meeting #99, Berlin, Germany, Aug. 21-25, 2017, Source: Panasonic, Title: Packet duplication during the handover.
R2-1708624 3GPP TSG-RAN2 Meeting #99, Berlin, Germany, Aug. 21-25, 2017, Source: Lenovo, Motorola Mobility, Title: PDCP packet duplication.
R2-1708691 3GPP TSG-RAN2 Meeting #99, Berlin, Germany, Aug. 21-25, 2017, Source: Huawei, HiSilicon, Title: Remaining stage 2 issues for CA duplication and for DC duplication.
R2-1708735 3GPP TSG-RAN2 Meeting #99, Berlin, Germany, Aug. 21-25, 2017, Source: InterDigital Inc., Title: Details of duplication and routing for SRB.
R2-1708821 3GPP TSG-RAN2 Meeting #99, Berlin, Germany, Aug. 21-25, 2017, Source: Intel Corporation, Title: Support of CA packet duplication for RLC AM.
R2-1708862 3GPP TSG-RAN2 Meeting #99, Berlin, Germany, Aug. 21-25, 2017, Source: Fujitsu, Title: Stage 2 TP for RLC AM duplication.
R2-1708950 3GPP TSG-RAN2 Meeting #99, Berlin, Germany, Aug. 21-25, 2017, Source: Qualcomm Incorporated, Title: Further considerations for Packet duplication.
R2-1708951 3GPP TSG-RAN2 Meeting #99, Berlin, Germany, Aug. 21-25, 2017, Source: Qualcomm Incorporated, Title: PDCP duplication.
R2-1709032 3GPP TSG-RAN2 Meeting #99, Berlin, Germany, Aug. 21-25, 2017, Source: Samsung, Title: PDCP Duplication Operations (Revision of R2-177368).
R2-1709036 3GPP TSG-RAN2 Meeting #99, Berlin, Germany, Aug. 21-25, 2017, Source: Samsung, Title: Uplink DRB Duplication.
R2-1709061 3GPP TSG-RAN2 Meeting #99, Berlin, Germany, Aug. 21-25, 2017, Source: LG Electronics Inc., Title: Discussion on the duplicate detection in PDCP.
R2-1709077 3GPP TSG-RAN2 Meeting #99, Berlin, Germany, Aug. 21-25, 2017, Source: ITRI, Title: SCG Failure Case for Duplication SRB.
R2-1709095 3GPP TSG-RAN2 Meeting #99, Berlin, Germany, Aug. 21-25, 2017, Source: LG Electronics Inc., Title: Need for Duplicate RB.
R2-1709100 3GPP TSG-RAN2 Meeting #99, Berlin, Germany, Aug. 21-25, 2017, Source: LG Electronics Inc., Title: Packet duplication in PDCP (Revision of R2-1706870).
R2-1709870 3GPP TSG-RAN2 Meeting #99, Berlin, Germany, Aug. 21-25, 2017, Source: Ericsson, Title: TP on Radio Link Failure for 38.300.
R3-173128 3GPP TSG-RAN2 Meeting #99, Berlin, Germany, Aug. 21-25, 2017, Source: Huawei, Title: PDCP duplication for CU-DU.
R2-1800376 3GPP TSG-RAN WG2 NR Ad Hoc, Vancouver, Canada, Jan. 22-26, 2018, Source: Huawei, HiSilicon, Title: CR on the prioritization between dynamic scheduling and configured scheduling.
R2-1800158 3GPP TSG-RAN WG2 AH, Vancouver, Canada, Jan. 22-26, 2018, Source: OPPO, Title: CR on ConfiguredGrantTimer for C-RNTI based grant.
R2-1800647 3GPP TSG-RAN WG2 AH, Vancouver, Canada, Jan. 22-26, 2018, Source: OPPO, Title: Correction on ConfiguredGrantTimer.
R2-1800710 3GPP TSG-RAN WG2 AH, Vancouver, Canada, Jan. 22-26, 2018, Source: Ericsson, Title: Alignment of terminology for Configured Scheduling and SPS.
R2-1801053 3GPP TSG-RAN WG2 AH, Vancouver, Canada, Jan. 22-26, 2018, Source: LG Electronics Inc., Title: Correction on ConfiguredGrantTimer.
R3-182243 3GPP TSG RAN WG3 Meeting #99bis, Sanya, China, Apr. 16-20, 2018, Source: Ericsson, Title: Bearer Context Setup procedure.
R2-1713898 3GPP TSG-RAN WG2 Meeting #100, Reno, USA, Nov. 27-Dec. 1, 2017, Source: Samsung, Title: RLM RS type and L3 parameter differentiation.
Dec. 2, 2019—European Extended Search Report—EP 19173901.0.
R3-183279 3GPP TSG-RAN2 Meeting #100, Busan, Korea, May 21-25, 2019, Source: Huawei, Title: pCR to 38.460 on indication of PDCP duplication over E1 interface.
Sep. 24, 2021—European Office Action—EP 19173901.0.

\* cited by examiner

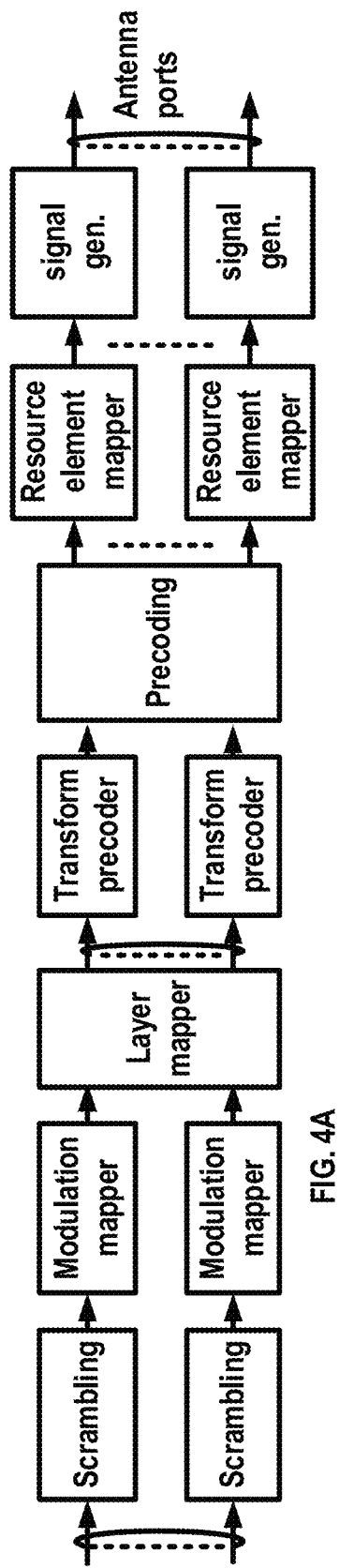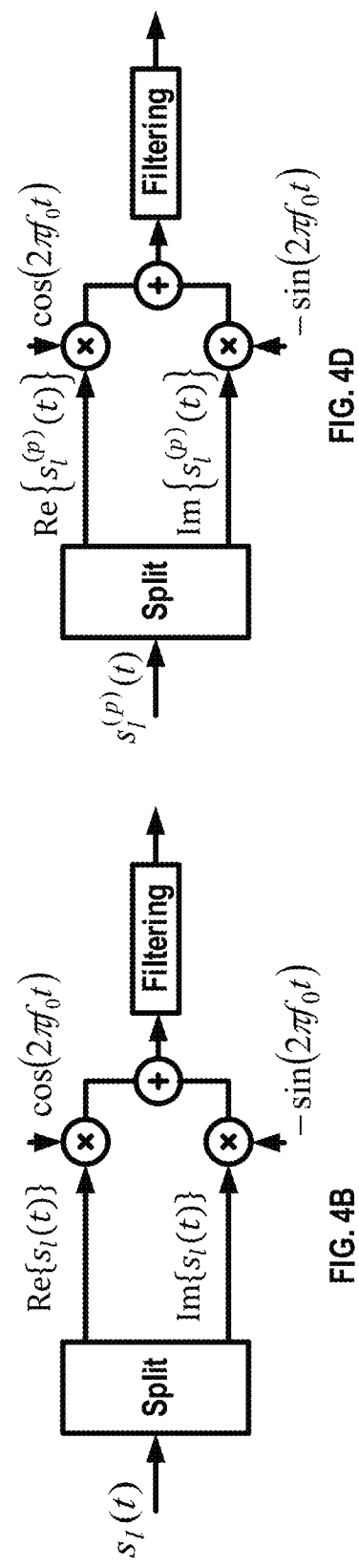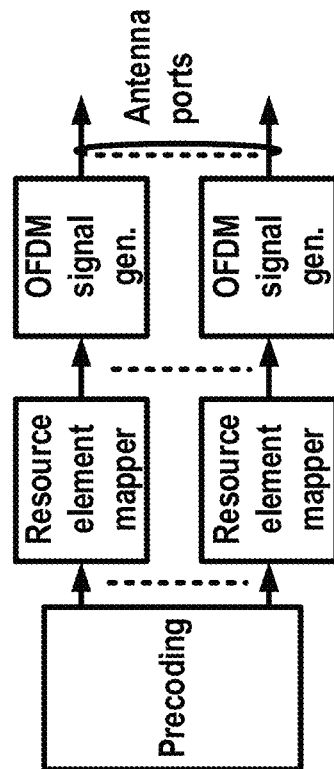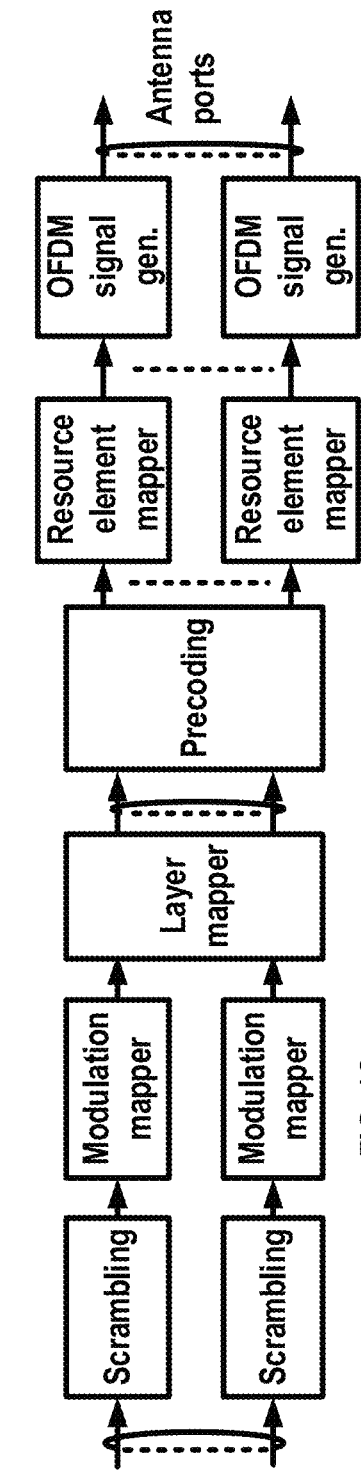
FIG. 4A
FIG. 4B
FIG. 4D
FIG. 4C

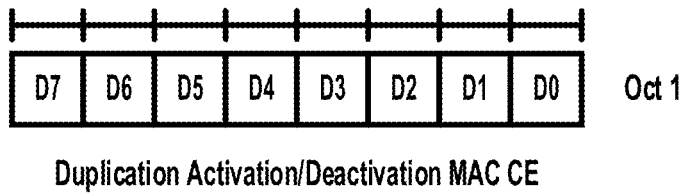

Duplication Activation/Deactivation MAC CE

FIG. 16A

| Index | LCID values |
|---|---|
| 000000 | CCCH |
| 000001–100000 | Identity of the logical channel |
| 100001–101111 | Reserved |
| 110000 | SP ZP CSI-RS Resource Set Activation/Deactivation |
| 110001 | PUCCH spatial relation Activation/Deactivation |
| 110010 | SP SRS Activation/Deactivation |
| 110011 | SP CSI reporting on PUCCH Activation/Deactivation |
| 110100 | TCI State Indication for UE-specific PDCCH |
| 110101 | TCI States Activation/Deactivation for UE-specific PDSCH |
| 110110 | Aperiodic CSI Trigger State Subselection |
| 110111 | SP CSI-RS / CSI-IM Resource Set Activation/Deactivation |
| 111000 | Duplication Activation/Deactivation |
| 111001 | SCell Activation/Deactivation (4 octet) |
| 111010 | SCell Activation/Deactivation (1 octet) |
| 111011 | Long DRX Command |
| 111100 | DRX Command |
| 111101 | Timing Advance Command |
| 111110 | UE Contention Resolution Identity |
| 111111 | Padding |

Values of LCID for DL-SCH

FIG. 16B

INITIAL CONTEXT SETUP REQUEST message from AMF to NG-RAN node (TS 38.413 v0.8.0)

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| UE AMBR | M | | 9.3.1.58 | | YES | reject |
| RRC Inactive Assistance Information | M | | 9.3.1.15 | | YES | ignore |
| GUAMI | M | | 9.3.3.3 | | YES | reject |
| PDU Session Resource Setup Request List | | 0..1 | | | YES | reject |
| >PDU Session Resource Setup Request Item IEs | | 1..<max #> | | | EACH | reject |
| >>PDU Session ID | M | | 9.3.1.50 | | - | |
| >>NAS-PDU | O | | 9.3.3.4 | | - | |
| >>S-NSSAI | M | | 9.3.1.24 | | - | |
| >>PDU Session Resource Setup Request Transfer | M | | 9.3.4.1 | | - | |
| UE Security Capabilities | O [FFS] | | <ref> | | YES | reject |
| Security Key | O [FFS] | | <ref> | | YES | reject |
| Trace Activation | O | | 9.3.1.14 | | YES | ignore |
| Handover Restriction List | O | | <ref> | | YES | ignore |
| UE Radio Capability | O | | <ref> | | YES | ignore |
| Index to RAT/Frequency Selection Priority | O | | 9.3.1.61 | | YES | ignore |
| Masked IMEISV | O | | 9.3.1.54 | | YES | ignore |
| NAS-PDU | O | | 9.3.3.4 | [FFS] | YES | ignore |
| Emergency Fallback Indicator | O | | 9.3.1.26 | | YES | reject |

FIG. 18

BEARER CONTEXT SETUP REQUEST message from gNB-CU-CP to gNB-CU-UP (TS 38.463 v0.2.0)

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| Security Information | M | | 9.3.1.10 | | YES | reject |
| CHOICE System | M | | | | YES | reject |
| >E-UTRAN | | | | | | |
| >>DRB To Setup List | | 1 | | | YES | reject |
| >>>DRB To Setup Item | | 1...<max #> | | | EACH | reject |
| >>>>DRB ID | M | | | | - | - |
| >>>>PDCP Configuration | M | | Octet String | pdcp-config in TS 38.331 | - | - |
| >>>>E-UTRAN QoS | M | | | | - | - |
| >>>>S1 UL UP Transport Layer Information | M | | | | - | - |
| >>>>Data forwarding information | O | | | | - | - |
| >>>>Cell Group Information | M | | 9.3.1.11 | | - | - |
| >NG-RAN | | | | | | |
| >>PDU Session Resource To Setup List | | 1 | | | YES | reject |
| >>>PDU Session Resource To Setup Item | | 1..<max #> | | | EACH | reject |
| >>>>PDU Session ID | M | | | | - | - |
| >>>>S-NSSAI | O | | | | - | - |
| >>>>PDU Session Resource Setup Request Transfer | M | | | Defined in TS 38.413 | - | - |
| >>>>DRB To Setup List | | 1 | | | YES | reject |
| >>>>>DRB To Setup Item | | 1..<max #> | | | EACH | reject |
| >>>>>DRB ID | M | | | | - | - |
| >>>>>SDAP Configuration | M | | Octet String | sdap-config in TS 38.331 | - | - |
| >>>>>PDCP Configuration | M | | Octet String | pdcp-config in TS 38.331 | - | - |
| >>>>>Data forwarding information | O | | | | - | - |
| >>>>>Cell Group Information | M | | 9.3.1.11 | | - | - |
| >>>>>Flow Mapping Information | O | | 9.3.1.12 | | - | - |

FIG. 20

PACKET DUPLICATION CONTROL

CROSS-REFERENCE TO RELATED APPLICATIONS

This application is a continuation of and claims priority to U.S. patent application Ser. No. 17/572,211, filed Jan. 10, 2022, which is a continuation of U.S. patent application Ser. No. 16/409,260, filed on May 10, 2019 (now U.S. Pat. No. 11,258,549), which claims the benefit of U.S. Provisional Application No. 62/669,927, filed on May 10, 2018, each of which is hereby incorporated by reference in its entirety.

BACKGROUND

A wireless device may be configured to receive original and duplicated data packets. Packet duplication may increase reliability of data transmission by sending original packets via a first path and duplicated packets via a different second path. In some conditions, however, packet duplication may result in inefficient resource allocation and/or may decrease communication reliability.

SUMMARY

The following summary presents a simplified summary of certain features. The summary is not an extensive overview and is not intended to identify key or critical elements.

Activating and/or deactivating packet duplication, for communications to or from a wireless device, are described. Packet duplication may be activated and/or deactivated by a network node having status information for operations that may be affected by, and/or that may have an effect on, packet duplication. The status information may be obtained from other network nodes, and/or may originate from the network node controlling activation and/or deactivation of packet duplication. A network node controlling activation and/or deactivation of packet duplication may send one or more messages to other nodes indicating such activation and/or deactivation. For a functionally-split base station comprising a central unit control plane (CU-CP) node, a central unit user plane (CU-UP) node, and a distributed unit (DU), the CU-CP node may, for example, activate and/or deactivate packet duplication based on status information from self-monitoring, from the DU, from a wireless device, and/or from the CU-UP node. The CU-UP node may activate and/or deactivate packet duplication, for example, based on status information from the CU-CP node, from the DU, from the wireless device, and/or from self-monitoring. The CU-UP node may send one or more messages to the CU-CP node and/or the DU indicating such activation or deactivation. The DU may activate and/or deactivate packet duplication, for example, based on status information from the CU-CP node, from the CU-UP node, from the wireless device, and/or from self-monitoring. The DU node may send one or more messages to the CU-CP node indicating such activation or deactivation.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 16A shows an example duplication activation/deactivation Media Access Control (MAC) Control Element (CE).

FIG. 16B shows example values for a Logical Channel IDentifier (LCID) field.

FIG. 18 shows an example initial context setup request message.

FIG. 20 shows an example bearer context setup request message.

DETAILED DESCRIPTION

Figure 1:
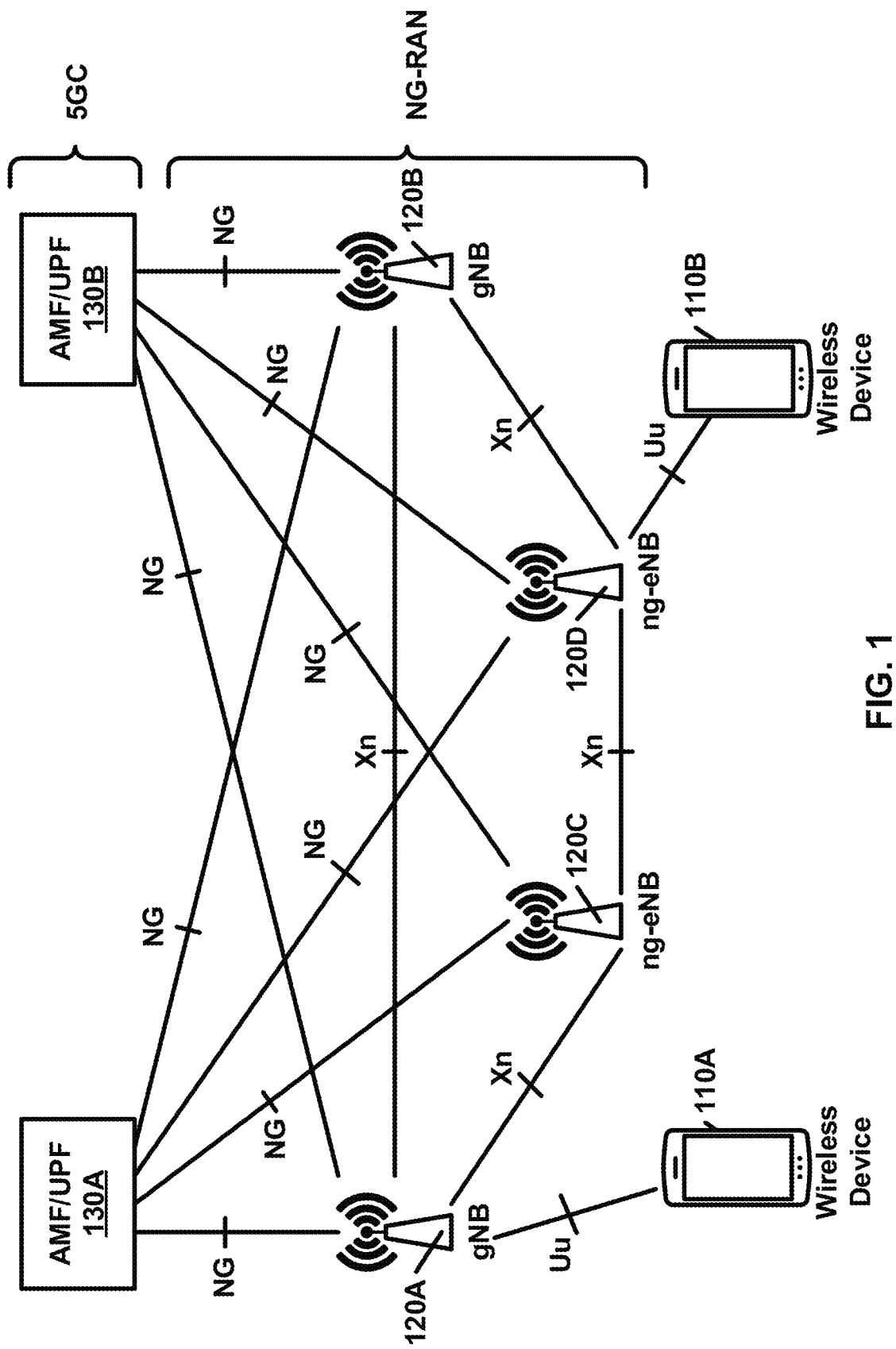
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may, for example, relate to wireless communication systems in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QOS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
STAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-ENB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-CNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (Qos) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
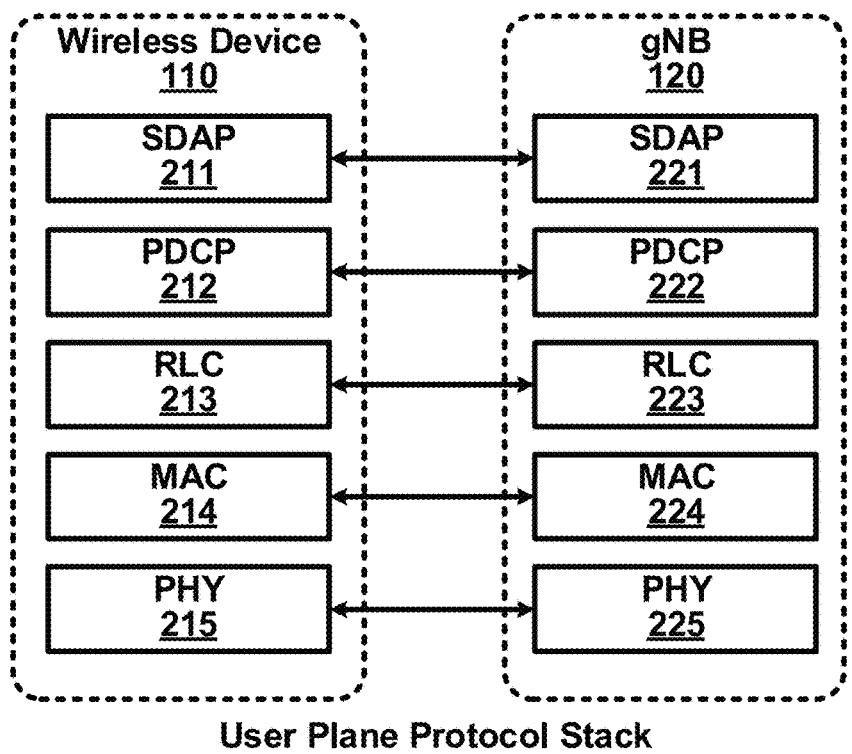
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
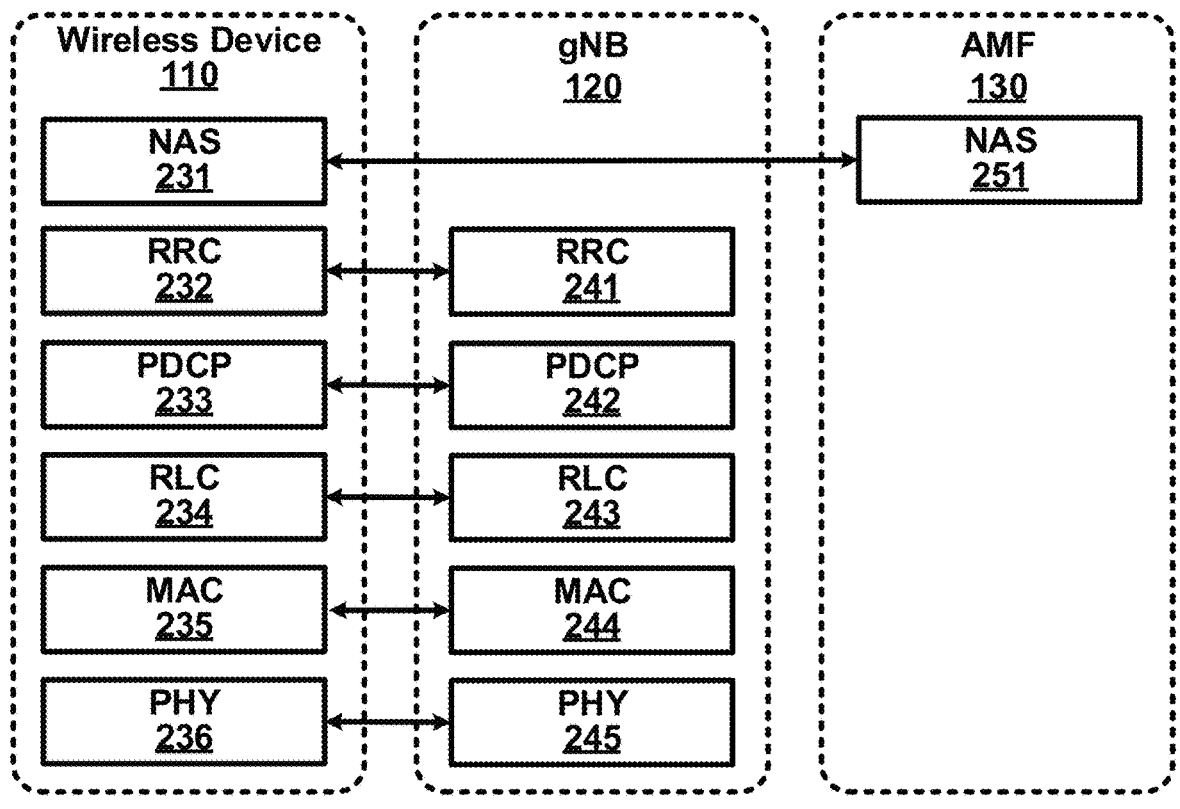
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission for one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MA CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
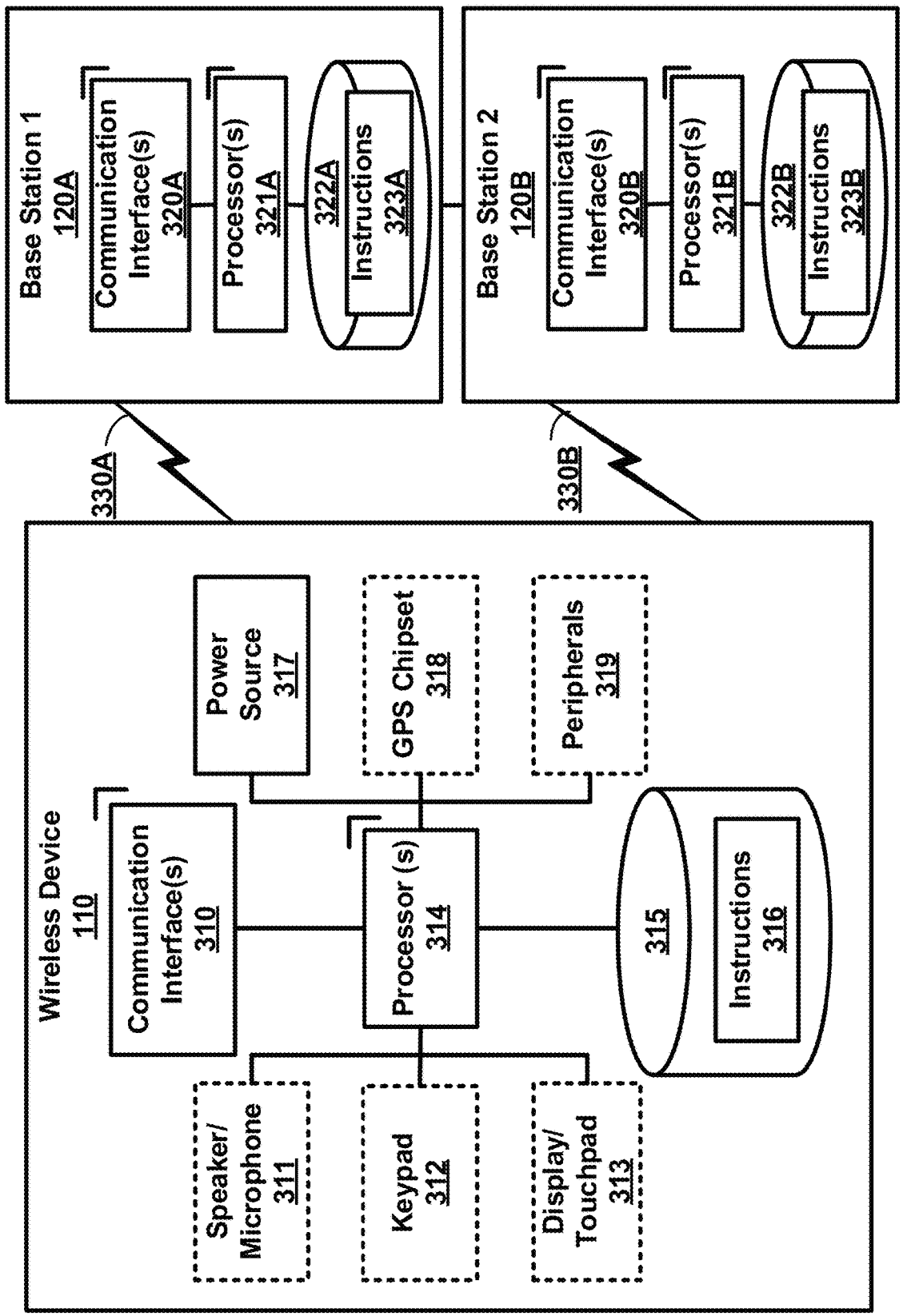
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random-access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IOT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-NB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
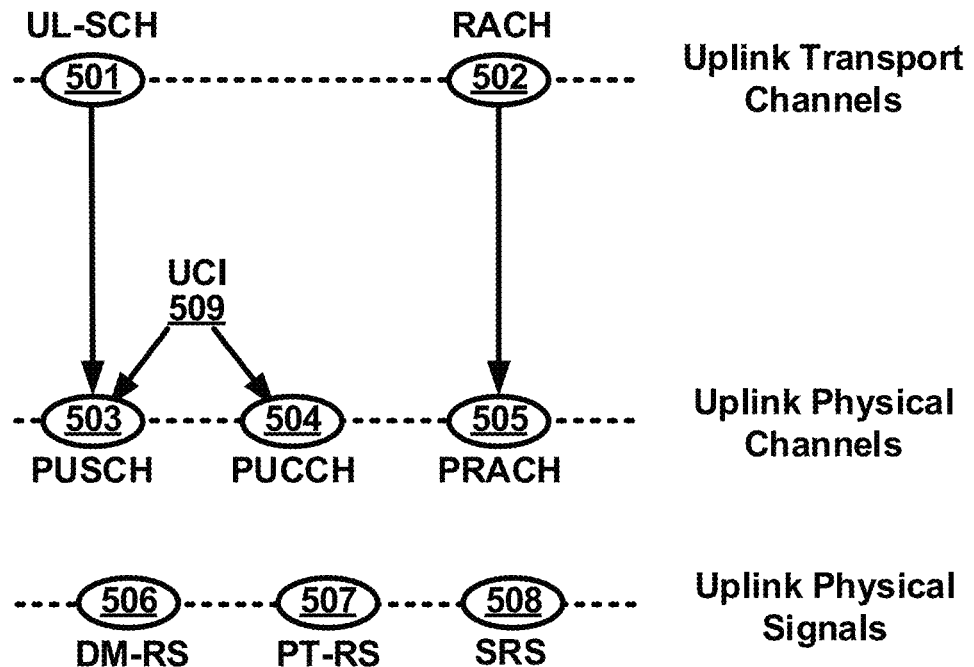
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
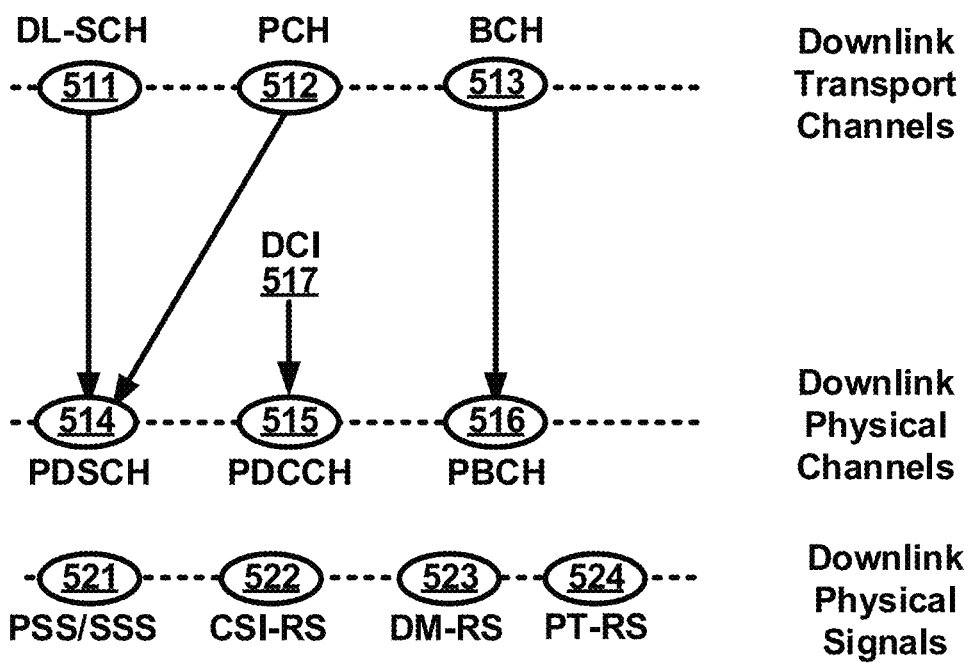
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
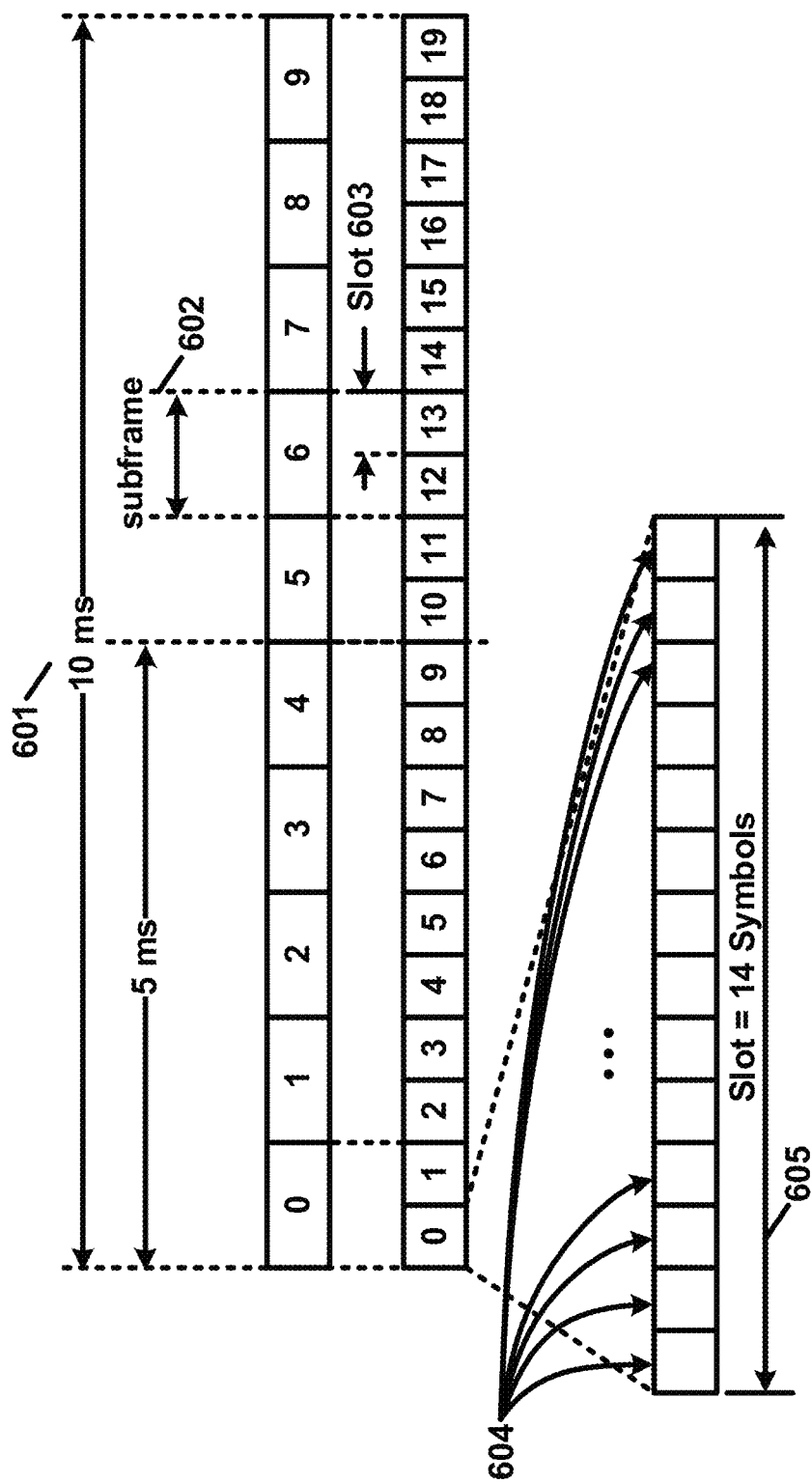
FIG. 6 shows an example transmission time and/or reception time for a carrier.

FIG. 6 shows an example transmission time and reception time, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
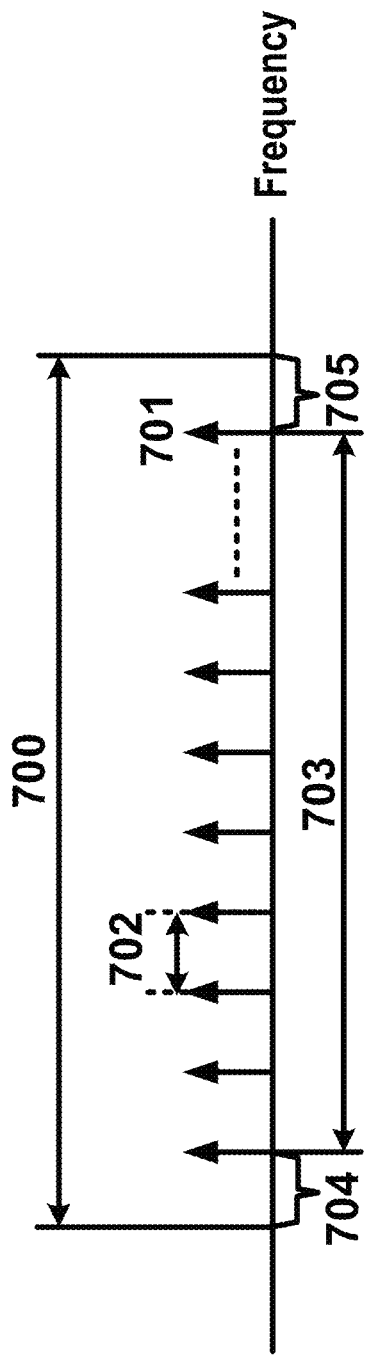
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
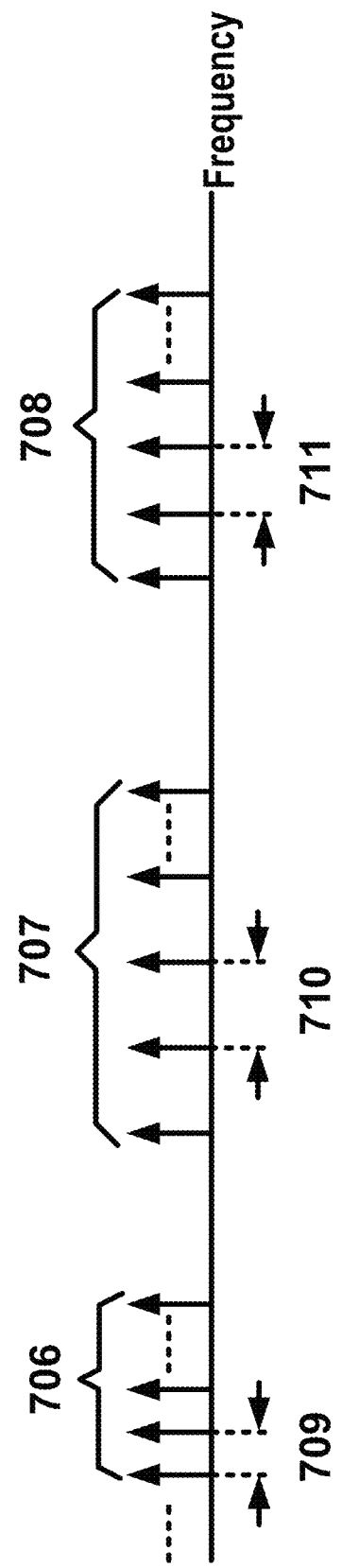

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
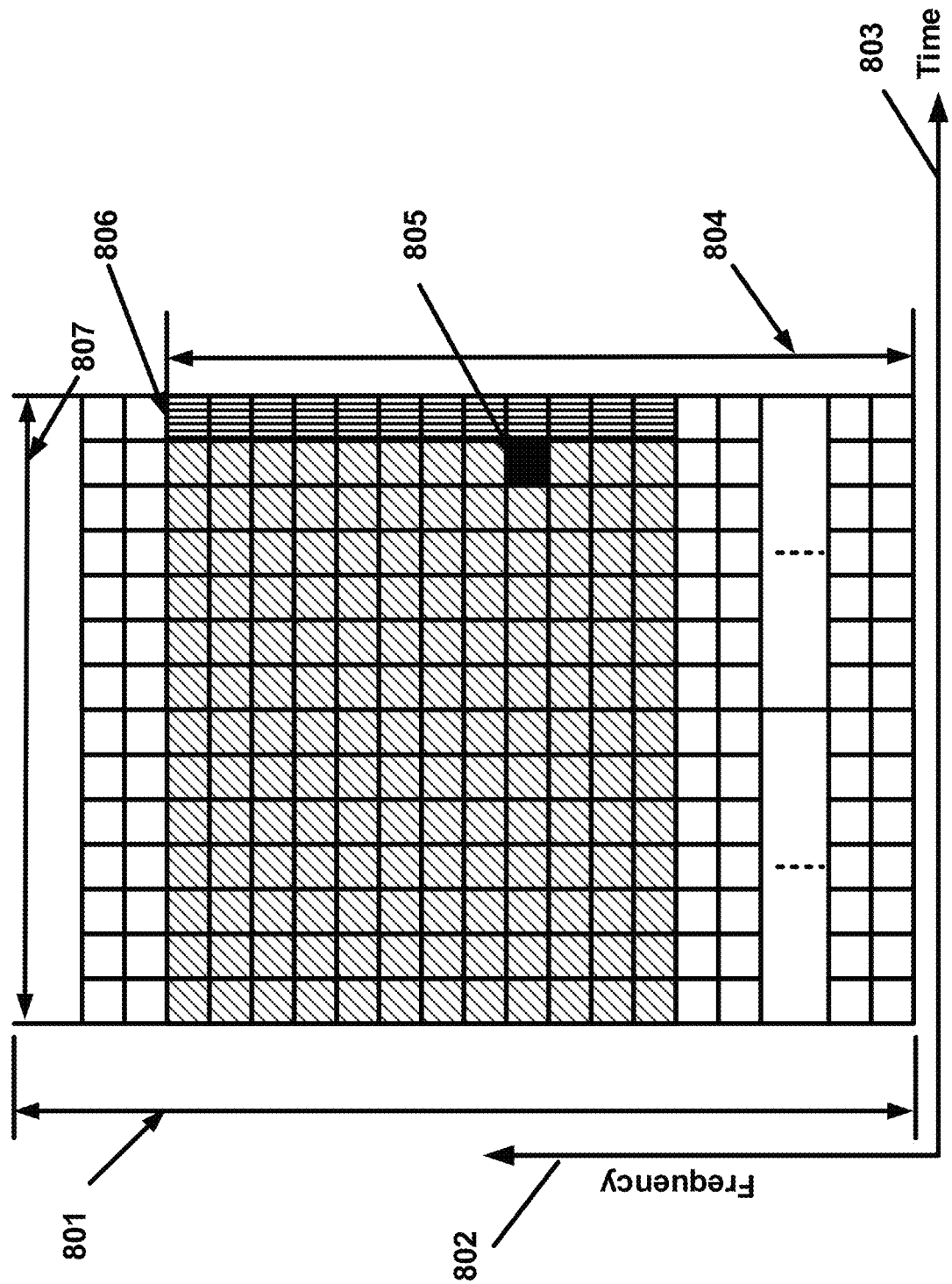
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCLed with the DM-RS antenna port(s). A different set of DM-RS antenna port(s) for a DL data channel may be indicated as QCL with a different set of the RS antenna port(s).

Figure 9A:
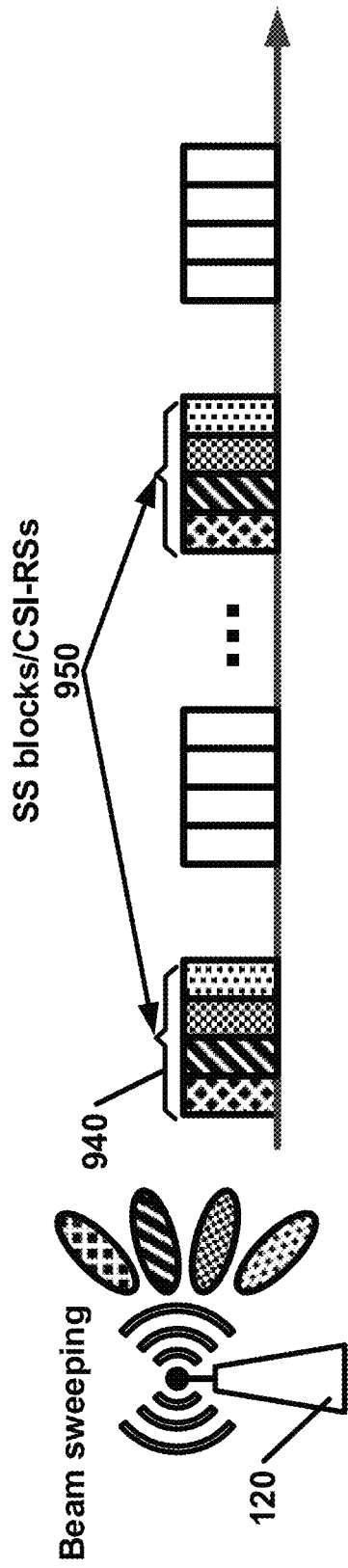
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
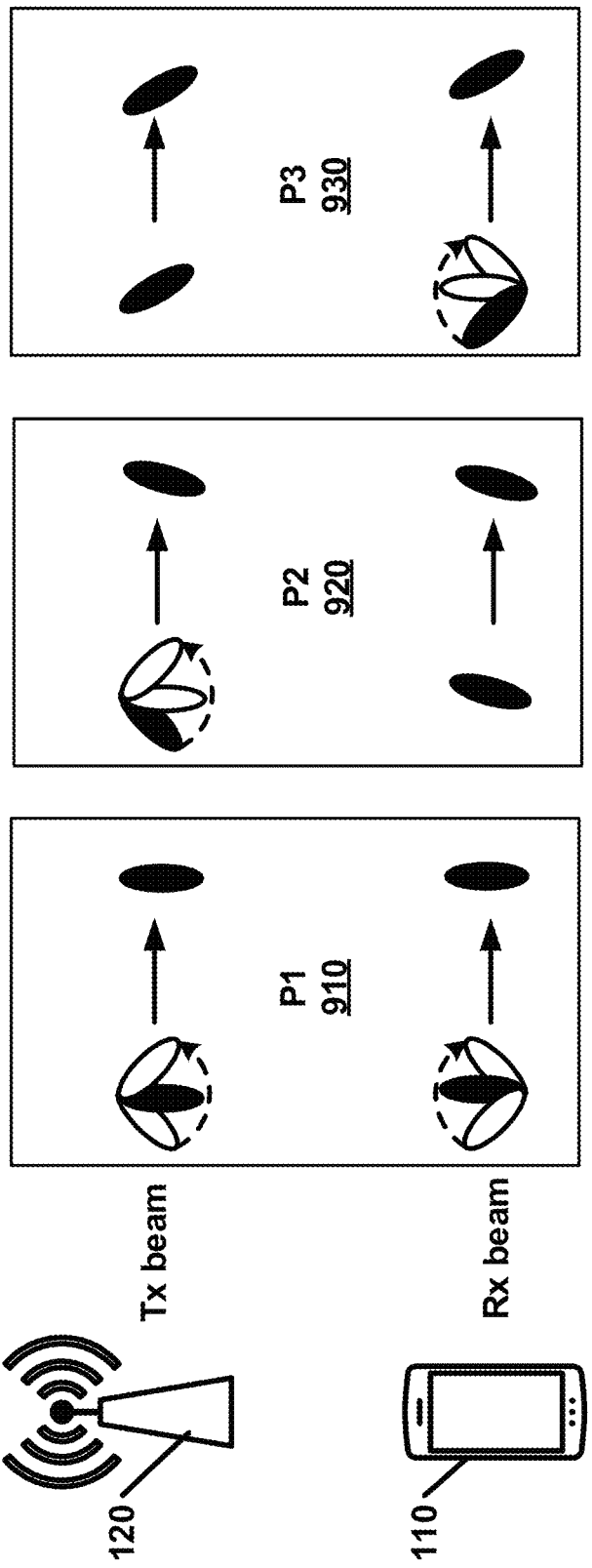
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth (s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
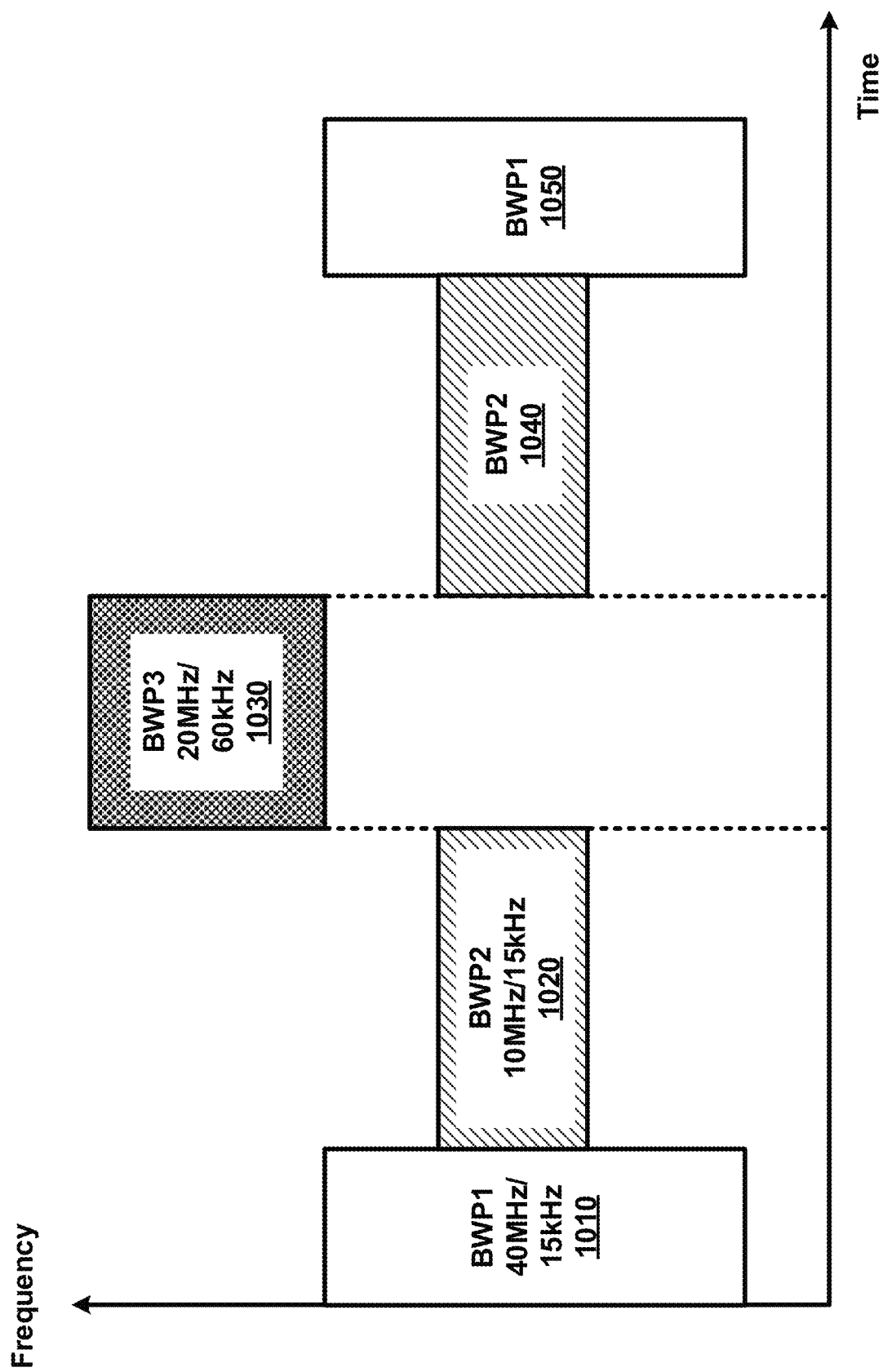
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; DCI detection to a PDSCH reception timing; a PDSCH reception to a HARQ-ACK transmission timing value; DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
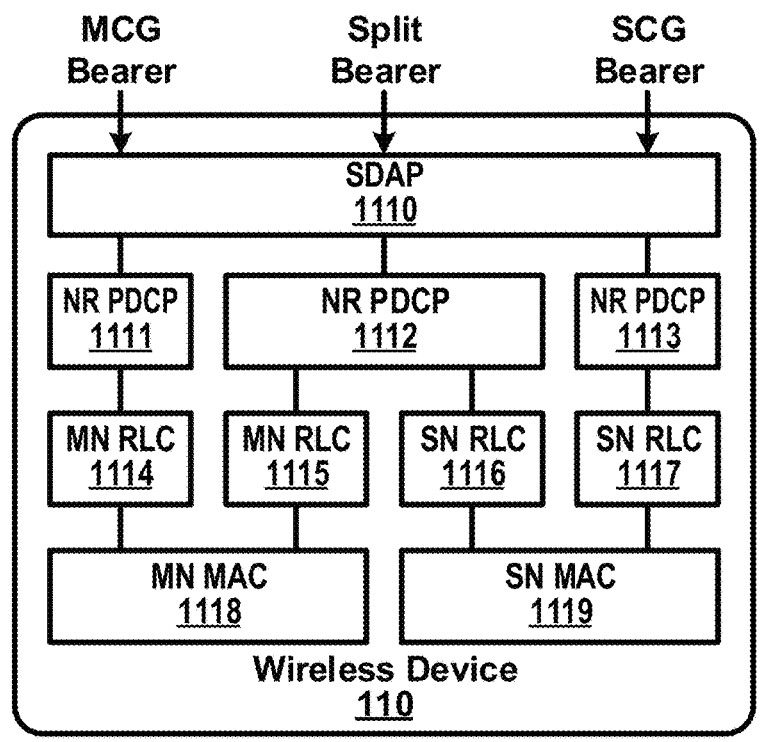
FIG. 11A and FIG. 11B show examples of multi connectivity.
Figure 11B:
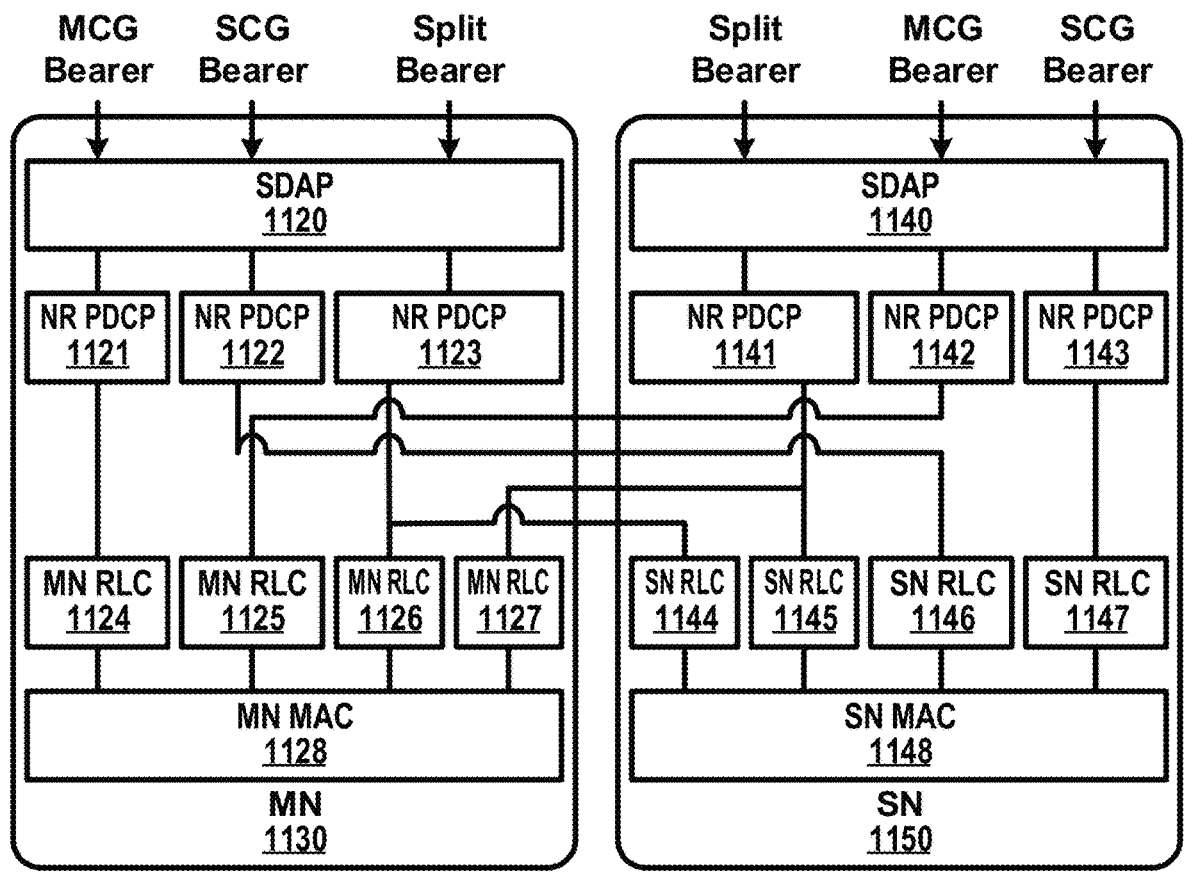

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1118).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
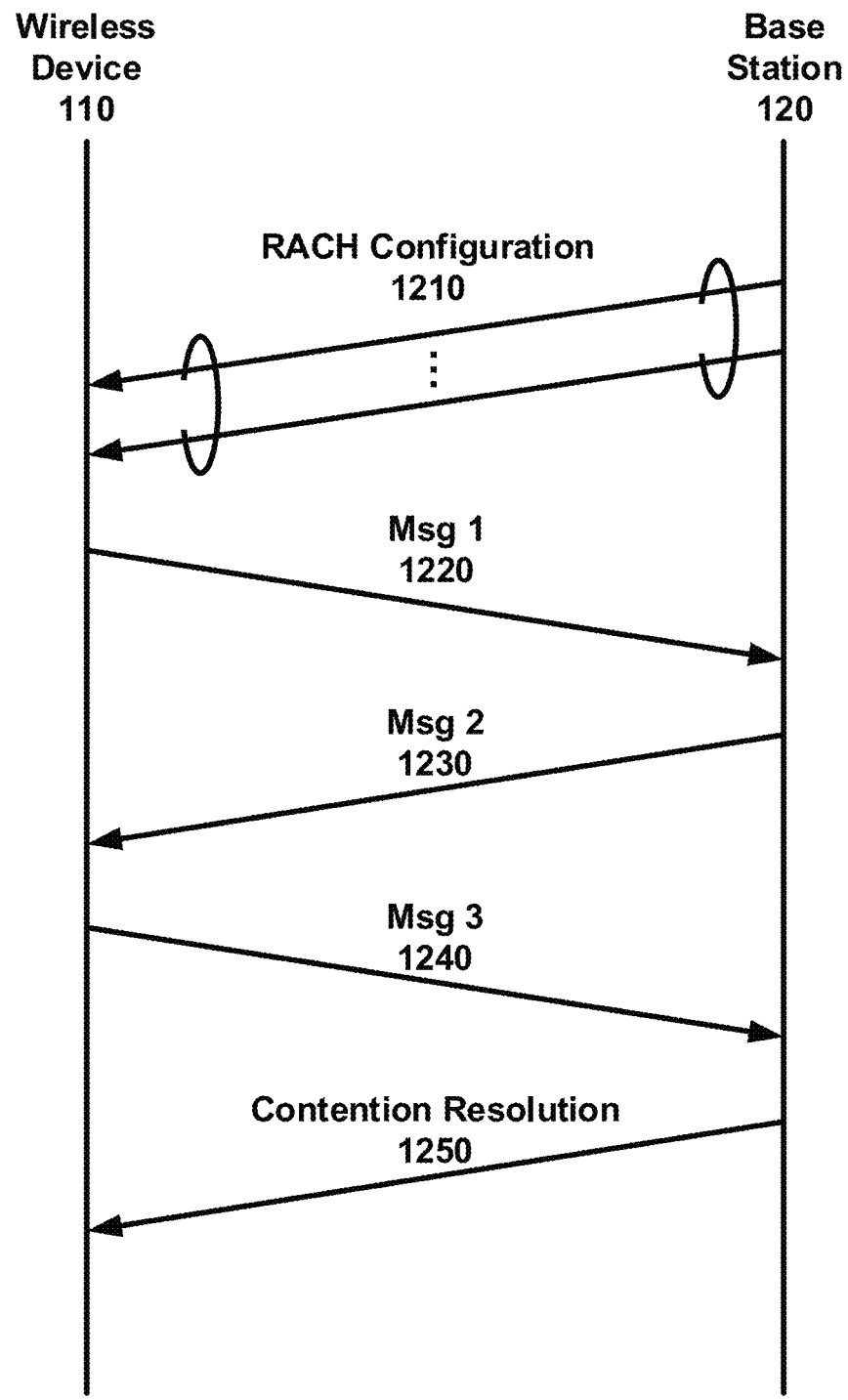
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery (BFR) procedure and corresponding PRACH resource(s) (e.g., if any), a time window to monitor RA response(s), a time window to monitor response(s) on a BFR procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a BFR procedure associated with at least one of SS blocks and/or CSI-RSs. A wireless device may select a random access preamble index corresponding to a selected SS block or a CSI-RS from a set of one or more random access preambles for a BFR procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a BFR procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-Response Window) to monitor a random access response. For a BFR procedure, the base station may configure the wireless device with a different time window (e.g., bfr-Response Window) to monitor response on a BFR procedure. The wireless device may start a time window (e.g., ra-ResponseWindow or bfr-Response Window) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a BFR procedure identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a BFR procedure and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1240, the wireless device may determine that the contention resolution (e.g., comprising contention resolution 1250) is successful and/or the wireless device may determine that the random access procedure is successfully completed.

Figure 13:
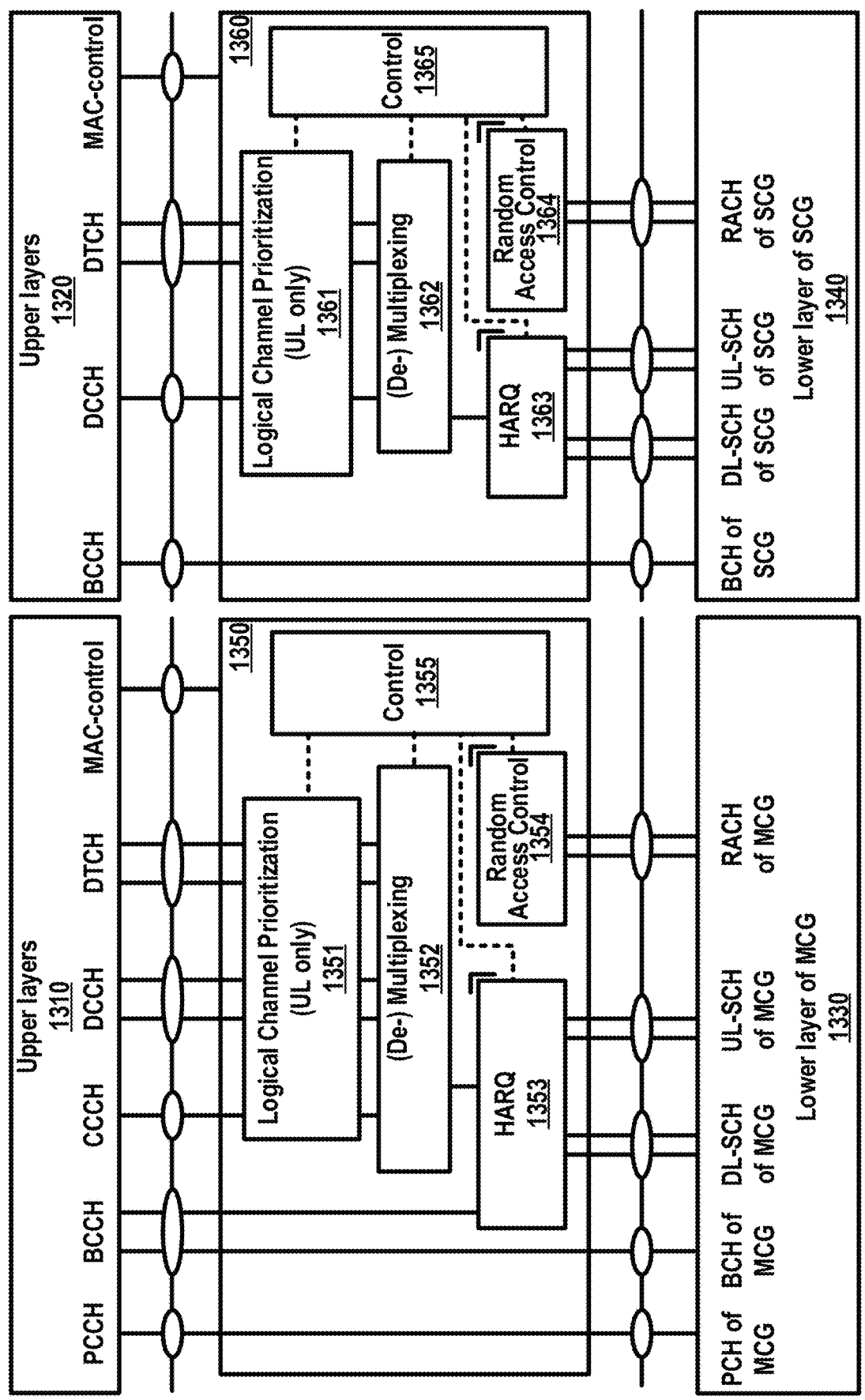
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
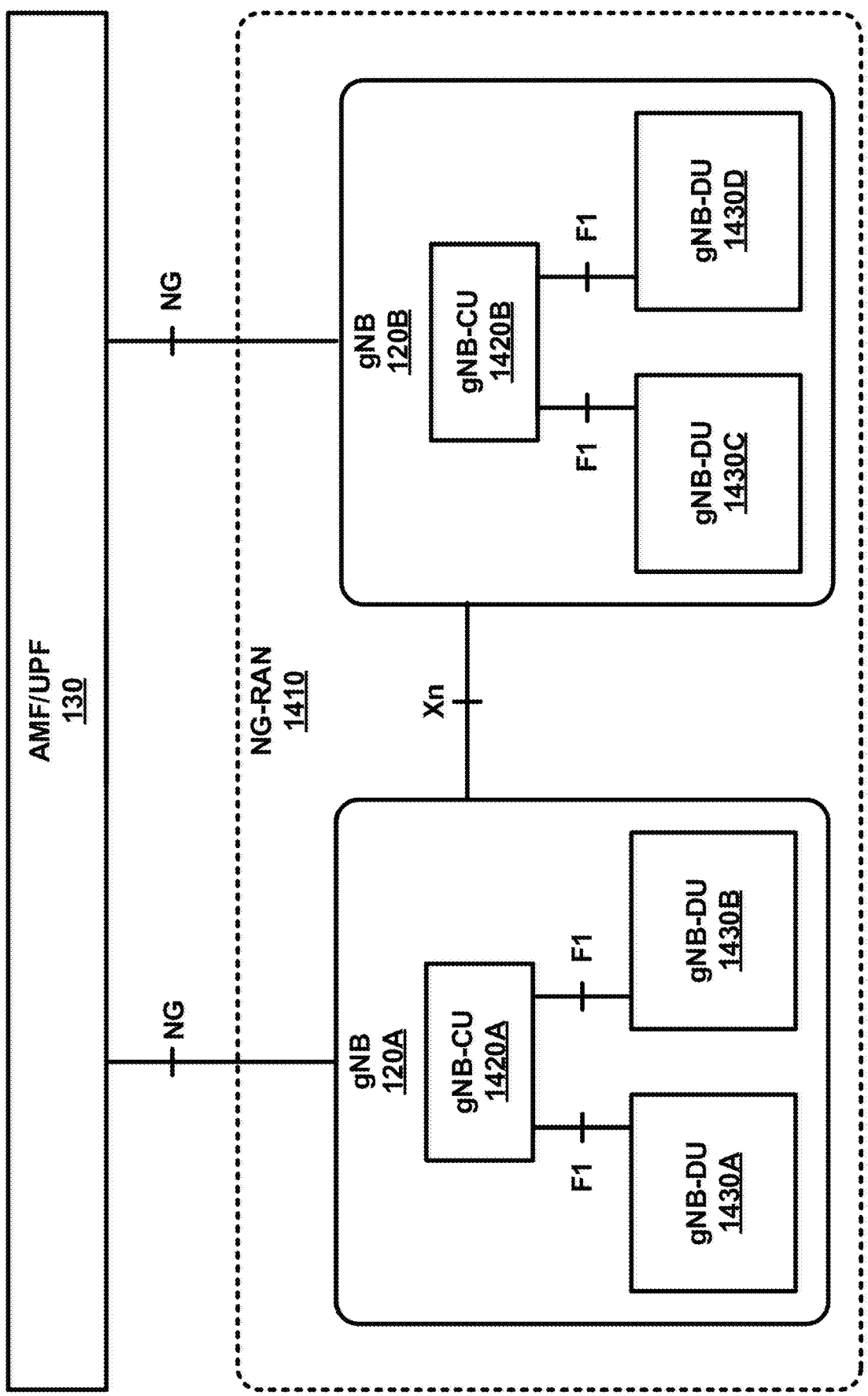
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
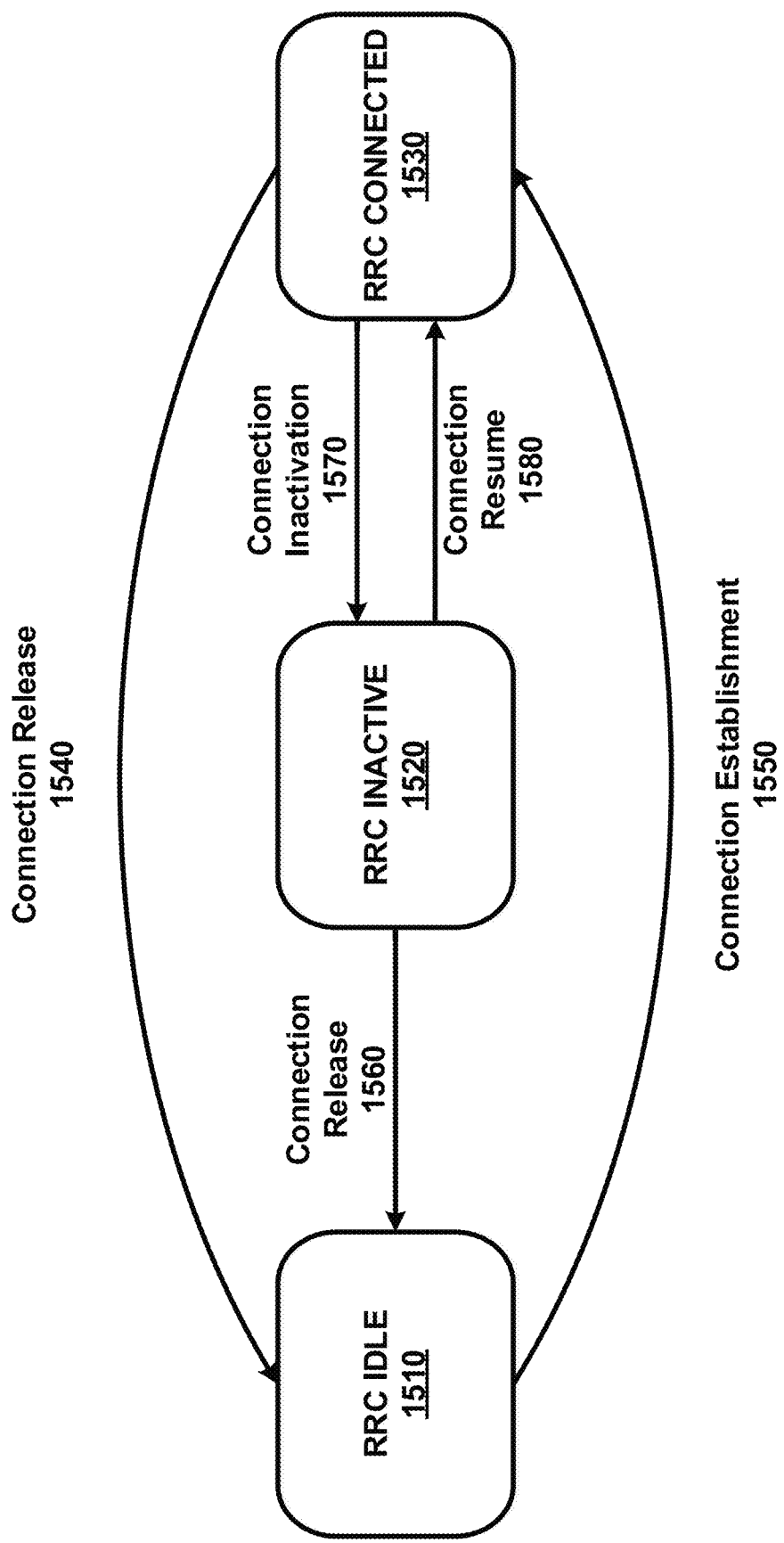
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station, for example, a base station CU, may initiate PDCP duplication (e.g., PDCP packet duplication) for a bearer for a wireless device. The bearer may be an SRB and/or a DRB. A base station CU may, for example, initiate PDCP duplication for the bearer to increase a transmission reliability by creating a diversity gain of multiple packet transmission paths for packets (e.g., a first path for original packets and a second path for duplicated packets (e.g., duplicated versions of the original packets)). The bearer may, for example, be used for ultra-reliable low-latency communications (URLLC) services.

If duplication is configured for a bearer via an RRC layer, an additional RLC entity and/or an additional logical channel may be configured for the radio bearer to handle duplicated PDCP PDUs. PDCP packet duplication may comprise sending the same PDCP PDUs at least twice: once by the original RLC entity and a second time by the additional RLC entity. By allowing two independent transmission paths, packet duplication may increase reliability and may reduce latency by reducing packet retransmission delays. PDCP duplication may be beneficial for a variety of services such as, for example, URLLC services. Original PDCP PDUs and corresponding duplicate PDCP PDUs may be sent (e.g., transmitted) on different carriers. Two different logical channels may belong to a same MAC entity (e.g., if CA is used) and/or to different MAC entities (e.g., if DC is used). If CA is used, logical channel mapping restrictions may be used by a MAC entity to avoid a logical channel carrying the original PDCP PDUs and a logical channel carrying the corresponding PDCP PDUs being sent on the same carrier.

If PDCP packet duplication is configured and, for example, for uplink packet transmissions, packet duplication may be activated and/or de-activated per DRB (and/or SRB) by using a MAC control element (MAC CE). If CA is used, and if duplication is deactivated, logical channel mapping restrictions may be lifted. If DC is used, a wireless device (e.g., a UE) may apply MAC CE commands regardless of the origin(s) (e.g., a MCG and/or an SCG) of those MAC CEs.

If one or more DRBs are configured with PDCP packet duplication, a network may, for example, activate and deactivate the PDCP packet duplication for the configured DRB(s). Uplink PDCP packet duplication for the configured DRB(s) may be activated and deactivated based on sending, to a wireless device, a duplication activation/deactivation MAC CE. A MAC entity processing the duplication activation/deactivation MAC CE may be for a DRB configured with duplication. If a duplication activation/deactivation MAC CE is received activating the PDCP duplication of the DRB, for example, the MAC entity may indicate the activation of PDCP packet duplication of the DRB to upper layers and/or may apply the allowedServingCells parameter(s) (e.g., received in one or more configuration messages) to the logical channels of the DRB. If a duplication activation/deactivation MAC CE is received deactivating PDCP packet duplication for the DRB, the MAC entity may indicate the deactivation of PDCP packet duplication of the DRB to upper layers and/or may refrain from applying the allowedServingCells parameter(s) to the logical channels of the DRB.

FIG. 16A shows an example duplication activation/deactivation MAC CE. A duplication activation/deactivation MAC CE may have a fixed size. As shown in FIG. 16A, a duplication activation/deactivation MAC CE may comprise a single octet containing eight D-fields. Di may indicate that the activation/deactivation status of PDCP packet duplication for DRB i, and i may be the ascending order of DRB IDs configured with packet duplication. The Di field may be set to one to indicate that PDCP packet duplication of DRB i may be activated. The Di field may be set to zero to indicate that PDCP packet duplication of DRB i may be deactivated.

FIG. 16B shows example values for a Logical Channel IDentifier (LCID) field. A duplication activation/deactivation MAC CE may be part of a MAC PDU and may be indicated by a MAC PDU subheader with an LCID. The MAC subheader may comprise an LCID field identifying the logical channel instance of the corresponding MAC SDU, the type of the corresponding MAC CE, and/or padding for a DL-SCH. There may be one LCID field per MAC subheader. The LCID field size may be 6 bits. An LCID value for a subheader indicating a duplication activation/deactivation MAC CE may, for example, as shown in FIG. 16B, be 111000. An L (Length) field of the subheader may indicate the length of the corresponding MAC SDU or variable-sized MAC CE in bytes. There may be one L field per MAC subheader except for subheaders corresponding to fixed-sized MAC CEs or padding. The size of the L field may be indicated by an F (Format) field indicating the size of the Length field. There may be one F field per MAC subheader except for subheaders corresponding to fixed-sized MAC CEs or padding. The size of the F field may be 1 bit. The value 0 may indicate 8 bits of the Length field. The value 1 may indicate 16 bits of the Length field. An R (Reserved bit) of the MAC subheader maybe set to zero. The MAC subheader may be octet aligned.

If two UL General Packet Radio Service (GPRS) Tunneling Protocol (GTP) Tunnel Endpoint IEs are included in a UE CONTEXT SETUP REQUEST message for a DRB, a DU (e.g., a gNB-DU) may include two DL GTP Tunnel Endpoint IEs in a UE CONTEXT SETUP RESPONSE message. A CU (e.g., a gNB-CU) and/or a DU (e.g., gNB-DU) may use the UL GTP Tunnel Endpoint IEs and DL GTP Tunnel Endpoint IEs to support packet duplication for intra-DU (e.g., intra-gNB-DU) CA.

A base station may, for example, if PDCP packet duplication is configured for a bearer of a wireless device, activate or deactivate PDCP packet duplication. The base station may, for example, activate packet duplication for the bearer based on: one or more radio conditions, status of one or more resources, and/or one or more configuration policies. If a radio quality for a wireless device decreases (e.g., below a predetermined level and/or based on one or more measurements), a base station may activate PDCP packet duplication (e.g., for uplink and/or downlink PDCP packets) of a bearer. PDCP packet duplication may be used, for example, for high reliability and/or low latency services. A base station may deactivate PDCP packet duplication for a bearer if, for example, resources of a network (e.g., of the base station and/or of the wireless device) are determined insufficient to support PDCP packet duplication.

Functions of a base station may be separately performed by different network nodes. Functions of a base station may station may, for example, be performed by a base station CU and at least one base station DU. Functions of a base station CU may be further divided, for example, between a central unit user plane (CU-UP) node and central unit control plane (CU-CP) node. A CU-CP node may, for example, perform an RRC function. A CU-UP node may, for example, control upper layer user plane functions (e.g., one or more PDCP layer functions, and/or one or more SDAP layer functions). A DU may control lower layer functions (e.g., one or more physical layer functions, one or more MAC layer functions, and/or one or more RLC layer functions).

A CU-UP node controlling a PDCP layer may perform duplication of at least downlink PDCP packets if PDCP packet duplication is activated for a bearer and/or for a wireless device. A CU-UP node may activate PDCP packet duplication without status information for other network nodes (e.g., for a DU, a CU-CP node, and/or a wireless device) that control operations that may be affected by, and/or that may have an effect on, PDCP packet duplication. Without such status information, a CU-UP node may activate and/or maintain PDCP packet duplication during periods when packet duplication is undesirable. If a DU is in a high traffic load state, for example, there may be insufficient resources to support packet duplication. Use of packet duplication under such circumstances may lead to call dropping and/or other losses of service. If radio link quality is sufficiently good, packet duplication may provide little or no advantage (e.g., there may be little or no packet loss on a single bearer), and using resources for unnecessary packet duplication may reduce resources available for allocation to communications to or from other devices. A CU-UP node without status information from other nodes may also or alternatively deactivate PDCP packet duplication during periods (e.g., if a DU is not in a high traffic load state and/or if radio link quality is not good) packet duplication may be desirable.

Communication reliability and/or resource utilization efficiency may be adversely affected if status information is unavailable for determining packet duplication activation and/or deactivation. Without such information and/or signaling mechanisms facilitating coordination of operations (e.g., packet duplication activation/deactivation) among split base station nodes (e.g., a CU-CP node, a CU-UP node, and/or a DU) decreased reliability and inefficient resource utilization may increase call dropping rate, may increase packet transmission delay, and/or may otherwise impact services requiring high reliability and/or low latency.

One or more of these problems may be avoided and/or reduced by improved PDCP packet duplication signaling. A CU-CP node may, for example, determine activation and/or deactivation of PDCP packet duplication based on radio channel quality and/or based on traffic load status of a DU and/or of a wireless device. Based on such a determination, the CU-CP node may send, to a CU-UP node, an activation/deactivation indication for PDCP packet duplication. The CU-UP node may activate and/or deactivate PDCP packet duplication based on the activation/deactivation indication received from CU-CP node, thereby facilitating activation and/or deactivation based on radio channel quality and/or traffic load status, and allowing increased resource utilization efficiency and/or increased packet transmission reliability.

A CU-UP node may also or alternatively determine activation and/or deactivation of PDCP packet duplication. The CU-UP node may determine such activation and/or deactivation based on status information received, for example, from a CU-CP node. Determining activation and/or deactivation based on such status information may facilitate activation and/or deactivation based on radio channel quality and/or traffic load status, and may allow increased resource utilization efficiency and/or increased packet transmission reliability. A CU-UP node that determines activation and/or deactivation may also or alternatively inform the CU-CP node of such determination, thereby allowing, for example, more efficient allocation of resources.

A DU may also or alternatively determine activation and/or deactivation of PDCP packet duplication. The DU may determine such activation and/or deactivation based on status information received, for example, from a CU-CP node and/or from a wireless device. Determining activation and/or deactivation based on such status information may facilitate activation and/or deactivation based on radio channel quality and/or traffic load status, and may allow increased resource utilization efficiency and/or increased packet transmission reliability. A DU that determines activation and/or deactivation may also or alternatively inform the CU-CP node of such determination, thereby allowing, for example more efficient allocation of resources.

Figure 17:
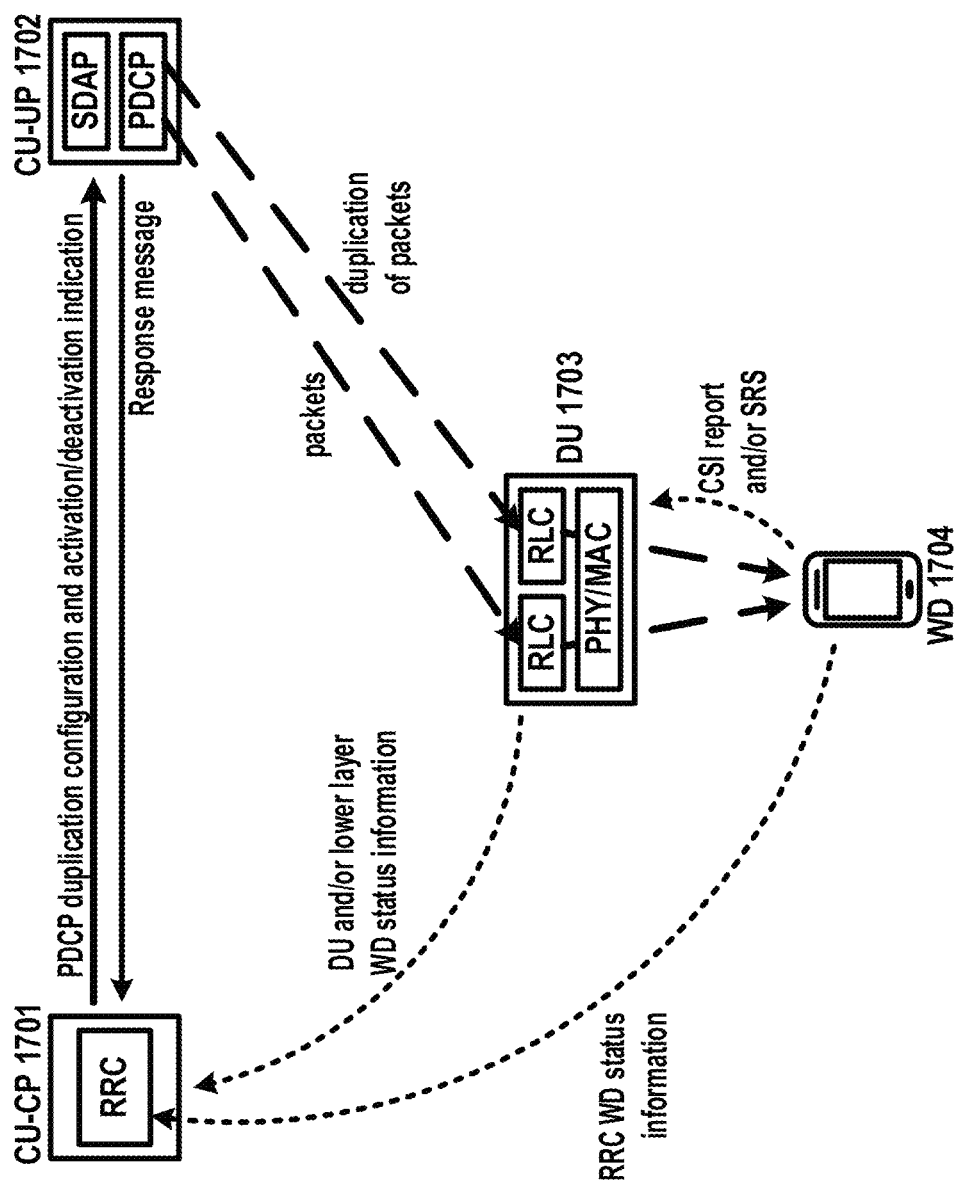
FIG. 17 shows example nodes that may be associated with PDCP packet duplication.

FIG. 17 shows example nodes (e.g., an example CU-CP node, an example CU-UP node, an example DU, and an example wireless device) that may be associated with PDCP packet duplication. In FIG. 17 and in various other figures WD is used as an abbreviation for wireless device (e.g., UE). A base station may comprise a CU-CP node 1701, a CU-UP node 1702, and/or one or more DUs 1703. The DU 1703 may communicate with a wireless device 1704 (e.g., a UE). The CU-CP node 1701 and the CU-UP node 1702 may, for example, be nodes of a CU such as the gNB-CU 1420A or the gNB-CU 1420B of FIG. 14. The DU(s) 1703 may, for example, be one or more of the gNB-DUs 1430A, 1430B, 1430C, or 1430D of FIG. 14. The wireless device 1704 may be one of the wireless devices described in connection with other figures described herein. The CU-CP node 1701 may comprise upper layer control plane functions (e.g., RRC functions). The CU-UP node 1702 may comprise upper layer user plane functions (e.g., SDAP functions and/or PDCP functions). The DU 1703 may comprise lower layer functions (e.g., RLC functions, MAC functions, and/or PHY functions). PDCP packets (e.g., PDCP PDUs and/or PDCP SDUs) may be sent (e.g., transmitted) via an interface (e.g., an F1 user plane interface (and/or an interface between the CU-CP node 1701 and the DU 1703)) between the CU-UP node 1702 (and/or the CU-CP node 1701) and the DU 1703. As shown in FIG. 17 with large-dash broken lines, DL PDCP duplicate packets may be generated and sent, with original PDCP packets, by the CU-UP node 1702 to the DU 1703, which may forward those original and duplicate packets to the wireless device 1704. DL original and duplicate PDCP packets may also or alternatively be generated and sent (e.g., transmitted) by the CU-CP node 1701 to the DU 1703, which may forward such packets to the wireless device 1704. The wireless device 1704 may also or alternatively generate original and duplicate UL PDCP packets and send those packets to the DU 1703, which may forward those UL packets to the CU-UP node 1702 (and/or to the CU-CP node 1701).

The CU-CP node 1701 may send one or more messages to the CU-UP node 1702 to configure, activate, and/or deactivate PDCP packet duplication. The CU-CP node 1701 may, for example send one or more messages to configure PDCP packet duplication for a bearer (e.g., by indicating a bearer, a logical channel, a QoS flow, and/or a PDU session) for the wireless device 1704. That bearer may comprise a packet flow to provide one or more URLLCs, one or more vehicle communications, one or more emergency services communications, one or more drone control communications, one or more remote control communications, and/or one or more other services for the wireless device 1704. The bearer may comprise at least one of an SRB or a DRB.

FIG. 18 shows an example initial context setup request message. A bearer (e.g., for which PDCP packet duplication is being configured) may comprise one or more packet flows of a PDU session for the wireless device 1704. The PDU session may be configured based on a context setup request message from a core network entity (e.g., an AMF and/or a MME) for the wireless device. The context setup request message may be an initial context setup request message (e.g., as shown in FIG. 18) and/or a wireless device (e.g., UE) context modification request message. The CU-UP node 1702 may send one or more response messages to the CU-CP node 1701 based on receiving one or more messages to configure, activate, and/or deactivate PDCP packet duplication.

As shown in FIG. 17 with small-dash broken lines, and as further described below, information (e.g., status information) may be communicated by the wireless device 1704 to the DU 1703 and/or the CU-CP node 1701, and/or from the DU 1703 to the CU-CP node 1701. The wireless device 1704 may, for example, send one or more CSI reports and/or SRSs to the DU 1703 and/or send (e.g., via the DU 1703) RRC UE status information to the CU-CP 1701. The DU 1703 may, for example, send DU and/or lower layer wireless device (e.g., UE) status information to the CU-CP node 1701.

Figure 19:
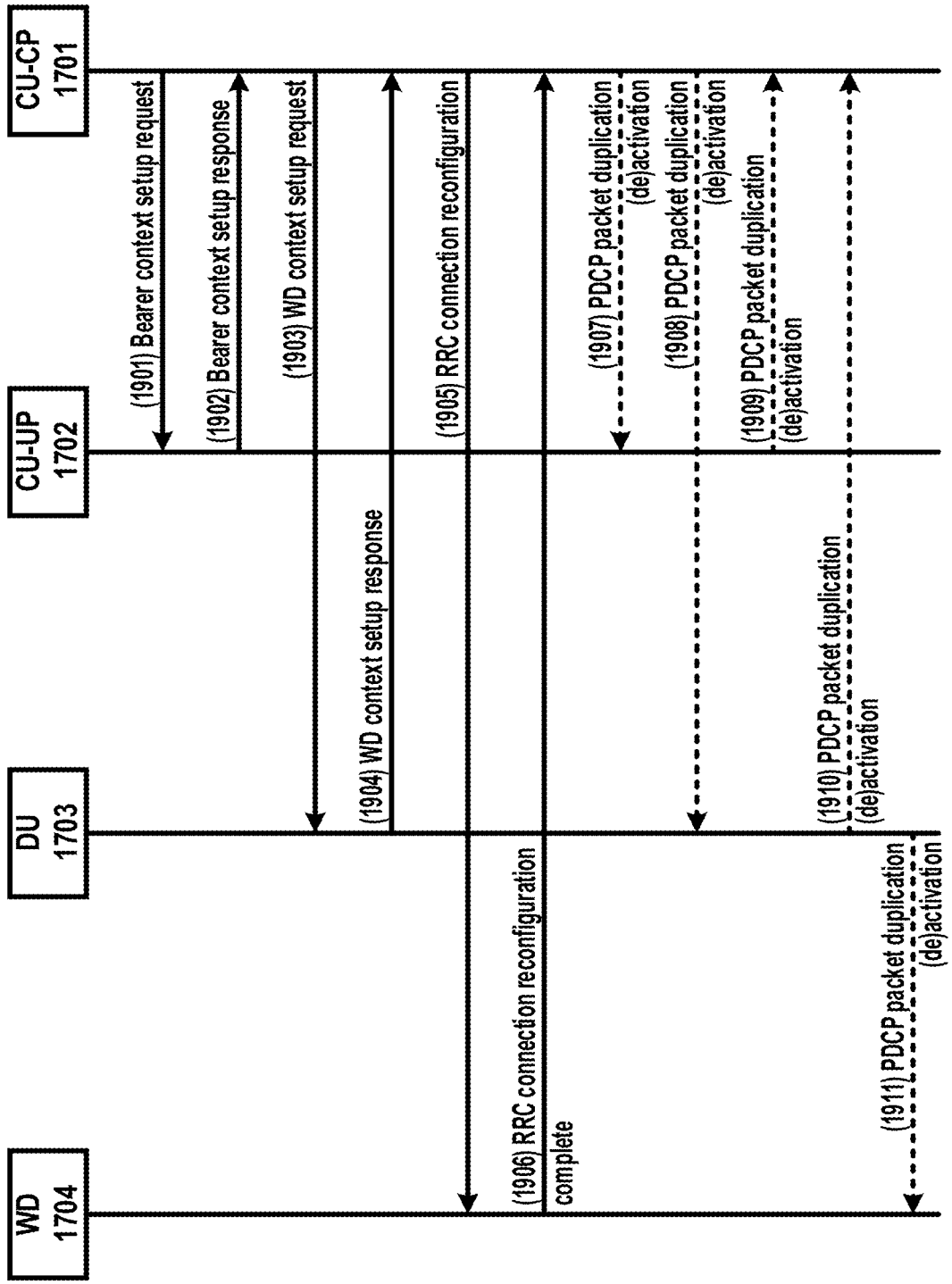
FIG. 19 shows an example method for PDCP packet duplication configuration, activation, and/or deactivation.

FIG. 19 shows an example method, for PDCP packet duplication configuration, activation, and/or deactivation, that may be performed by one or more of the CU-CP node 1701, the CU-UP node 1702, the DU 1703, and/or the wireless devices 1704, and/or by one or more other nodes. The CU-CP node 1701 may send (e.g., transmit), to the CU-UP node 1702, one or more messages 1901 indicating a bearer configuration request for the wireless device 1704. The bearer configuration request of the message(s) 1901 may be associated with at least a first bearer for which PDCP packet duplication is being configured. The first bearer may comprise a bearer configured for E-UTRAN and/or NG-RAN. The message(s) 1901 may comprise a bearer context setup request message (e.g., as shown in FIG. 20), a bearer context modification request message, a bearer context modification confirm message, and/or other type(s) of message(s). The message(s) 1901 may comprise a PDCP configuration parameter indicating that PDCP packet duplication is configured for the first bearer. A PDCP-Config (e.g., an RRC information element (IE)) of the message(s) 1901 may, for example, comprise the PDCP configuration parameter. A pdcp-Duplication IE of a PDCP-Config IE (see, e.g., ">>>>PDCP Configuration" in FIG. 20) may, for example, indicate ENUMERATED {true}, indicating that PDCP packet duplication is configured for the first bearer.

The message(s) 1901 may, for example, comprise an information element explicitly indicating activation or deactivation of uplink and/or downlink PDCP packet duplication of the first bearer (e.g., the bearer for which PDCP packet duplication is being configured). Also or alternatively, uplink and/or downlink PDCP packet duplication may be implicitly activated or deactivated via the message(s) 1901. Implicit activation may occur, for example, if the CU-UP node 1702 is configured to determine, based on receiving one or more messages 1901 indicating that PDCP packet duplication is configured, that PDCP packet duplication is initially activated for uplink and/or downlink based on that initial configuration. Implicit deactivation may occur, for example, if the CU-UP node 1702 is configured to determine, based on receiving the message(s) 1901 indicating that PDCP packet duplication is configured, that PDCP packet duplication is initially deactivated for uplink and/or downlink based on that configuration.

The message(s) 1901 may, for example, comprise at least one of: a wireless device identifier (e.g., a gNB-CU-CP UE EIAP ID, a gNB-CU-UP UE EIAP ID, an IMEI, and/or a TMSI) of the wireless device 1704, a bearer identifier of the first bearer (e.g., the bearer for which PDCP packet duplication is being configured), one or more bearer identifiers of one or more other bearers requested to be setup, modified, and/or removed, one or more identifiers of one or more PDU sessions, and/or one or more identifiers of one or more QoS flows requested to setup, modified, and/or removed. The message(s) 1901 may also or alternatively comprise, for example, one or more PDCP configuration information elements of the first bearer, QoS information (e.g., QCI, ARP, 5QI, session AMBR, and/or other information) of the first bearer and/or of other bearer(s), PDU session(s), and/or QoS flow(s) requested to be setup and/or modified, S1/NG uplink user plane transport layer information (e.g., a tunnel endpoint identifier, an IP address of an S-GW, and/or a UPF), and/or data forwarding information. The message(s) 1901 may also or alternatively comprise, for example, cell group information (e.g., an MCG and/or an SCG), a PDU session identifier of a PDU session associated with the first bearer, and/or one or more network slice identifiers (e.g., an NSSAI and/or a single-NSSAI (S-NSSAI)) of one or more network slices associated with the first bearer and/or with other bearer(s), with one or more PDU sessions, and/or with one or more QoS flows. The message(s) 1901 may also or alternatively comprise, for example, flow mapping information and/or other information.

The message(s) 1901 may, for example, comprise a first logical channel identifier of a first logical channel for PDCP packets of the first bearer (e.g., the bearer for which PDCP packet duplication is being configured) and/or a second logical channel identifier of a second logical channel for duplicated PDCP packets of the first bearer. The message(s) 1901 may, for example, comprise a DL tunnel endpoint identifier (TEID) of a first tunnel for PDCP packets of the first bearer and/or a second DL TEID of a second tunnel for duplicated PDCP packets of the first bearer. The first DL TEID and/or the second DL TEID may comprise addresses (e.g., IP addresses) of a DU (e.g., of the DU 1703). The CU-UP node 1702 may send (e.g., transmit) PDCP packets (e.g., original PDCP packets) of the first bearer to the first DL TEID, and/or may (e.g., if PDCP packet duplication is activated) send (e.g., transmit) duplicated PDCP packets (e.g., duplicated versions of the original packets) of the first bearer to the second DL TEID. The CU-CP node 1701 may receive the first DL TEID and/or the second DL TEID from the DU (e.g., the DU 1703). The first DL TEID and/or the second DL TEID may also or alternatively be sent (e.g., transmitted), from the CU-CP node 1701 to the CU-UP node 1702, via another message different from the message(s) 1901. The first DL TEID and/or the second DL TEID may, for example, be sent via one or more messages 1907 (described below), one or more messages 2103 (FIG. 21), one or more messages 2107 (FIG. 21), one or more messages 2205 (FIG. 22), and/or one or more messages 2209 (FIG. 22).

The CU-UP node 1702 may, for example, based on receiving the message(s) 1901, configure a first packet flow (e.g., a tunnel, a logical channel, a bearer, a QoS flow, and/or a PDU session) for PDCP packets of the first bearer (e.g., the bearer for which PDCP packet duplication is being configured) and/or may configure a second packet flow (e.g., a tunnel, a logical channel, a bearer, a QoS flow, and/or a PDU session) for duplicated PDCP packets of the first bearer. The CU-UP node 1702 may, for example, based on receiving the message(s) 1901, configure a first UL TEID of a first tunnel for PDCP packets (e.g., packets, PDCP PDUs and/or PDCP SDUs) of the first bearer and/or a second UL TEID of a second tunnel for duplicated PDCP packets (e.g., duplicated packets, PDCP PDUs, and/or PDCP SDUs) of the first bearer. The CU-UP node 1702 may, for example, based on the message(s) 1901 and/or on configuration performed based on the message(s) 1901, send (e.g., transmit), to the CU-CP node 1701, one or more messages 1902 indicating that the PDCP packet duplication of the first bearer has been set up (e.g., configured) by the CU-UP node 1702. The message(s) 1902 may, for example, further indicate that a bearer configuration request (e.g., of the message(s) 1901) for the wireless device 1704 is accepted (e.g., allowed and/or configured at the CU-UP node 1702). The message(s) 1902 may comprise at least one of a bearer context setup response message, a bearer context modification response message, a bearer context modification required message, and/or other type of message.

The message(s) 1902 may, for example, further comprise the first UL TEID of the first tunnel for PDCP packets of the first bearer and/or the second UL TEID of the second tunnel for duplicated PDCP packets of the first bearer for the wireless device. The DU 1703 may send (e.g., transmit) PDCP packets (e.g., original PDCP packets) of the first bearer to the first UL TEID, and/or may (e.g., if PDCP packet duplication is activated) send (e.g., transmit) duplicated PDCP packets of the first bearer to the second UL TEID. The DU 1703 may receive the first UL TEID and/or the second UL TEID from the CU-CP node 1701. The first UL TEID and/or the second UL TEID may comprise addresses (e.g., IP addresses) of the CU-UP node 1702. The first UL TEID and/or the second UL TEID, if present in the message(s) 1902, may indicate that PDCP packet duplication for the first bearer is setup (e.g., configured) at the CU-UP node 1702.

The message(s) 1902 may, for example, comprise at least one of: the wireless device identifier (e.g., a gNB-CU-CP UE EIAP ID, a gNB-CU-UP UE EIAP ID, a IMEI, and/or a TMSI) of the wireless device 1704, the first bearer identifier of the first bearer (e.g., the bearer for which PDCP packet duplication is being configured), one or more bearer identifiers of one or more bearers for which setup or modification failed or succeeded, one or more identifiers of one or more PDU sessions and/or one or more QoS flows for which setup or modification failed or succeeded, and/or one or more failure causes for bearer(s), PDU session(s), and/or QoS flows for which setup or modification failed. The message(s) 1902 may also or alternatively comprise, for example, PDCP configuration result information of the first bearer and/or QoS information (e.g., QCI, ARP, 5QI, session AMBR, and/or other information) of one or more bearers, one or more PDU sessions, and/or one or more QoS flows to be setup and/or modified. The message(s) 1902 may also or alternatively comprise, for example, S1/NG downlink user plane transport layer information (e.g., a tunnel endpoint identifier and/or an IP address of the CU-UP node 1702), uplink user plane transport parameters comprising user plane transport layer information and/or cell group identifiers, data forwarding information, cell group information (e.g., MCG and/or SCG), the PDU session identifier of the PDU session associated with the first bearer, the network slice identifier (e.g., an NSSAI and/or an S-NSSAI) of the network slice associated with the first bearer, one or more network slice identifiers of one or more network slices associated with the one or more other bearers, flow mapping information, and/or other information.

The CU-UP node 1702 may, for example, based on the CU-UP node 1702 status, determine to setup, modify, and/or fail one or more bearers, one or more PDU sessions, one or more QoS flows, and/or the PDCP duplication configuration of the first bearer requested by the CU-CP node 1701. The status of the CU-UP node 1702 may, for example, comprise a network resource status, a processing resource status (e.g., CPU, RAM, bus, and/or other system capacity), an interface congestion status of NG, F1, and/or S1 interfaces, bearer priority information (e.g., a bearer QoS level and/or a network slice priority of the bearer), and/or other information. If, for example, the network resources of the CU-UP node 1702 are not sufficient to serve all requested elements (e.g., all bearers, PDU sessions, QoS flows, and/or PDCP duplication), the CU-UP node 1702 may determine to fail one or more of the requested elements and may indicate the determined failure to the CU-CP node 1701 via the message(s) 1902.

The CU-CP node 1701 may, for example, send (e.g., transmit) one or more messages 1903 indicating a bearer configuration request for the first bearer (e.g., the bearer for which PDCP packet duplication is being configured) of the wireless device. The CU-CP node 1701 may send (e.g., transmit) the message(s) 1903 to the DU 1703 based on receiving the message(s) 1902 from the CU-UP node 1702. Alternatively, the CU-CP node 1701 may send (e.g., transmit) message(s), similar to the message(s) 1903, to the DU 1703 before receiving messages, similar to the message(s) 1902, from the CU-UP node 1702. Also or alternatively, the CU-CP node 1701 may send (e.g., transmit) messages, similar to the message(s) 1902, to the DU 1703 before sending (e.g., transmitting) messages, similar to the message(s) 1901, to the CU-UP node 1702. The messages 1903, and/or other bearer configuration requests sent from the CU-CP node 1701 to the DU 1703, may indicate that PDCP packet duplication is configured for the first bearer of the wireless device. The message(s) 1903 may comprise the first UL TEID of the first tunnel for PDCP packets of the first bearer and/or the second UL TEID of the second tunnel for duplicated PDCP packets of the first bearer for the wireless device. The first UL TEID and/or the second UL TEID may be received, by the CU-CP node 1701, via the message(s) 1902 and/or via other message(s) from the CU-UP node 1702. The DU 1703 may, for example, based on the first UL TEID and/or the second UL TEID for the first bearer, recognize that PDCP duplication is configured for the first bearer. The DU 1703 may, for example, based on the message(s) 1903, send (e.g., transmit) PDCP packets (e.g., original PDCP packets) of the first bearer to the first UL TEID, and/or may (e.g., if packet duplication is activated) send (e.g., transmit) duplicated PDCP packets of the first bearer to the second UL TEID.

The message(s) 1903 may, for example, comprise at least one of a wireless device (e.g., UE) context setup request message, a wireless device (e.g., UE) context modification request message, a wireless device (e.g., UE) context modification confirm message, and/or another type of message. Also or alternatively, the message(s) 1903 may comprise at least one of: a wireless device identifier (e.g., a gNB-CU-UE F1AP ID, a gNB-DU UE F1AP ID, an IMEI, and/or a TMSI) of the wireless device 1704, an SpCell identifier, one or more candidate SpCell identifiers of one or more candidate SpCells, CU-to-DU RRC information, DRX cycle information, a resource coordination transfer container, and/or one or more SCell (secondary cell) identifiers of one or more SCells to be setup. Also or alternatively, the message(s) 1903 may comprise one or more bearer identifiers of one or more bearers (e.g., DRB, SRB) to be setup, modified, and/or removed, may comprise one or more identifiers of one or more PDU sessions and/or one or more QoS flows requested to be setup, modified, and/or removed, may comprise one or more QoS information of the one or more bearers to be setup and/or modified, and/or may comprise one or more tunnel information associated with the one or more bearers to be setup and/or modified. Also or alternatively, the message(s) 1903 may comprise one or more network slice identifiers (e.g., an NSSAI, and/or an S-NSSAI) of one or more network slices associated with the first bearer, with one or more other bearers (e.g., other bearers indicated in the message(s) 1903 for setup, modification, and/or removal), with one or more PDU sessions (e.g., other PDU sessions indicated in the fourth message(s) 1903 for setup, modification, and/or removal), and/or with one or more QoS flows (e.g., QoS flows indicated in the message(s) 1903 for setup, modification, and/or removal), may comprise RLC mode information of one or more bearers, may comprise uplink configuration information of one or more bearers, and/or may comprise other information.

The DU 1703 may, for example, based on receiving the message(s) 1903, configure a first packet flow (e.g., a tunnel, a logical channel, a bearer, a QoS flow, and/or a PDU session) for PDCP packets of the first bearer and/or may configure a second packet flow (e.g., a tunnel, a logical channel, a bearer, a QoS flow, and/or a PDU session) for duplicated PDCP packets of the first bearer. The DU 1703 may, for example, based on receiving the message(s) 1903, configure a first DL TEID of a first tunnel for PDCP packets (e.g., packets, PDCP PDUs, and/or PDCP SDUs) of the first bearer and/or a second DL TEID of a second tunnel for duplicated PDCP packets (e.g., duplicated packets, PDCP PDUs, and/or PDCP SDUs) of the first bearer. The first DL TEID and/or the first UL TEID may, for example, be associated with the first tunnel for PDCP packets of the first bearer. The second DL TEID and/or the second UL TEID may, for example, be associated with the second tunnel for duplicated PDCP packets of the first bearer.

The DU 1703 may, for example, based on the message(s) 1903, send (e.g., transmit), to the CU-CP node 1701, one or more message(s) 1904 indicating that the PDCP packet duplication of the first bearer (e.g., the bearer for which PDCP packet duplication is being configured) is set up (e.g., configured). The message(s) 1904 may, for example, further indicate that one or more requests of the message(s) 1903 (or other bearer configuration request for the wireless device) are accepted (e.g., allowed and/or configured at the DU 1703). The message(s) 1904 may, for example, comprise at least one of a wireless device (e.g., UE) context setup response message, a wireless device (e.g., UE) context modification response message, a wireless device (e.g., UE) context modification required message, and/or another type of message. The message(s) 1904 may, for example, indicate that PDCP packet duplication for the first bearer is setup (e.g., configured) at the DU 1703.

The message(s) 1904 may, for example, comprise the first DL TEID of the first tunnel for PDCP packets of the first bearer and/or the second DL TEID of the second tunnel for duplicated PDCP packets of the first bearer for the wireless device. The CU-UP node 1702 may, for example, send (e.g., transmit) downlink PDCP packets (e.g., original PDCP packets) of the first bearer to the first DL TEID, and/or may (e.g., if PDCP packet duplication is activated) send (e.g., transmit) duplicated downlink PDCP packets of the first bearer to the second DL TEID. The first DL TEID and/or the second DL TEID may comprise addresses (e.g., IP addresses) of the DU 1703. The first DL TEID and/or the second DL TEID may, for example, be sent (e.g., transmitted) from the DU 1703 to the CU-CP node 1701 via one or more other messages different from the message(s) 1904. The first DL TEID and/or the second DL TEID being present in the message(s) may, for example, indicate that PDCP packet duplication for the first bearer is setup (e.g., configured) at the DU 1703.

Also or alternatively, the message(s) 1904 may comprise at least one of: the wireless device identifier (e.g., a gNB-CU UE F1AP ID, a gNB-DU UE F1AP ID, an IMEI, and/or a TMSI) of the wireless device 1704, DU-to-CU RRC information, a resource coordination transfer container, and/or the bearer identifier of the first bearer (e.g., the bearer for which PDCP packet duplication is being configured). Also or alternatively, the message(s) 1904 may comprise one or more bearer identifiers of one or more other bearers (e.g., SRBs, DRBs) for which setup or modification failed or succeeded, one or more identifiers of one or more PDU sessions and/or of one or more QoS flows for which set or modification failed or succeeded, and/or one or more failure causes for one or more bearers, one or more PDU sessions, and/or the one or more QoS flows for which setup or modification failed. Also or alternatively, the message(s) 1904 may comprise QoS information (e.g., QCI, ARP, 5QI, session AMBR, and/or other information) of one or more bearers, or one or more PDU sessions, and/or of one or more QoS flows to be setup and/or modified, and/or may comprise downlink tunnel endpoint identifiers (e.g., IP addresses of the DU 1703) of one or more tunnels associated with one or more bearers, one or more PDU sessions, and/or of one or more QoS flows to setup and/or modify. Also or alternatively, the message(s) 1904 may comprise cell group information (e.g., MCG and/or SCG), the PDU session identifier of the PDU session associated with the first bearer, the network slice identifier(s) (e.g., an NSSAI and/or an S-NS-SAI) of the network slice associated with the first bearer and/or of one or more network slices associated with one or more other bearers, and/or flow mapping information.

The DU 1703 may, for example, based on the DU 1703 status, determine to setup, modify, and/or fail one or more bearers, one or more PDU sessions, one or more QoS flows, and/or the PDCP duplication configuration of the first bearer requested by the CU-CP node 1701. The status of the DU 1703 may, for example, comprise a network resource status, a radio resource status, a processing resource status (e.g., CPU, RAM, bus, and/or other system capacity), an interface congestion status of F1 and/or Uu interfaces, bearer priority information (e.g., a bearer QoS level and/or a network slice priority of the bearer), and/or other information. If, for example, the network resources of the DU 1703 are not sufficient to serve all requested elements (e.g., all bearers, PDU sessions, QoS flows, and/or PDCP duplication), the DU 1703 may determine to fail one or more of the requested elements and may indicate the determined failure to the CU-CP node 1701 via the message(s) 1904.

The CU-CP node 1701 may, for example, based on receiving the message(s) 1902 and/or the message(s) 1904, send (e.g., transmit), to the wireless device 1704, one or more messages 1905. The message(s) 1905 may comprise an RRC message (e.g., an RRC connection reconfiguration message) comprising a PDCP configuration parameter indicating that PDCP packet duplication is configured for the first bearer. The CU-CP node 1701 may send (e.g., transmit) the message(s) 1905 to the DU 1703 via an F1 interface message (e.g., a DL RRC message transfer message and/or a wireless device (e.g., UE) context modification request message), and the DU 1703 may forward the message(s) 1905 to the wireless device 1704. A PDCP-Config (e.g., an RRC IE) of the message(s) 1905 may comprise the PDCP configuration parameter. A pdcp-Duplication IE of the PDCP-Config IE may indicate ENUMERATED {true}, indicating that PDCP packet duplication is configured for the first bearer. The message(s) 1905 may further comprise a bearer identifier of the first bearer, a first logical channel identifier of a first logical channel for duplicated PDCP packets of the first bearer, a second logical channel identifier of a second logical channel for (original) PDCP packets of the first bearer, one or more first cell identifiers of one or more first cells for duplicated PDCP packets of the first bearer, one or more second cell identifiers of one or more second cells for (original) PDCP packets of the first bearer, and/or other information.

The wireless device 1704 may, for example, based on the message(s) 1905, send one or more messages 1906. The message(s) 1906 may comprise an RRC message (e.g., an RRC connection reconfiguration complete message) indicating that the wireless device 1704 set up one or more configurations of the message(s) 1905 (e.g., the PDCP configuration parameter and/or PDCP duplication related configurations for the first bearer). The CU-CP node 1701 may receive the message(s) 1906 via the DU 1703 (e.g., via an F1 interface message, a UL RRC message transfer message, and/or a wireless device (e.g., UE) context modification required message). The DU 1703 may forward the message(s) 1906 from the wireless device 1704 to the CU-CP node 1701. The CU-CP node 1701 may, for example, based on receiving the message(s) 1906, send (e.g., transmit), to the DU 1703, an RRC configuration confirmation message (e.g., wireless device (e.g., UE) context modification request message) indicating that RRC configurations for the wireless device 1704 (e.g., PDCP packet duplication configuration for the first bearer) are completed. The DU 1703 may (e.g., based on the RRC configuration confirmation message) send (e.g., transmit), to the wireless device 1704, a MAC CE indicating activation and/or deactivation of (uplink) PDCP packet duplication for the first bearer.

The CU-UP node 1702 may receive the first DL TEID and/or the second DL TEID from the CU-CP node 1701 via one or more messages such as, for example, the message(s) 1901, the message(s) 1907, the message(s) 2103 (FIG. 21), the message(s) 2107 (FIG. 21), the message(s) 2205 (FIG. 22), and/or the message(s) 2209 (FIG. 22). The CU-CP node 1701 may send (e.g., transmit) such one or more messages to the CU-UP node 1702 based on receiving information (e.g., via the message(s) 1904 and/or other message(s)) from the DU 1703. The CU-CP may send (e.g., transmit) such one or more messages to the CU-UP 1702 before receiving information (e.g., via the message(s) 1904 and/or other message(s)) from the DU 1703. Such one or more messages may comprise at least one of a bearer context setup request message, a bearer context modification request message, a bearer context modification confirm message, and/or another type of message.

The CU-CP node 1701 may send one or more messages 1907 to the CU-UP node 1702. The message(s) 1907 may activate PDCP packet duplication (e.g., if PDCP packet duplication was not explicitly or implicitly activated in connection with the message(s) 1901 and/or other message(s)) or may deactivate PDCP packet duplication (e.g., if PDCP packet duplication was explicitly or implicitly activated in connection with the message(s) 1901 and/or other message(s)). Also or alternatively, the CU-CP node 1701 may send one or more messages 1908 to the DU 1703. The message(s) 1908 may similarly activate PDCP packet duplication (e.g., if PDCP packet duplication was not activated in connection with the message(s) 1904 and/or other message(s)) or may deactivate PDCP packet duplication (e.g., if PDCP packet duplication was activated in connection with the message(s) 1904 and/or other message(s)).

The CU-UP node 1702 may send one or more messages 1909 to the CU-CP node 1701. The message(s) 1909 may indicate that the CU-UP node 1702 has determined to activate PDCP packet duplication (e.g., if PDCP packet duplication was not explicitly or implicitly activated in connection with the message(s) 1901 and/or other message(s)) or may indicate that the CU-UP node 1702 has determined to deactivate PDCP packet duplication (e.g., if PDCP packet duplication was explicitly or implicitly activated in connection with the message(s) 1901 and/or other message(s)).

The DU 1703 may send one or more messages 1910 to the CU-CP node 1701 and/or may send one or more messages 1911 to the wireless device 1704. The message(s) 1910 and/or the message(s) 1911 may indicate that the DU 1703 has determined to activate PDCP packet duplication (e.g., if PDCP packet duplication was not explicitly or implicitly activated in connection with the message(s) 1903 and/or other message(s)) or may indicate that the DU 1703 has determined to deactivate PDCP packet duplication (e.g., if PDCP packet duplication was explicitly or implicitly activated in connection with the message(s) 1903 and/or other message(s)).

Figure 21:
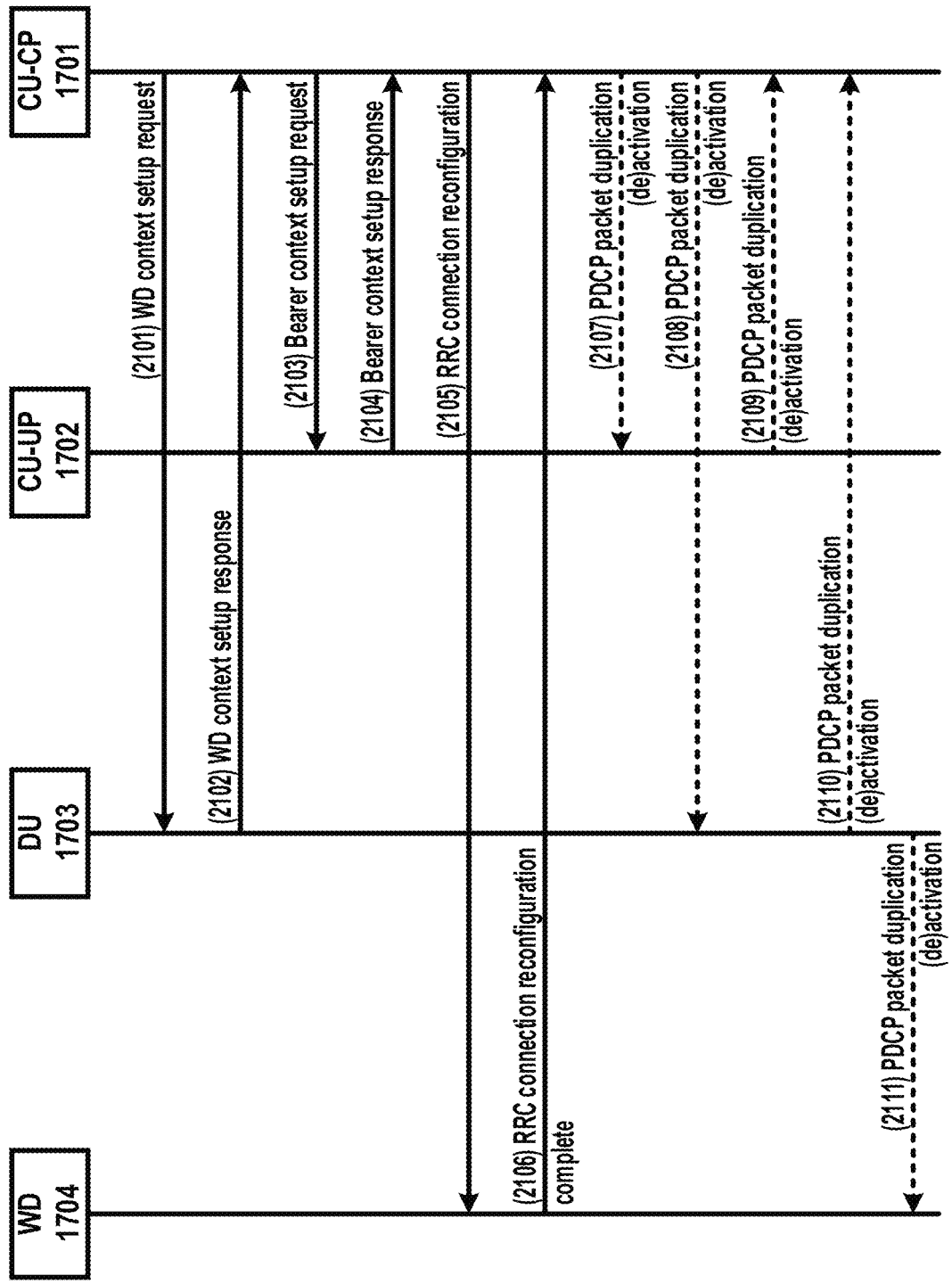
FIG. 21 shows an example method for PDCP packet duplication configuration, activation, and/or deactivation.
Figure 22:
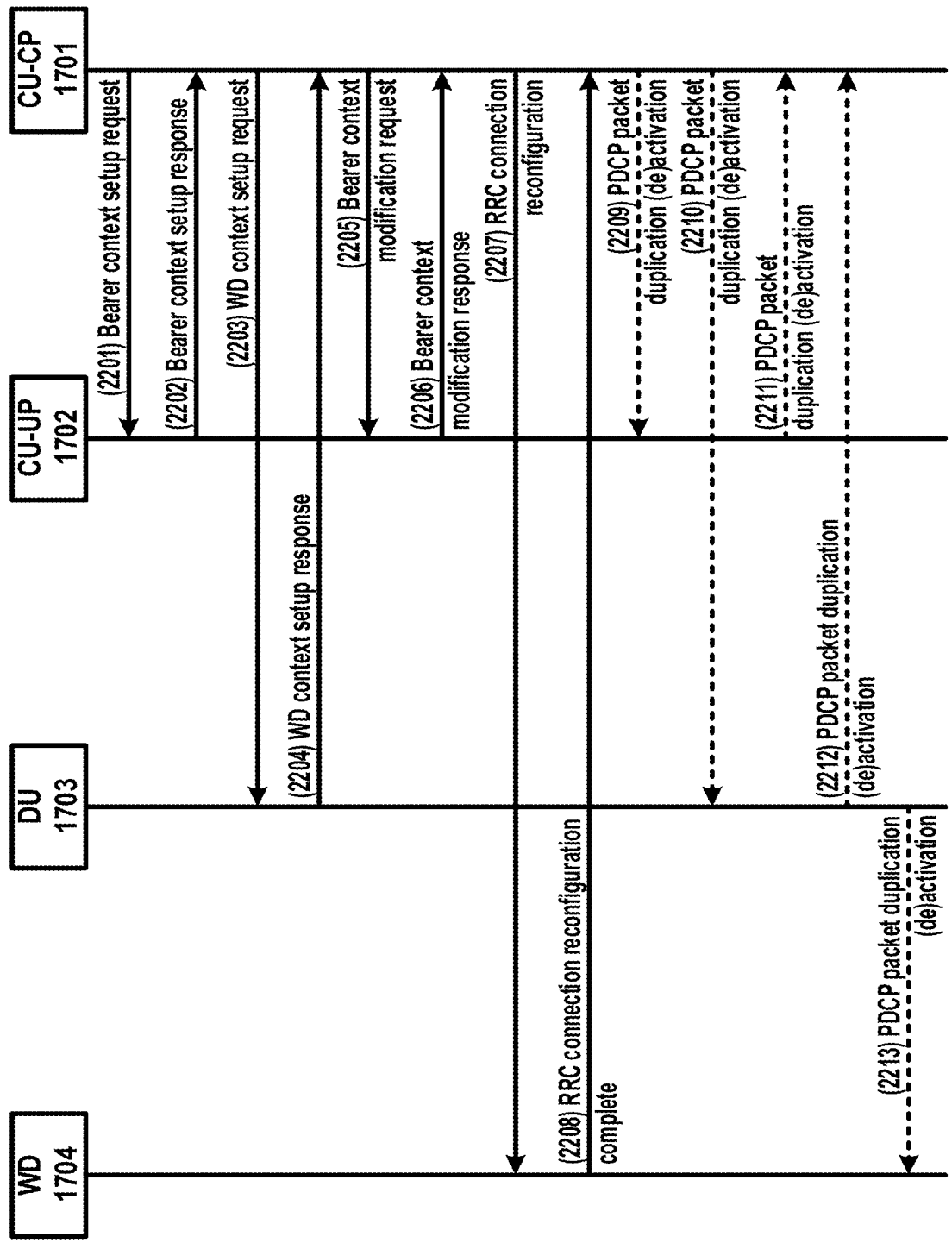
FIG. 22 shows an example method for PDCP packet duplication configuration, activation, and/or deactivation.

FIG. 21 shows an example method, for PDCP packet duplication configuration, activation, and/or deactivation, that may be performed by one or more of the CU-CP node 1701, the CU-UP node 1702, the DU 1703, and/or the wireless devices 1704, and/or by one or more other nodes. The CU-CP node 1701 may send (e.g., transmit) one or more messages 2101, to the DU 1703, comprising a request for PDCP packet duplication configuration of a first bearer. The one or more messages 2101 may be similar to the message(s) 1903 of FIG. 19, and/or one or more actions performed based on the message(s) 2101 may be similar to one or more actions performed based on the message(s) 1903. The DU 1703 may send, to the CU-CP node 1701, one or more messages 2102 comprising the first DL TEID and the second DL TEID for PDCP packet duplication of the first bearer. The one or more messages 2102 may be similar to the message(s) 1904 of FIG. 19, and/or one or more actions performed based on the message(s) 2102 may be similar to one or more actions performed based on the message(s) 1904. The CU-CP node 1701 may, for example, based on receiving the message(s) 2102, send, to the CU-UP node 1702, one or more messages 2103 (e.g., comprising the first DL TEID and the second DL TEID) indicating a request for PDCP packet duplication configuration for the first bearer. The one or more messages 2103 may be similar to the message(s) 1901 of FIG. 19, and/or one or more actions performed based on the message(s) 2103 may be similar to one or more actions performed based on the message(s) 1901. The CU-UP node 1702 may, for example, based on the message(s) 2103, send, to the CU-CP node 1701, one or more messages 2104 comprising the first UL TEID and the second UP TEID for PDCP packet duplication of the first bearer. The one or more messages 2104 may be similar to the message(s) 1902 of FIG. 19, and/or one or more actions performed based on the message(s) 2104 may be similar to one or more actions performed based on the message(s) 1902. The CU-CP node 1701 may, for example, based on the message(s) 2104, send (e.g., transmit), to the DU 1703, a message comprising the first UL TEID and the second UP TEID for PDCP packet duplication of the first bearer. The one or more messages 2105 may be similar to the message(s) 1905 of FIG. 19, and/or one or more actions performed based on the message(s) 2105 may be similar to one or more actions performed based on the message(s) 1905. The one or more messages 2106 may be similar to the message(s) 1906 of FIG. 19, and/or one or more actions performed based on the message(s) 2106 may be similar to one or more actions performed based on the message(s) 1906. The one or more messages 2107 may be similar to the message(s) 1907 of FIG. 19, and/or one or more actions performed based on the message(s) 2107 may be similar to one or more actions performed based on the message(s) 1907. The one or more messages 2108 may be similar to the message(s) 1908 of FIG. 19, and/or one or more actions performed based on the message(s) 2108 may be similar to one or more actions performed based on the message(s) 1908. The one or more messages 2109 may be similar to the message(s) 1909 of FIG. 19, and/or one or more actions performed based on the message(s) 2109 may be similar to one or more actions performed based on the message(s) 1909. The one or more messages 2110 may be similar to the message(s) 1910 of FIG. 19, and/or one or more actions performed based on the message(s) 2110 may be similar to one or more actions performed based on the message(s) 1910. The one or more messages 2111 may be similar to the message(s) 1911 of FIG. 19, and/or one or more actions performed based on the message(s) 2111 may be similar to one or more actions performed based on the message(s) 1911.

FIG. 22 shows an example method, for PDCP packet duplication configuration, activation, and/or deactivation, that may be performed by one or more of the CU-CP node 1701, the CU-UP node 1702, the DU 1703, and/or the wireless devices 1704, and/or by one or more other nodes. The one or more messages 2201 may be similar to the message(s) 1901 of FIG. 19, and/or one or more actions performed based on the message(s) 2201 may be similar to one or more actions performed based on the message(s) 1901. The one or more messages 2202 may be similar to the message(s) 1902 of FIG. 19, and/or one or more actions performed based on the message(s) 2202 may be similar to one or more actions performed based on the message(s) 1902. The one or more messages 2203 may be similar to the message(s) 1903 of FIG. 19, and/or one or more actions performed based on the message(s) 2203 may be similar to one or more actions performed based on the message(s) 1903. The one or more messages 2204 may be similar to the message(s) 1904 of FIG. 19, and/or one or more actions performed based on the message(s) 2204 may be similar to one or more actions performed based on the message(s) 1904. The one or more messages 2207 may be similar to the message(s) 1905 of FIG. 19, and/or one or more actions performed based on the message(s) 2207 may be similar to one or more actions performed based on the message(s) 1905. The one or more messages 2208 may be similar to the message(s) 1906 of FIG. 19, and/or one or more actions performed based on the message(s) 2208 may be similar to one or more actions performed based on the message(s) 1906. The one or more messages 2209 may be similar to the message(s) 1907 of FIG. 19, and/or one or more actions performed based on the message(s) 2209 may be similar to one or more actions performed based on the message(s) 1907. The one or more messages 2210 may be similar to the message(s) 1908 of FIG. 19, and/or one or more actions performed based on the message(s) 2210 may be similar to one or more actions performed based on the message(s) 1908. The one or more messages 2211 may be similar to the message(s) 1909 of FIG. 19, and/or one or more actions performed based on the message(s) 2211 may be similar to one or more actions performed based on the message(s) 1909. The one or more messages 2212 may be similar to the message(s) 1910 of FIG. 19, and/or one or more actions performed based on the message(s) 2212 may be similar to one or more actions performed based on the message(s) 1910. The one or more messages 2213 may be similar to the message(s) 1911 of FIG. 19, and/or one or more actions performed based on the message(s) 2213 may be similar to one or more actions performed based on the message(s) 1911.

The CU-CP node 1701 may, for example, based on receiving the message(s) 2204, send one or more messages 2205 to the CU-UP node 1702. The message(s) 2204 may, for example, indicate DL TEIDs for original packets and/or duplicate packets. Also or alternatively, the message(s) 2204 may indicate acceptance and/or rejection for bearer configurations (e.g., for PDCP packet duplication). The message(s) 2205 may, for example, indicate a bearer context modification request. The message(s) 2205 may, for example, comprise a bearer context modification request message, a bearer context modification confirm message, and/or other type(s) of message(s). The CU-CP node 1701 may forward, to the CU-UP node 1702 via the message(s) 2205, one or more DL TEIDs received via the message(s) 2204. The CU-CP node 1701 may, for example, depending on acceptance and/or rejection from the DU 1703, update configurations (e.g., for PDCP packet duplication) via the message(s) 2205.

The CU-UP node 1702 may, for example, based on receiving the message(s) 2205, apply and/or otherwise use DL TEIDs for downlink packet transmission for the bearer (e.g., for original and/or duplicate packets). The CU-UP node 1702 may update configurations based on the messages(s) 2205. If, for example, the DU 1703 rejects PDCP duplication configuration or setup of the bearer, the CU-UP node 1702 may remove/delete/reset configurations request via the message(s) 2201 (e.g., PDCP duplication configuration or bearer setup of the bearer). The CU-UP node 1702 may, for example, based on receiving the message(s) 2205, send one or more messages 2206 to the CU-CP node 1701. The message(s) 2206 may, for example, indicate a bearer context modification request. The message(s) 2206 may, for example, comprise a bearer context modification request message, a bearer context modification confirm message, and/or other type(s) of message(s). The message(s) 2206 may indicate that the CU-UP node 1702 modified bearer configurations based on the message(s) 2205. The message(s) 2206 may indicate acceptance or rejection of one or more (e.g., each of) configuration modifications communicated via the message(s) 2205. The CU-CP node 1701 may, for example, based on receiving the message(s) 2206, confirm that some or all network nodes (e.g., the CU-UP node 1702 and/or the DU 1703) are configured to serve the wireless device 1704.

The CU-CP node 1701 may send one or more RRC connection reconfiguration messages 2207, to the wireless device 1704 via the DU 1703, to configure the wireless device 1704 based on network node configurations. The wireless device 1704 may, based on the message(s) 2207, send one or more RRC connection reconfiguration complete messages 2208 to the CU-CP node 1701 via the DU 1703. If modification of the CU-UP node 1702 occurs after RRC (re)configuration (e.g., via the message(s) 1907 in FIG. 19), the CU-CP node 1701 may complete the bearer modification procedure (e.g., based on the RRC (re)configuration).

Figure 23:
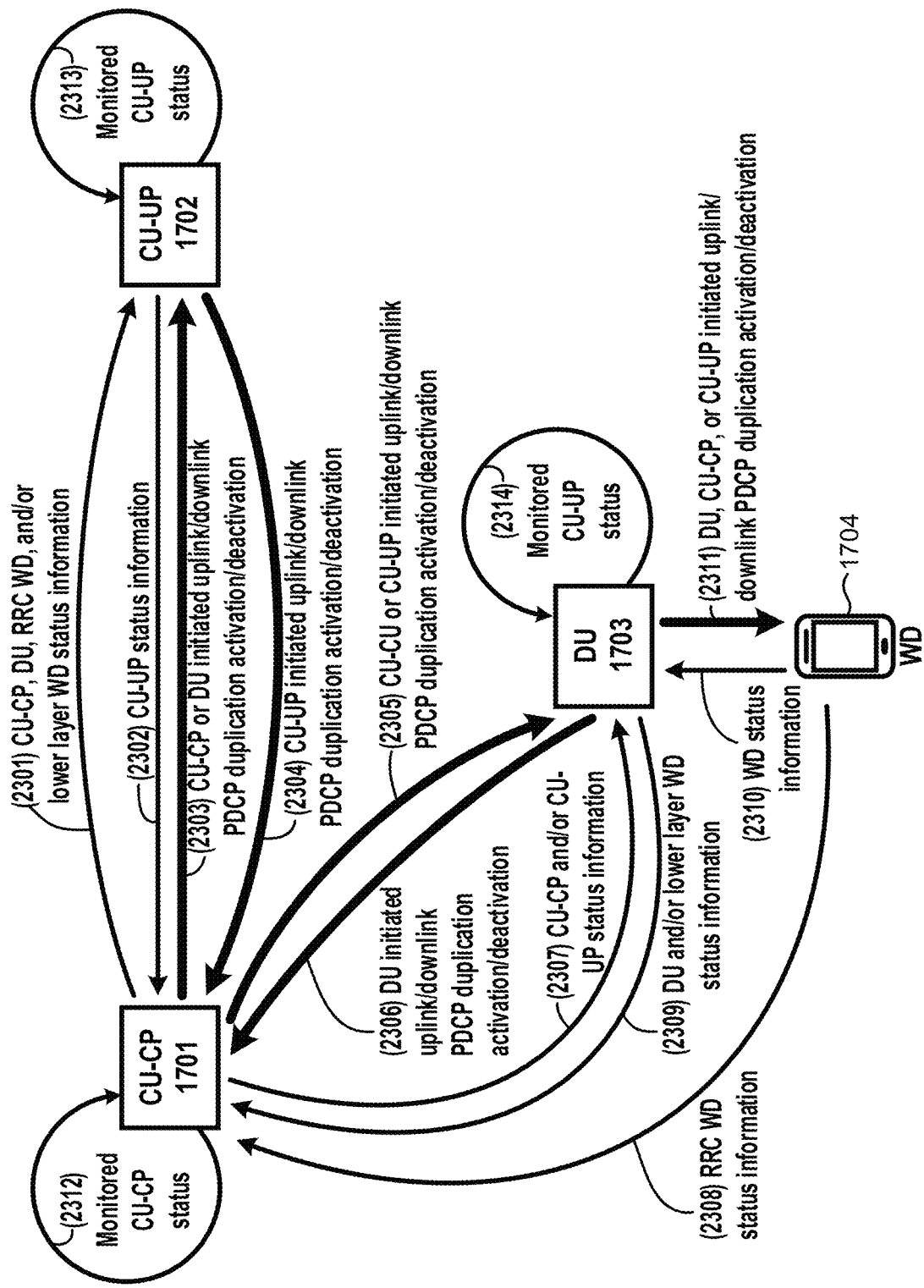
FIG. 23 shows examples of communications among one or more elements.
Figure 24:
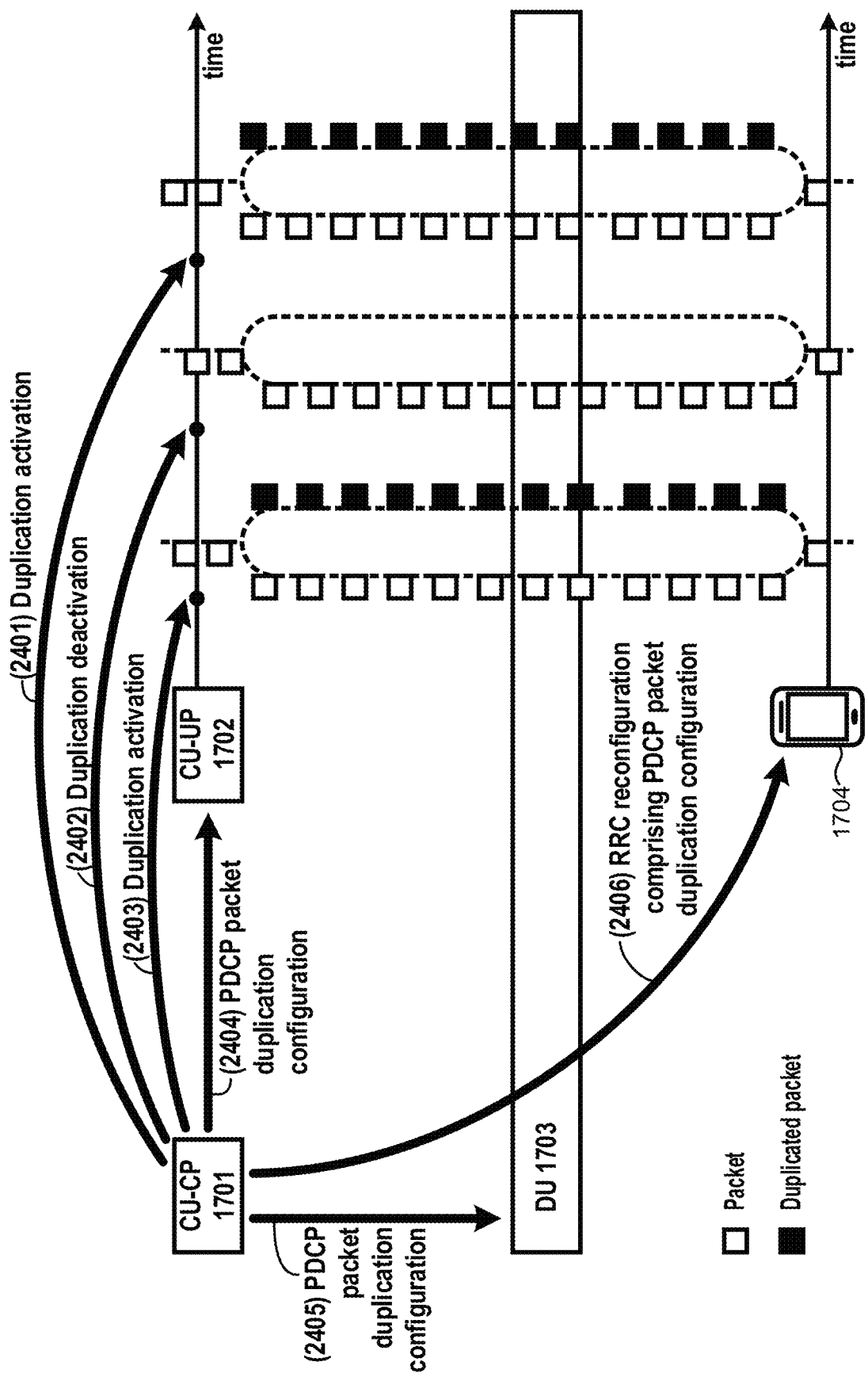
FIGS. 24, 25, and 26 show examples of PDCP packet activation and/or deactivation and/or of related communications.
Figure 25:
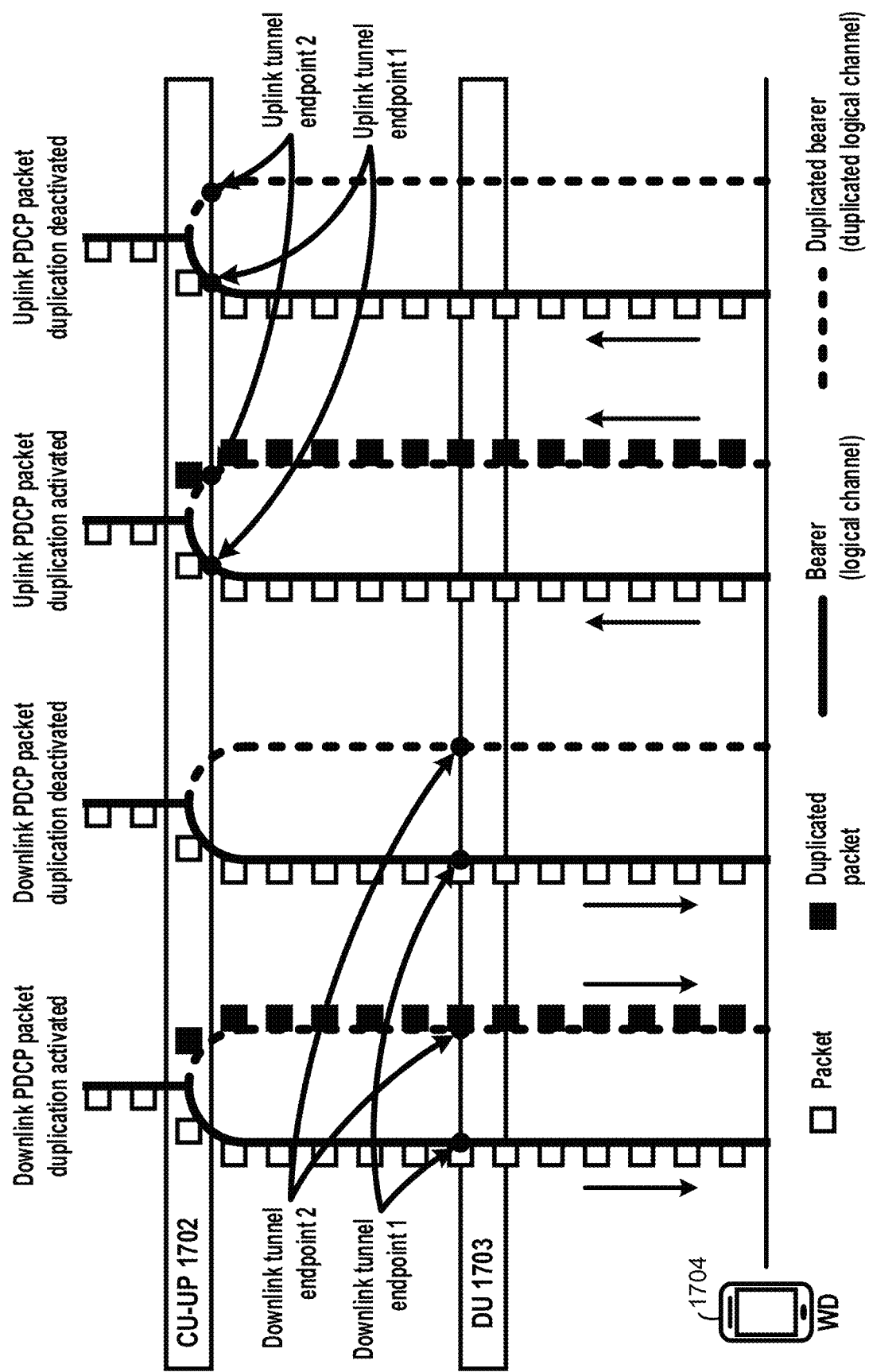
Figure 26:
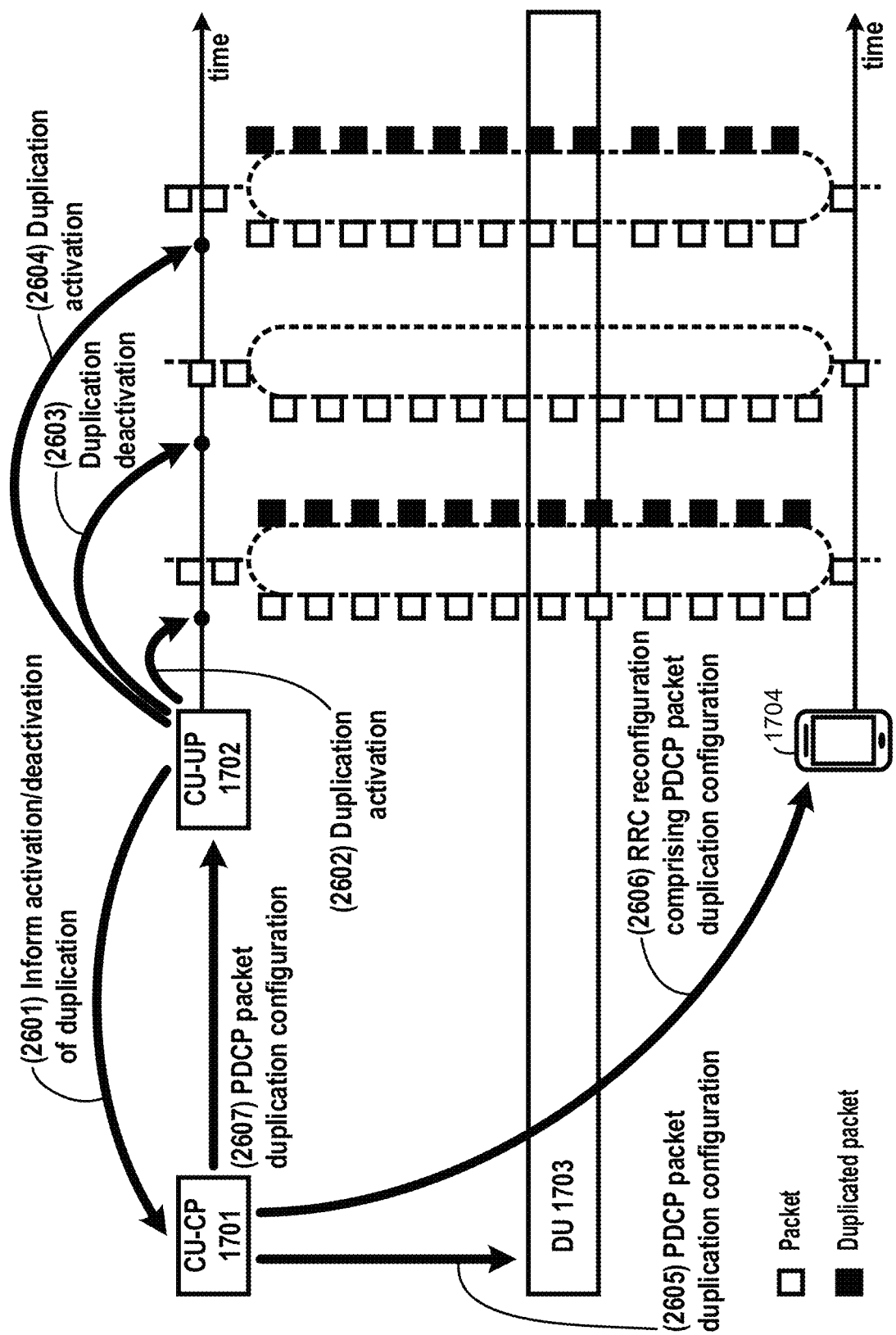

FIG. 23 shows examples of communications (e.g., requests and/or reports of PDCP packet duplication activation and/or deactivation, status information) among the CU-CP node 1701, the CU-UP node 1702, the DU 1703, and/or the wireless device 1704. FIGS. 24, 25, and 26 show examples of PDCP packet activation and/or deactivation and/or of related communications. One or more communications shown in FIGS. 23 through 26 may be the same or similar as one or more communications shown in, and/or described in connection with, preceding figures, and/or may comprise, in whole or in part, one or more communications separate from communications shown in, and/or described in connection with, other figures. One or more communications shown in, and/or described in connection with, one or more of FIG. 17 or 21 through 26 (and/or other figures) may be the same or similar as (and/or may be combined with and/or otherwise used in combination with) one or more other communications shown in, and/or described in connection with, one or more of FIG. 17 or 21 through 26 (and/or other figures).

As shown in FIG. 23 (e.g., message(s) 2303) and in FIG. 24 (e.g., as message(s) causing activation 2403, deactivation 2402, and/or activation 2401), the CU-CP node 1701 may send (e.g., transmit), to the CU-UP node 1702, one or more messages indicating an activation and/or a deactivation of PDCP packet duplication of a bearer of the wireless device 1704. The activation and/or the deactivation may be based on the PDCP packet duplication configuration of the CU-UP node 1702 (e.g., indicated one or more messages causing activation 2401). The activation and/or the deactivation may be based on PDCP packet duplication configuration of the CU-CP node 1701 (indicated, e.g., via one or more messages causing activation 2401) and/or of the DU 1703 (e.g., indicated via one or more messages 2405).

As shown in FIG. 23, FIG. 25, and/or FIG. 26, the CU-UP node 1702 may determine to activate and/or deactivate PDCP packet duplication (e.g., UL PDCP packet duplication via UL tunnel endpoints 1 and 2 and/or DL PDCP packet duplication via DL tunnel endpoints 1 and 2) for a bearer of the wireless device 1704. The CU-UP node 1702 may make that determination, for example, based on status information (e.g., information 2313) for the CU-UP node 1702 obtained by monitoring systems of the CU-UP node 1702. Also or alternatively, the CU-UP node 1702 may determine to activate and/or deactivate PDCP packet duplication based on status information for the CU-CP node 1701 received from the CU-CP node 1701 (e.g., via one or more messages 2301). Also or alternatively, the CU-UP node 1702 may determine to activate and/or deactivate PDCP packet duplication based on status information for the DU 1703 received from the CU-CP node 1701 (e.g., via message(s) 2301). Status information for the DU 1703 in message(s) 2301 may comprise information from, and/or be otherwise based on, one or more messages 2309 received by the CU-CP node 1701 from the DU 1703. Also or alternatively, the CU-UP node 1702 may determine to activate and/or deactivate PDCP packet duplication based on RRC wireless device (e.g., UE) status information received from the CU-CP node 1701 (e.g., via message(s) 2301). RRC wireless device (e.g., UE) status information in message(s) 2301 may comprise information from, and/or be otherwise based on, one or more messages 2308 received by the CU-CP node 1701 from the wireless device 1704 via the DU 1703. Also or alternatively, the CU-UP node 1702 may determine to activate and/or deactivate PDCP packet duplication based on lower layer wireless device (e.g., UE) status information received from the CU-CP node 1701 (e.g., via message(s) 2301). Lower layer wireless device (e.g., UE) status information in message(s) 2301 may comprise information from, and/or be otherwise based on, one or more messages 2310 received by the CU-CP node 1701 from the wireless device 1704 via the DU 1703. Also or alternatively, the CU-UP node 1702 may determine to activate and/or deactivate PDCP packet duplication based on other information. The CU-CP node 1701 may send, via the DU 1703, one or more messages 2606 to the wireless device 1704. The message(s) 2606 may be sent, for example, prior to or concurrently with activation and/or deactivation of PDCP packet duplication. The message(s) 2606 may be sent after activation and/or deactivation of PDCP packet duplication (e.g., by the CU-UP 1702). The message(s) 2606 may comprise RRC reconfiguration message(s) indicating that PDCP packet duplication has been configured and/or may comprise one or more PDCP packet duplication configuration parameters.

The CU-UP node 1702 may determine to activate uplink and/or downlink PDCP packet duplication for a bearer, if, for example, status information and/or other information indicates that corresponding resources are available to support PDCP packet duplication (e.g., if a resource utilization ratio is lower than a threshold value), and/or that radio signaling quality is sufficiently poor and/or unstable so as to indicate a benefit from PDCP packet duplication (e.g., if a radio quality is lower than a threshold value). The CU-UP node 1702 may determine to deactivate uplink and/or downlink PDCP packet duplication for a bearer, if, for example, status information and/or other information indicates that corresponding resources to support the PDCP duplication are or may be insufficient (e.g., if resource utilization ratio is higher than a threshold value), and/or that radio signaling quality is sufficiently good and/or reliable so as to indicate that benefit(s) from PDCP packet duplication may be minimal (e.g., if radio quality is higher than a threshold value). Status information may, for example, comprise one or more of: the status information for the CU-UP node 1702, the status information for the CU-CP node 1701, the status information for the DU 1703, the RRC wireless device (e.g., UE) status information, and/or the lower layer wireless device (e.g., UE) status information.

The CU-UP node 1702 may send (e.g., transmit), to the CU-CP node 1701, one or more CU-UP configuration update messages (e.g., one or more messages 2304 and/or one more messages 2601) indicating activation (e.g., activation 2602 and/or activation 2604) of UL and/or DL PDCP packet duplication of a bearer. For example, the CU-UP node 1702 may send such one or more CU-UP configuration update messages based on and/or after determining activation of uplink and/or downlink PDCP packet duplication of a bearer. The CU-UP configuration update message may comprise at least one of a bearer context modification required message, a bearer context modification response message, a bearer context modification failure message, a bearer context setup response message, a bearer context setup failure message, a bearer context release complete message, a bearer context release request message, and/or another type of message. The CU-CP node 1701 may send (e.g., transmit), to the DU 1703, one or more messages (e.g., one or more messages 2305 and/or one more messages 2605) indicating the activation of UL and/or DL PDCP packet duplication of a bearer. The CU-CP node 1701 may send such one or more messages indicating the activation of UL and/or DL PDCP packet duplication based on, for example, in response to, receiving the CU-UP configuration update message(s). The one or more messages indicating the activation of UL and/or DL PDCP packet duplication (e.g., the message(s) 2305 and/or the message(s) 2605) may comprise a wireless device (e.g., UE) context setup request message, a wireless device (e.g., UE) context modification request message, a wireless device (e.g., UE) context modification confirm message, and/or another type of message. For the activation of the UL PDCP packet duplication, the DU 1703 may send (e.g., transmit), to the wireless device 1704, a MAC CE indicating activation of the UL PDCP packet duplication of the first bearer. The DU 1703 may send that MAC CE in one or more messages 2311. The wireless device 1704 may send (e.g., transmit) UL duplicated PDCP packets (e.g., via a second logical channel) and original PDCP packets (e.g., via a first logical channel) to the CU-UP node 1702 via the DU 1703. The wireless device 1704 may send UL duplicated PDCP packets and original PDCP packets to the CU-UP node 1702 based on, for example, in response to, receiving the MAC CE indicating activation of UL PDCP packet duplication. The UL original PDCP packets may be sent to a first UL TEID (e.g., the uplink tunnel endpoint 1 in FIG. 25) and the UL duplicated PDCP packets may be sent to a second UL TEID (e.g., the uplink tunnel endpoint 2 in FIG. 25). The wireless device 1704 may send (e.g., transmit) UL original PDCP packets via a group of cells and may send (e.g., transmit) the UL duplicated PDCP packets via a separate group of cells. If DL PDCP packet duplication is activated, the DU 1703 may forward DL duplicated PDCP packets (e.g., via the second logical channel) and original PDCP packets (e.g., via the first logical channel) from the CU-UP node 1702 to the wireless device 1704. The DU 1703 may use a group of cells to send (e.g., transmit) DL original PDCP packets to the wireless device and a separate group of cells to send (e.g., transmit) DL duplicated PDCP packets to the wireless device.

The CU-UP node 1702 may discard duplicated UL PDCP packets of the bearer received from the DU 1703 and/or the wireless device 1704 via the DU 1703. The CU-UP node 1702 may discard duplicated UL PDCP packets of the bearer (e.g., received from the DU 1703 and/or the wireless device 1704) based on, for example, in response to, determining activation of UL PDCP packet duplication of a bearer. That discarding may begin after indicating activation of PDCP packet duplication to the CU-CP node 1701 and/or after determining activation. The CU-UP node 1702 may send (e.g., transmit) original DL PDCP packets and duplicated DL PDCP packets of the bearer to the DU 1703 and/or to the wireless device 1704 via the DU 1703. The CU-UP node 1702 may send original DL PDCP packets and duplicated DL PDCP packets of the bearer (e.g., to the DU 1703 and/or to the wireless device 1704 via the DU 1703) based on, for example, in response to (and/or after) determining activation of DL PDCP packet duplication of a bearer. The CU-UP node 1702 may, for example, send original PDCP packets to a first DL TEID (e.g., the downlink tunnel endpoint 1 in FIG.

25) and duplicated PDCP packets to a second DL TEID (e.g., the downlink tunnel endpoint 2 in FIG. 25).

The CU-UP node 1702 may send (e.g., transmit), to the CU-CP node 1701, a CU-UP configuration update message (e.g., one or more of the messages 2303 and/or one or more of the messages 2601) indicating the deactivation of UL and/or DL PDCP packet duplication of the bearer. The CU-UP node 1702 may send such a CU-UP configuration update message after determining deactivation of UL and/or DL PDCP packet duplication of a bearer (e.g., the deactivation 2603). That CU-UP configuration update message indicating deactivation may be based on (e.g., in response to) determining deactivation UL and/or DL PDCP packet duplication and may comprise at least one of a bearer context modification required message, a bearer context modification response message, a bearer context modification failure message, a bearer context setup response message, a bearer context setup failure message, a bearer context release complete message, a bearer context release request message, and/or another type of message. The CU-CP node 1701 may send (e.g., transmit), to the DU 1703, one or more messages 2305 (e.g., one or more wireless device (e.g., UE) context setup request messages, one or more wireless device (e.g., UE) context modification request messages, one or more wireless device (e.g., UE) context modification confirm messages, one or more wireless device (e.g., UE) context release command messages, and/or one or more other type messages) indicating the deactivation of the UL and/or DL PDCP packet duplication of the bearer. The CU-CP node 1701 may send message(s) 2305 based on, for example, in response to, receiving a CU-UP configuration update message indicating deactivation. For deactivation of UL PDCP packet duplication, the DU 1703 may send (e.g., transmit), to the wireless device 1704, a MAC CE indicating deactivation of the UL PDCP packet duplication of the bearer. The wireless device 1704 may (e.g., based on, for example, in response to, receiving that MAC CE indicating deactivation of UL PDCP packet duplication) stop sending (e.g., transmitting) UL duplicated PDCP packets (e.g., via the second logical channel) or may stop sending (e.g., transmitting) original UL PDCP packets (e.g., via the first logical channel) to the DU 1703 (e.g., to the CU-UP node 1702 via the DU 1703). UL original PDCP packets may be sent (e.g., transmitted) via one or more of serving cells of the wireless device 1704. If DL PDCP packet duplication is deactivated, the DU 1703 may forward one of duplicated DL PDCP packets (e.g., via the second logical channel) or original DL PDCP packets (e.g., via the first logical channel) from the CU-UP node 1702 to the wireless device 1704. The DU 1703 may use one or more of serving cells of the wireless device 1704 to send (e.g., transmit) original DL PDCP packets to the wireless device 1704.

The CU-UP node 1702 may process UL PDCP packets of the first bearer received from the DU 1703 and/or from the wireless device 1704 via the DU 1703. That processing may occur after determining deactivation of UL PDCP packet duplication of the first bearer and/or after indicating deactivation to the CU-CP node 1701. That processing may occur based on (for example, in response to) determining deactivation of UL PDCP packet duplication. If, for example, the CU-UP node 1702 is receiving duplicated PDCP packets, the CU-UP node 1702 may discard the duplicated PDCP packets. The CU-UP node 1702 may stop sending (e.g., transmitting) duplicated DL PDCP packets of the first bearer to the DU 1703 and/or to the wireless device 1704 via the DU 1703. The CU-UP node 1702 may stop sending those duplicated DL PDCP packets after determining deactivation of DL PDCP packet duplication of the first bearer. The CU-UP node 1702 may stop sending those duplicated DL PDCP packets based on, for example, in response to, determining deactivation of DL PDCP packet duplication. The DL original PDCP packets may be sent (e.g., transmitted) via one of the first logical channel (e.g., via the first tunnel and the first TEID) or the second logical channel (e.g., via the second tunnel and the second TEID).

As shown, for example, in FIG. 23, FIG. 24, and FIG. 25, the CU-CP node 1701 may determine activation or deactivation of PDCP packet duplication for a bearer of the wireless device 1704. The CU-CP node 1701 may determine such activation or deactivation based on at least one of status information 2302 for the CU-UP node 1702 received from the CU-UP node 1702, status information 2312 for the CU-CP node 1701 obtained by monitoring systems of the CU-CP node 1701, status information 2309 of the DU 1703 received from the DU 1703, RRC wireless device (e.g., UE) status information 2308 received from the wireless device 1704 via one or more RRC messages (e.g., from the wireless device 1704 via the DU 1703), lower layer wireless device (e.g., UE) status information 2309 received from the DU 1703 (e.g., from the wireless device 1704 via the DU 1703), and/or other information. The lower layer wireless device (e.g., UE) status information 2309 may comprise and/or be based on the wireless device (e.g., UE) status information 2310 sent from the wireless device 1704 to the DU 1703.

The CU-CP node 1701 may determine to activate UL and/or DL PDCP packet duplication for a bearer, if, for example, status information and/or other information indicates that corresponding resources to support PDCP packet duplication are available (e.g., if a resource utilization ratio is lower than a threshold value) and/or that radio signaling quality is sufficiently poor and/or unstable so as to indicate a benefit from PDCP packet duplication (e.g., if a radio quality is lower than a threshold value). The CU-CP node 1701 may determine to deactivate UL and/or DL PDCP packet duplication for a bearer, if, for example, status information and/or other information indicates that corresponding resources to support PDCP packet duplication are or may be insufficient (e.g., if a resource utilization ratio is higher than a threshold value) and/or that radio signaling quality is sufficiently good and/or reliable so as to indicate that benefit(s) from PDCP packet duplication may be minimal (e.g., if radio quality is higher than a threshold value). Status information may comprise one or more of: the CU-UP status information 2302, the CU-CP status information 2312, the DU status information 2309, the RRC wireless device (e.g., UE) status information 2308, and/or the lower layer wireless device (e.g., UE) status information 2309.

The CU-CP node 1701 may send (e.g., transmit), to the CU-UP node 1702, a CU-CP configuration update message indicating the activation of UL and/or DL PDCP packet duplication of the bearer. The CU-CP node 1701 may send that configuration update message after determining activation of UL and/or DL PDCP packet duplication of a bearer. The CU-CP node 1701 may send that configuration update message based on (e.g., in response to) determining activation of PDCP packet duplication of the bearer. The CU-CP configuration update message (e.g., one or more of the messages causing the activation 2403 or one or more of the messages causing the activation 2401) may comprise at least one of a bearer context modification request message, a bearer context modification confirm message, a bearer context setup request message, a bearer context release command message, and/or another type of message. The CU-CP node 1701 may send one or more messages 2404 configuring the bearer for PDCP packet duplication.

The CU-UP node 1702 may discard duplicated UL PDCP packets of the first bearer received from the DU 1703 and/or from the wireless device 1704 (e.g., via the DU 1703). The CU-UP node 1702 may discard those duplicated UL PDCP packets after receiving the CU-CP configuration update message indicating the activation of the UL PDCP packet duplication of the bearer. The CU-UP node 1702 may discard those duplicated UL PDCP packets based on (e.g., in response to) receiving the CU-CP configuration update message indicating the activation of the UL PDCP packet duplication of the bearer. The duplicated UL PDCP packets may be sent (e.g., by the wireless device 1704, and/or by the wireless device 1704 via the DU 1703) to a second UL TEID (e.g., the uplink tunnel endpoint 2) and original UL PDCP packets may be sent to a first UL TEID (e.g., the uplink tunnel endpoint 1). The CU-UP node may send (e.g., transmit) original DL PDCP packets and duplicated DL PDCP packets of the bearer to the DU 1703. The CU-UP node 1702 may send original DL PDCP packets and duplicated DL PDCP packets after receiving the CU-CP configuration update message indicating the activation of the DL PDCP packet duplication of the bearer. The CU-UP node 1702 may send original DL PDCP packets and duplicated DL PDCP packets based on (e.g., in response to) receiving the CU-CP configuration update message indicating the activation of the DL PDCP packet duplication. The CU-UP node may send the original DL PDCP packets to a first DL TEID (e.g., the downlink tunnel endpoint 1) and duplicated PDCP packets to a second DL TEID (e.g., the downlink tunnel endpoint 1), and/or to the wireless device 1704 via the DU 1703.

The CU-CP node 1701 may send (e.g., transmit), to the DU 1703, a one or more CU-CP configuration update messages (e.g., one or more of the messages 2305 and or one or more of the messages 2405). The one or more CU-CP configuration update messages sent to the DU 1703 may be sent after determining activation of UL and/or DL PDCP packet duplication of the bearer. The one or more CU-CP configuration update messages sent to the DU 1703 may be sent based on (e.g., in response to) determining UL and/or DL PDCP packet duplication, may comprise a wireless device (e.g., UE) context setup request message, a wireless device (e.g., UE) context modification request message, a wireless device (e.g., UE) context modification confirm message, and/or other type of message, and/or may indicate the activation of the UL and/or DL PDCP packet duplication of the bearer. For the activation of UL PDCP packet duplication, the DU 1703 may send (e.g., transmit), to the wireless device 1704, a MAC CE indicating activation of UL PDCP packet duplication of the bearer. The wireless device 1704 may send (e.g., transmit) UL duplicated PDCP packets (e.g., via a second logical channel) and UL PDCP packets (e.g., via a first logical channel) to the DU 1703 and/or to the CU-UP node 1702 via the DU 1703. The wireless device 1704 may send such UL duplicated PDCP packets and UL PDCP packets based on, for example, in response to, receiving the MAC CE indicating activation of UL PDCP packet duplication. The UL PDCP packets may be sent via a group of cells and the UL duplicated PDCP packets may be sent via a separate group of cells. If DL PDCP packet duplication is activated, the DU 1703 may forward DL duplicated PDCP packets (e.g., via the second logical channel) and DL original PDCP packets (e.g., via the first logical channel) from the CU-UP node 1702 to the wireless device 1704. The DU 1703 may use a group of cells to send (e.g., transmit) DL original PDCP packets to the wireless device 1704 and a separate group of cells to send (e.g., transmit) DL duplicated PDCP packets to the wireless device 1704.

The CU-CP node 1701 may send (e.g., transmit), to the CU-UP node 1702, a CU-CP configuration update message indicating the deactivation of UL and/or DL PDCP packet duplication of the bearer. The CU-CP node 1701 may send that configuration update message after determining deactivation of UL and/or DL PDCP packet duplication of a bearer. The CU-CP node 1701 may send that configuration update message based on (e.g., in response to) determining deactivation of PDCP packet duplication of the bearer. The CU-CP configuration update message (e.g., one or more of the messages causing the deactivation 2402) may comprise at least one of a bearer context modification request message, a bearer context modification confirm message, a bearer context setup request message, a bearer context release command message, and/or another type of message. The CU-UP node 1702 may process UL PDCP packets of the bearer received from the DU 1703 and/or from the wireless device 1704 via the DU 1703. The CU-UP node 1702 may process those UL PDCP packets after receiving a CU-CP configuration update message indicating the deactivation of UL PDCP packet duplication of the bearer. The CU-UP node 1702 may process those UL PDCP packets based on (e.g., in response to) receiving the CU-CP configuration update message indicating the deactivation of UL PDCP packet duplication. The CU-UP may, for example, if receiving duplicated PDCP packets, discard the duplicated PDCP packets. The CU-UP node 1702 may stop sending (e.g., transmitting) duplicated DL PDCP packets of the bearer to the DU 1703 and/or to the wireless device 1704 via the DU 1703. The CU-UP node 1702 may stop sending the duplicated DL PDCP packets after receiving the CU-CP configuration update message indicating the deactivation of the DL PDCP packet duplication of the first bearer. The CU-UP node 1702 may stop sending the duplicated DL PDCP packets based on, for example, in response to receiving the CU-CP configuration update message indicating the deactivation of the DL PDCP packet duplication. The DL original PDCP packets may be transmitted via one of a first logical channel (e.g., via a first tunnel and/or a first TEID) or a second logical channel (e.g., via a second tunnel and/or a second TEID).

The CU-CP node 1701 may send (e.g., transmit), to the DU 1703, one or more CU-CP configuration update messages. Those one or more CU-CP configuration update messages (e.g., one or more of the message(s) 2305 and/or 2405) may be sent after determining deactivation of UL and/or DL PDCP packet duplication of a bearer. Those one or more CU-CP configuration update messages (e.g., one or more of the message(s) 2305 and/or 2405) may be sent based on (e.g., in response to) determining deactivation of PDCP packet duplication, comprise a wireless device (e.g., UE) context setup request message, a wireless device (e.g., UE) context modification request message, a wireless device (e.g., UE) context modification confirm message, a wireless device (e.g., UE) context release command message, and/or another type of message, and may indicate the deactivation of the UL and/or DL PDCP packet duplication of the bearer. For the deactivation of UL PDCP packet duplication, the DU 1703 may send (e.g., transmit), to the wireless device 1704, a MAC CE indicating deactivation of the UL PDCP packet duplication of the bearer. The wireless device 1704 may stop sending (e.g., transmitting) UL duplicated PDCP packets (e.g., via the second logical channel or the first logical channel) to the DU 1703 and/or to the CU-UP node 1702 via the DU 1703. The wireless device 1704 may stop sending UL duplicated PDCP packets based on (e.g., in response to) receiving the MAC CE indicating the deactivation of the UL PDCP packet duplication. Alternatively, the wireless device 1704 may stop sending the original UL PDCP packets to the DU 1703 and/or to the CU-UP node 1702 via the DU 1703. The UL PDCP packets may be transmitted via one or more of serving cells of the wireless device 1704. If DL PDCP packet duplication is deactivated, the DU 1703 may, for example, may forward one of duplicated DL PDCP packets (e.g., via the second logical channel) or original DL PDCP packets (e.g., via the first logical channel) from the CU-UP node 1702 to the wireless device 1704. The DU 1703 may use one or more of serving cells of the wireless device 1704 to send (e.g., transmit) the original DL PDCP packets to the wireless device 1704. The CU-CP node 1701 may send, via the DU 1703, one or more messages 2406 to the wireless device 1704. The message(s) 2406 may be sent, for example, prior to or concurrently with activation and/or deactivation of PDCP packet duplication. The message(s) 2406 may be sent after activation and/or deactivation of PDCP packet duplication (e.g., by the CU-CP 1701). The message(s) 2406 may comprise RRC reconfiguration message(s) indicating that PDCP packet duplication has been configured and/or may comprise one or more PDCP packet duplication configuration parameters.

As shown, for example, in FIG. 23, the DU 1703 may determine activation and/or deactivation of PDCP packet duplication for a bearer of the wireless device 1704. The DU 1703 may determine such activation and/or deactivation based on at least one of CU-UP status information 2307 received from the CU-CP node 1701 (which information may, e.g., comprise and/or be based on CU-UP status information 2302 sent by the CU-UP node 1702 to the CU-CP node 1701), CU-CP status information 2307 received from the CU-CP node 1701, DU status information 2314 obtained by monitoring systems of the DU 1703, RRC wireless device (e.g., UE) status information received from the CU-CP node 1701 (e.g., from the wireless device 1704 via the DU 1703 and/or via one or more RRC messages), lower layer wireless device (e.g., UE) status information 2310 received from the wireless device, and/or other information. If, for example the CU-UP status information and/or the CU-CP status information 2307, the DU status information 2314, the RRC wireless device (e.g., UE) status information, the lower layer wireless device (e.g., UE) status information 2310, and/or other information indicates that corresponding resources to support PDCP packet duplication are available (e.g., if a resource utilization ratio is lower than a threshold value) and/or that radio signaling quality is sufficiently poor and/or unstable so as to indicate a benefit from PDCP packet duplication (e.g., if radio quality is lower than a threshold value), the DU 1703 may determine to activate UL and/or DL PDCP packet duplication for a bearer. If, for example, at least one of the CU-UP status information and/or the CU-CP status information 2307, the DU status information 2314, the RRC wireless device (e.g., UE) status information, the lower layer wireless device (e.g., UE) status information 2310, and/or other information indicates that corresponding resources to support PDCP packet duplication are or may be insufficient (e.g., if a resource utilization ratio is higher than a threshold value) and/or that radio signaling quality is sufficiently good and/or reliable so as to indicate that benefit(s) from PDCP duplication may be minimal (e.g., if radio quality is higher than a threshold value), the DU 1703 may determine to deactivate UL and/or DL PDCP packet duplication for the bearer.

The DU 1703 may send (e.g., transmit), to the CU-CP node 1701, one or more DU configuration update messages 2306 indicating activation of UL and/or DL PDCP packet duplication of the bearer. The DU 1703 may send the message(s) 2306 after determining activation of UL and/or DL PDCP packet duplication of the bearer. The DU 1703 may send the message(s) 2306 based on, for example, in response to, the determination to activate PDCP packet duplication. The DU configuration update message(s) 2306 may comprise at least one of a wireless device (e.g., UE) context setup response message, a wireless device (e.g., UE) context setup failure message, a wireless device (e.g., UE) context modification required message, a wireless device (e.g., UE) context modification response message, a wireless device (e.g., UE) context modification failure message, a wireless device (e.g., UE) context release request message, a wireless device (e.g., UE) context release complete message, and/or another type of message. The CU-CP node 1701 may send (e.g., transmit), to the CU-UP node 1702, one or more messages (e.g., a bearer context modification request message, a bearer context modification confirm message, a bearer context setup request message, a bearer context release command message, and/or another type of message) indicating the activation of UL and/or DL PDCP packet duplication of the bearer. The CU-CP node 1701 may send one or more messages indicating the activation of UL and/or DL PDCP packet duplication of the bearer based on, for example, in response to, receiving the DU configuration update message(s) 2306 indicating the activation of UL and/or DL PDCP packet duplication of the bearer. The CU-UP node 1702 may discard duplicated UL PDCP packets of the bearer received from the DU 1703 and/or from the wireless device 1704 via the DU 1703. The CU-UP node 1702 may discard those duplicated packets after receiving the message indicating the activation of UL PDCP packet duplication of the bearer. The CU-UP node 1702 may discard those duplicated packets based on, for example, in response to, receiving the message indicating the activation of UL PDCP packet duplication. The CU-UP node 1702 may send (e.g., transmit) original DL PDCP packets and duplicated DL PDCP packets of the bearer to the DU 1703 (e.g., send PDCP packets to a first DL TEID (e.g., the downlink tunnel endpoint 1) and duplicated PDCP packets to a second DL TEID (e.g., the downlink tunnel endpoint 2)) and/or to the wireless device 1704 via the DU 1703. The CU-UP node 1702 may send original DL PDCP packets and duplicated DL PDCP packets after receiving the message indicating the activation of DL PDCP packet duplication of the bearer. The CU-UP node 1702 may send original DL PDCP packets and duplicated DL PDCP packets based on, for example, in response to, receiving the message indicating the activation of DL PDCP packet duplication.

The DU 1703 may send (e.g., transmit), to the wireless device, a MAC CE (e.g., as shown at 2311 in FIG. 23) indicating the activation of UL and/or DL PDCP packet duplication of the bearer. The DU 1703 may send that MAC CE after determining activation of UL and/or DL PDCP packet duplication of the bearer. The DU 1703 may send that MAC CE based on, for example, in response to, determining activation of UL and/or DL PDCP packet duplication. For activation of UL PDCP packet duplication, the DU 1703 may send (e.g., transmit), to the wireless device 1704, a MAC CE indicating activation of UL PDCP packet duplication of the bearer. The wireless device 1704 may send (e.g., transmit) UL duplicated PDCP packets (e.g., via a second logical channel) and UL original PDCP packets (e.g., via a first logical channel) to the DU 1703 and/or to the CU-UP node 1702 via the DU 1703. The wireless device 1704 may send such UL duplicated PDCP packets and UL original PDCP packets based on, for example, in response to, receiving the MAC CE indicating the activation of UL PDCP packet duplication. The UL original PDCP packets and the UL duplicated PDCP packets may respectively be sent (e.g., transmitted) via separate groups of cells. If DL PDCP packet duplication is activated, the DU 1703 may, for example, forward DL duplicated PDCP packets (e.g., via the second logical channel) and DL original PDCP packets (e.g., via the first logical channel) from the CU-UP node 1702 to the wireless device 1704. The DU 1703 may use separate groups of cells to send DL original PDCP packets and DL duplicated PDCP packets to the wireless device 1704.

The DU 1703 may send (e.g., transmit), to the CU-CP node 1701, a DU configuration update message 2306 indicating the deactivation of UL and/or DL PDCP packet duplication of the bearer. The DU 1703 may send that DU configuration update message 2306 indicating the deactivation after determining deactivation of UL and/or DL PDCP packet duplication of a bearer. The DU 1703 may send that DU configuration update message 2306 indicating the deactivation based on, for example, in response to, determining the deactivation of UL and/or DL PDCP packet duplication. The DU configuration update message 2306 indicating the deactivation may comprise at least one of: a wireless device (e.g., UE) context setup response message, a wireless device (e.g., UE) context setup failure message, a wireless device (e.g., UE) context modification required message, a wireless device (e.g., UE) context modification response message, a wireless device (e.g., UE) context modification failure message, a wireless device (e.g., UE) context release request message, a wireless device (e.g., UE) context release complete message, and/or another type of message. The CU-CP node 1701 may send (e.g., transmit), to the CU-UP node 1702, one or more messages (e.g., a bearer context modification request message, a bearer context modification confirm message, a bearer context setup request message, a bearer context release command message, and/or another type of message) indicating the deactivation of the UL and/or DL PDCP packet duplication of the bearer. The CU-CP node 1701 may send such one or more messages indicating the deactivation of the UL and/or DL PDCP packet duplication of the bearer based on, for example, in response to, receiving the DU configuration update message indicating the deactivation of UL and/or DL PDCP packet duplication of the bearer. The CU-UP node 1702 may process UL PDCP packets of the bearer received from the DU 1703 and/or from the wireless device 1704 via the DU 1703. The CU-UP node 1702 may process those UL PDCP packets after receiving the message indicating the deactivation of the UL PDCP packet duplication of the bearer. The CU-UP node 1702 may process those UL PDCP packets based on, for example, in response to, receiving the message indicating the deactivation of the UL PDCP packet duplication. If receiving duplicated PDCP packets, the CU-UP node 1702 may, for example, discard the duplicated PDCP packets. The CU-UP node 1702 may stop sending (e.g., transmitting) duplicated DL PDCP packets of the bearer to the DU 1703 and/or to the wireless device 1704 via the DU 1703. The CU-UP node 1702 may stop sending those duplicated DL PDCP packets after receiving the message indicating the deactivation of DL PDCP packet duplication of the bearer. The CU-UP node 1702 may stop sending those duplicated DL PDCP packets based on, for example, in response to, receiving the message indicating the deactivation of DL PDCP packet duplication. The CU-UP node 1702 may send (e.g., transmit) DL original PDCP packets via one of the first logical channel (e.g., via a first tunnel and/or a first TEID) or the second logical channel (e.g., via a second tunnel and/or a second TEID).

The DU 1703 may send (e.g., transmit), to the wireless device 1704, a MAC CE (e.g., as shown at 2311 in FIG. 23) indicating the deactivation of UL and/or DL PDCP packet duplication of the bearer. The DU 1703 may send that MAC CE after determining deactivation of UL and/or DL PDCP packet duplication of a bearer. The DU 1703 may send that MAC CE based on, for example, in response to, determining deactivation of UL and/or DL PDCP packet duplication. For deactivation of UL PDCP packet duplication, the DU 1703 may send (e.g., transmit), to the wireless device 1704, a MAC CE indicating deactivation of UL PDCP packet duplication of the bearer. The wireless device 1704 may stop sending (e.g., transmitting) UL duplicated PDCP packets (e.g., via the second logical channel or the first logical channel) to the DU 1703 and/or to the CU-UP node 1702 via the DU 1703. The wireless device 1704 may stop sending such UL duplicated PDCP packets based on, for example, in response to, receiving the MAC CE indicating the deactivation of UL PDCP packet duplication. Alternatively, the wireless device 1704 may stop sending the original UL PDCP packets to the DU 1703 and/or to the CU-UP node 1702 via the DU 1703. The UL original PDCP packets may be sent (e.g., transmitted) via one or more of serving cells of the wireless device 1704. If DL PDCP packet duplication is deactivated, the DU 1703 may, for example, forward one of duplicated DL PDCP packets (e.g., via the second logical channel) or original DL PDCP packets (e.g., via the first logical channel) from the CU-UP node 1702 to the wireless device 1704. The DU 1703 may use one or more of serving cells of the wireless device 1704 to send (e.g., transmit) original DL PDCP packets to the wireless device 1704.

CU-UP status information (e.g., the status information 2302 and/or the status information 2313 obtained by monitoring the CU-UP node 1702) may, for example, comprise at least one of: a hardware load indicator, an NG interface load indicator (e.g., a load indicator for an interface between the CU-UP node 1702 and a core network entity), an F1 interface load indicator (e.g., load information for an interface between the CU-UP node 1702 and the DU 1703), a composite available capacity group, and/or a network slice overload indicator of the CU-UP node 1702. CU-CP status information (e.g., the status information 2312) may, for example, comprise at least one of: a hardware load indicator, an NG interface load indicator (e.g., a load indicator for an interface between the CU-CP node 1701 and a core network entity), an F1 interface load indicator (e.g., load information for an interface between the CU-CP node 1701 and the DU 1703), a composite available capacity group, and/or a network slice overload indicator of the CU-CP node 1701.

DU status information (e.g., the status information 2314) may, for example, comprise at least one of: a hardware load indicator, an F1 interface load indicator (e.g., load information for an interface between the CU-CP node 1701 or the CU-UP node 1702 and the DU 1703), a radio resource status, a composite available capacity group, and/or a network slice overload indicator of the DU 1703. DU status information may also or alternatively comprise UL radio signaling quality information of the wireless device 1704 (e.g., based on SRS, RSRQ, and/or RSRP). RRC wireless device (e.g., UE) status information may, for example, comprise at least one of: measurement results (e.g., RSRP and/or RSRQ of one or more serving cells), battery status information, a number of RLC retransmissions for UL transmission, UL transport block transmission failure rate, random access failure rate, configured resource (e.g., Type 1, grant free resource) access failure rate, UL PDCP delay information, and/or other information. Lower layer wireless device (e.g., UE) status information may, for example, comprise at least one of: a CQI report, information of RSRQ or RSRP of CSI-RS or SS, hybrid ARQ retransmission number information, buffer status report of one or more logical channels (e.g., associated with a bearer for which PDCP packet duplication is configured and/or activated), and/or other information.

A hardware load indicator may, for example, indicate hardware load information (e.g., load or other status of a CPU, memory, and/or a bus, and/or information) of corresponding node and/or one or more associated cells. A hardware load indicator may comprise hardware load information for each network slice of the one or more slices served via the corresponding node and/or a cell. Hardware load information may, for example, indicate a hardware load level status. Hardware load information may, for example, indicate a low load status, a medium load status, a high load status, and/or an overload status. Hardware load information may, for example, comprise one or more network slice identifiers of one or more overloaded network slices.

Hardware load information may, for example, indicate a hardware load share status of one or more associated cells and/or each network slice of one or more network slices. Hardware load information may, for example, indicate a hardware resource usage amount ratio (e.g., a hardware load share amount ratio) of one or more associated cells compared to a hardware resource usage amount of other cells and/or compared to a total hardware resource amount of a corresponding node. Hardware load information may, for example, indicate a hardware resource usage amount ratio (e.g., a hardware load share amount ratio) of each network slice of one or more network slices compared to a hardware resource usage amount of other network slices in a corresponding node and/or one or more associated cells. Hardware load information may, for example, indicate a hardware resource usage amount ratio (e.g., a hardware load share amount ratio) of each network slice of one or more network slices compared to a total hardware resource amount of a corresponding node and/or one or more associated cells.

An NG interface load indicator may, for example, indicate a load of an interface between a corresponding node (e.g., the CU-CP node 1701 and/or the CU-UP node 1702) and a core network entity. An NG interface load indicator may comprise an NG interface load information for each network slice of one or more network slices. NG interface load information may, for example, indicate an NG interface load level status of a corresponding node and/or of each network slice of one or more network slices. NG interface load information may, for example, indicate a low load status, a medium load status, a high load status, and/or an overload status. NG interface load information may, for example, comprise one or more network slice identifiers of one or more overloaded network slices of a corresponding node.

NG interface load information may, for example, indicate an NG interface load share status of a corresponding node and/or each network slice of one or more network slices. NG interface load information may, for example, indicate an NG interface resource usage amount ratio (e.g., an NG interface load share amount ratio) of each network slice of one or more network slices compared to an NG interface resource usage amount of other network slices. NG interface load information may, for example, indicate an NG interface resource usage amount ratio (e.g., an NG interface load share amount ratio) of each network slice of one or more network slices compared to a total NG interface resource amount of a corresponding node.

An F1 interface load indicator may, for example, indicate load information of an interface between a corresponding node (e.g., the CU-CP node 1701 and/or the CU-UP node 1702) and the DU 1703. An F1 interface load indicator may indicate F1 interface load information for one or more serving cells. An F1 interface load indicator may indicate F1 interface load information for each network slice of one or more network slices. F1 interface load information may, for example, indicate an F1 interface load level status of a corresponding node, and/or each network slice of one or more network slices. F1 interface load information may, for example, indicate a low load status, a medium load status, a high load status, and/or an overload status of a corresponding node, and/or each network slice of one or more network slices. F1 interface load information may, for example, comprise one or more network slice identifiers of one or more overloaded network slices. F1 interface load information may, for example, comprise one or more cell identifiers of one or more overloaded cells of the DU 1703.

F1 interface load information may, for example, indicate an F1 interface load share status of each network slice of one or more network slices. F1 interface load information may, for example, indicate an F1 interface resource usage amount ratio (e.g., an F1 interface load share amount ratio) of each network slice of one or more network slices compared to an F1 interface resource usage amount of other network slices. F1 interface load information may, for example, indicate an F1 interface resource usage amount ratio (e.g., an F1 interface load share amount ratio) of each network slice of one or more first network slices compared to a total F1 interface resource amount of a corresponding node and/or one or more serving cells.

Radio resource status may, for example, comprise a physical layer resource block usage information for a downlink GBR, a downlink non-GBR, an uplink GBR, an uplink non-GBR, a total downlink, and/or a total uplink transmission associated with one or more serving cells and/or each network slice of one or more network slices. Radio resource status may, for example, comprise a physical layer resource block usage information for each network slice of one or more network slices. Physical layer resource block usage information may, for example, indicate a physical layer resource block usage level of one or more serving cells and/or each network slice of one or more network slices. Physical layer resource block usage information may, for example, indicate a low usage status, a medium usage status, a high usage status, and/or a full usage status of one or more serving cells and/or each network slice of one or more network slices. Physical layer resource block usage information may, for example, comprise one or more network slice identifiers of one or more overloaded network slices.

Physical layer resource block usage information may, for example, indicate a physical layer resource block usage status of one or more serving cells and/or each network slice of one or more network slices. Physical layer resource block usage status may, for example, be associated with a downlink GBR, a downlink non-GBR, an uplink GBR, an uplink non-GBR, a total downlink, and/or a total uplink transmission of one or more serving cells and/or each network slice of one or more network slices. Physical layer resource block usage information may, for example, indicate a physical layer resource block usage amount ratio of each network slice of one or more network slices compared to a physical layer resource block usage amount of other network slices. Physical layer resource block usage information may, for example, indicate a physical layer resource block usage amount ratio of each network slice of one or more network slices compared to a total physical layer resource block amount. Physical layer resource block usage information may, for example, indicate a physical layer resource block usage amount ratio of each network slice of one or more network slices compared to a physical layer resource block amount allowed for each network slice.

A composite available capacity group may, for example, comprise a cell capacity class value and/or a capacity value for a DL and/or an UL associated with a corresponding node, one or more service cells, and/or each network slice of one or more network slices. A cell capacity class value may, for example, indicate a value classifying a cell capacity of one or more serving cells with regards to other cells. A cell capacity class value may, for example, indicate a value classifying a capacity for each network slice of one or more network slices with regards to other cells and/or other network slices. The capacity value may indicate an amount of resources, for one or more serving cells and/or each network slice of one or more network slices, that are available relative to a total resource for corresponding node, one or more serving cells, and/or each network slice of one or more network slices.

A network slice overload indicator may, for example, indicate whether each network slice of one or more network slices is overloaded. A network slice overload indicator may, for example, indicate a low load status, a medium load status, a high load status, and/or an overload status of each network slice of one or more network slices.

Figure 27:
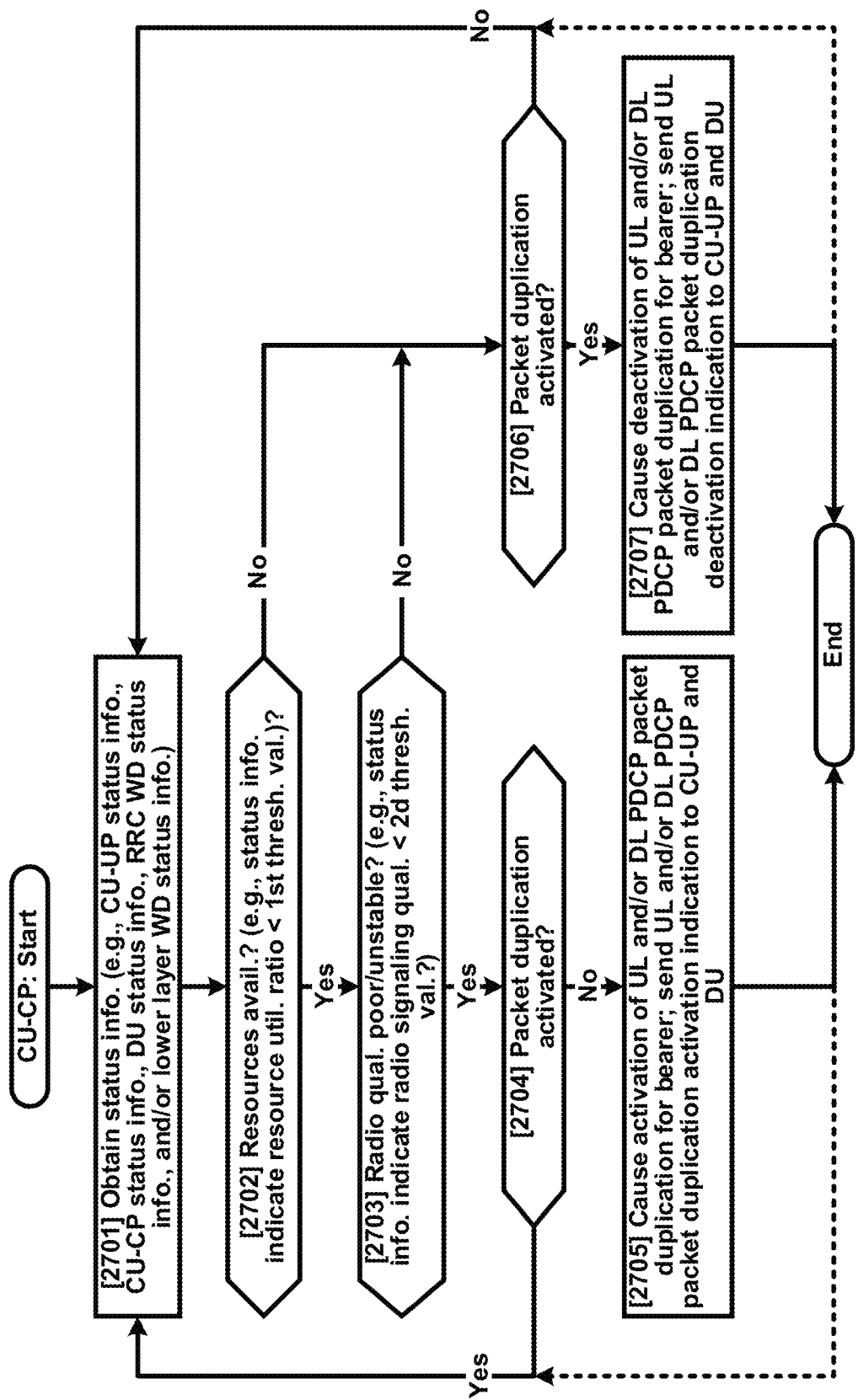
FIG. 27 shows an example method for activating and/or deactivating packet duplication.

FIG. 27 shows an example method that may, for example, be performed by a CU-CP node (e.g., the CU-CP node 1701). Status information may be received in step 2701. The status information may, for example, comprise status information from self-monitoring (e.g., the status information 2312), status information (e.g., the status information 2302) for a CU-UP node (e.g., the CU-UP node 1702), status information (e.g., the status information 2309) for a DU (e.g., the DU 1703), RRC wireless device (e.g., UE) status information (e.g., the status information 2309) received from a wireless device (e.g., the wireless device 1704) via the DU, lower layer status information (e.g., the status information 2309) received from the DU and/or from the wireless device (e.g., the status information 2310), and/or other information.

In step 2702, a determination, regarding the availability of resources to support packet duplication, may be made. The determination may be based on one or more parts of the status information received in step 2701 and may comprise, for example, determining whether a resource utilization ratio satisfies (e.g., is lower than) a first threshold value. The first threshold value may be predetermined. The first threshold value for the method of FIG. 27 may be the same as, or different from, the first threshold value for the method of FIG. 28, and/or may be the same as, or different from, the first threshold value for the method of FIG. 29. If it is determined in step 2702 that resources to support packet duplication are not available (e.g., if the utilization ratio does not satisfy (e.g., is not lower than) the first threshold value), step 2706 (described below) may be performed. If it is determined in step 2702 that resources to support packet duplication are available (e.g., if the utilization ratio satisfies (e.g., is lower than) the first threshold value), step 2703 may be performed.

In step 2703, a determination, of whether radio signaling quality is sufficiently poor and/or unstable so as to indicate a benefit from PDCP packet duplication, may be made. The determination may be based on one or more parts of the status information received in step 2701 and may comprise, for example, determining if a radio quality satisfies (e.g., is lower than) a second threshold value. The second threshold value may be predetermined. The second threshold value for the method of FIG. 27 may be the same as, or different from, the second threshold value for the method of FIG. 28, and/or may be the same as, or different from, the second threshold value for the method of FIG. 29. If it is determined in step 2703 that radio signaling quality is not sufficiently poor and/or unstable so as to indicate a benefit from PDCP packet duplication (e.g., if the radio quality does not satisfy (e.g., is not lower than) the second threshold value), step 2705 may be performed. If it is determined in step 2703 that radio signaling quality is sufficiently poor and/or unstable so as to indicate a benefit from PDCP packet duplication (e.g., if the radio quality does satisfy (e.g., is lower than) the second threshold value), step 2704 may be performed.

In step 2704, a determination, of whether PDCP packet duplication is activated, may be made. If PDCP packet duplication is activated, step 2701 may be repeated. If PDCP packet duplication is not activated, step 2705 may be performed. In step 2705, activation of UL PDCP packet duplication and/or of DL PADCP packet duplication may be caused. An indication of UL and/or DL PDCP packet duplication activation may, as part of step 2705, be sent to the CU-UP node and/or to the DU. The method may end. Alternatively, and as shown with a broken line, the method may begin again by repeating step 2701.

If it is determined in step 2703 that radio signaling quality is not sufficiently poor and/or unstable so as to indicate a benefit from PDCP packet duplication, step 2706 may be performed. In step 2706, a determination, of whether PDCP packet duplication is activated, may be made. If PDCP packet duplication is not activated, step 2701 may be repeated. If PDCP packet duplication is activated, step 2707 may be performed. In step 2707, deactivation of UL and/or DL PDCP packet duplication for a bearer may be caused. An indication of UL and/or DL PDCP packet duplication deactivation may, as part of step 2707, be sent to the CU-UP node and/or to the DU. The method may end. Alternatively, and as shown with a broken line, the method may begin again by repeating step 2701.

Figure 28:
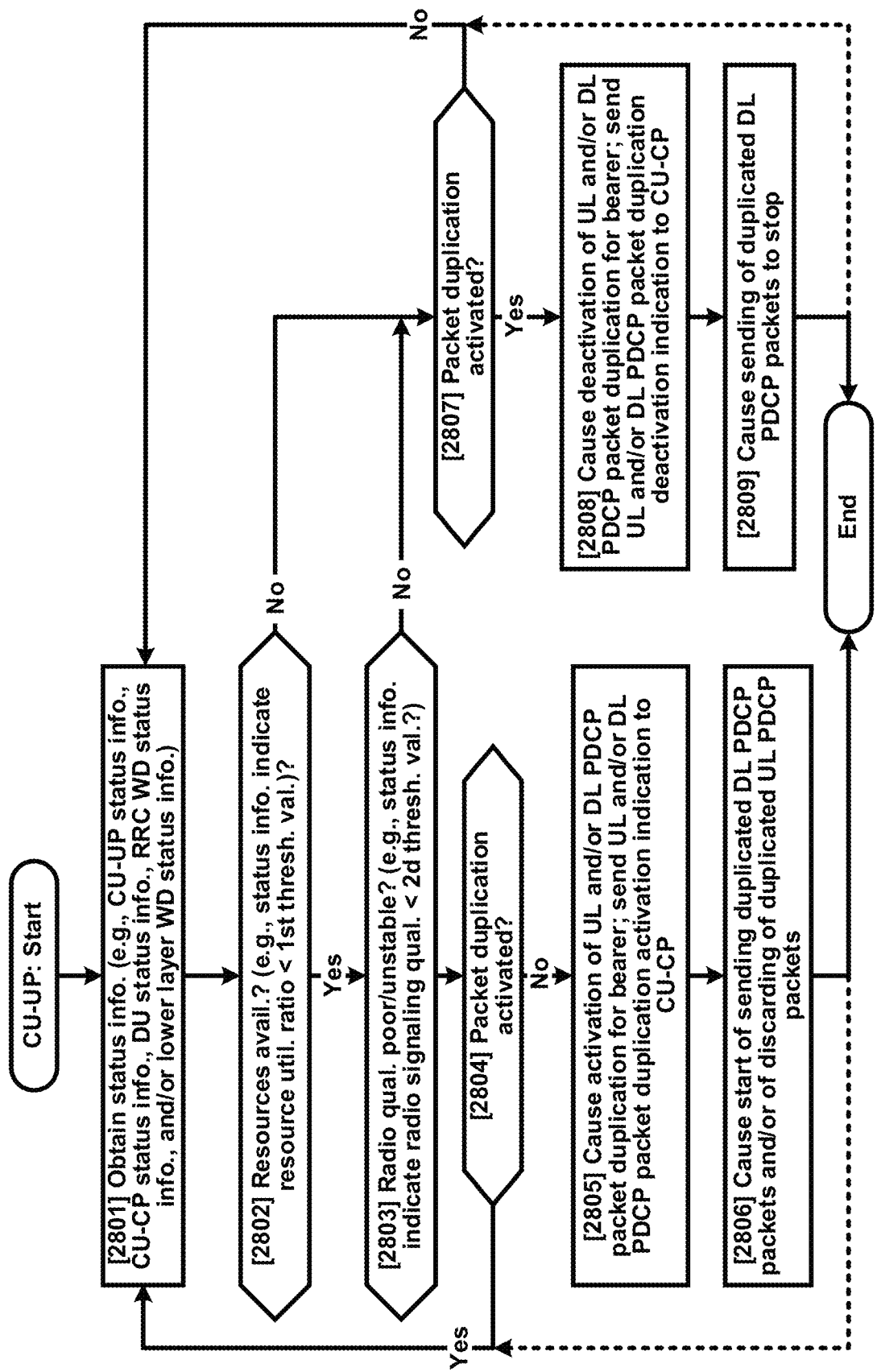
FIG. 28 shows an example method for activating and/or deactivating packet duplication.

FIG. 28 shows an example method that may, for example, be performed by a CU-UP node (e.g., the CU-UP node 1702). Status information may be received in step 2801. The status information may, for example, comprise status information from self-monitoring (e.g., the status information 2313) and/or status information (e.g., the status information 2301) for a CU-CP node (e.g., the CU-CP node 1701), status information for a DU (e.g., the DU 1703), RRC wireless device (e.g., UE) status information, lower layer wireless device (e.g., UE) status information, and/or other information.

In step 2802, a determination, regarding the availability of resources to support packet duplication, may be made. The determination may be based on one or more parts of the status information received in step 2801 and may comprise, for example, determining whether a resource utilization ratio satisfies (e.g., is lower than) a first threshold value. The first threshold value may be predetermined. The first threshold value for the method of FIG. 28 may be the same as, or different from, the first threshold value for the method of FIG. 27, and/or may be the same as, or different from, the first threshold value for the method of FIG. 29. If it is determined in step 2802 that resources to support packet duplication are not available (e.g., if the utilization ratio does not satisfy (e.g., is not lower than) the first threshold value), step 2807 (described below) may be performed. If it is determined in step 2802 that resources to support packet duplication are available (e.g., if the utilization ratio satisfies (e.g., is lower than) the first threshold value), step 2803 may be performed.

In step 2803, a determination, of whether radio signaling quality is sufficiently poor and/or unstable so as to indicate a benefit from PDCP packet duplication, may be made. The determination may be based on one or more parts of the status information received in step 2801 and may comprise, for example, determining if a radio quality satisfies (e.g., is lower than) a second threshold value. The second threshold value may be predetermined. The second threshold value for the method of FIG. 28 may be the same as, or different from, the second threshold value for the method of FIG. 27, and/or may be the same as, or different from, the second threshold value for the method of FIG. 29. If it is determined in step 2803 that radio signaling quality is not sufficiently poor and/or unstable so as to indicate a benefit from PDCP packet duplication (e.g., if the radio quality does not satisfy (e.g., is not lower than) the second threshold value), step 2807 may be performed. If it is determined in step 2803 that radio signaling quality is sufficiently poor and/or unstable so as to indicate a benefit from PDCP packet duplication (e.g., if the radio quality does satisfy (e.g., is lower than) the second threshold value), step 2804 may be performed.

In step 2804, a determination, of whether PDCP packet duplication is activated, may be made. If PDCP packet duplication is activated, step 2801 may be repeated. If PDCP packet duplication is not activated, step 2805 may be performed. In step 2805, activation of UL PDCP packet duplication and/or of DL PDCP packet duplication may be caused. An indication of UL and/or DL PDCP packet duplication activation may, as part of step 2805, be sent to the CU-CP node and/or to the DU.

In step 2806, the start of sending of duplicated DL PDCP packets, and/or the start of discarding duplicated UL PDCP packets, may be caused. The method may end. Alternatively, and as shown with a broken line, the method may begin again by repeating step 2801.

If it is determined in step 2803 that radio signaling quality is not sufficiently poor and/or unstable so as to indicate a benefit from PDCP packet duplication, step 2807 may be performed. In step 2807, a determination, of whether PDCP packet duplication is activated, may be made. If PDCP packet duplication is not activated, step 2801 may be repeated. If PDCP packet duplication is activated, step 2808 may be performed. In step 2808, deactivation of UL and/or DL PDCP packet duplication for a bearer may be caused. An indication of UL and/or DL PDCP packet duplication deactivation may, as part of step 2808, be sent to the CU-CP node and/or to the DU.

In step 2809, the cessation of sending duplicated DL PDCP packets may be caused. The method may end. Alternatively, and as shown with a broken line, the method may begin again by repeating step 2801.

Figure 29:
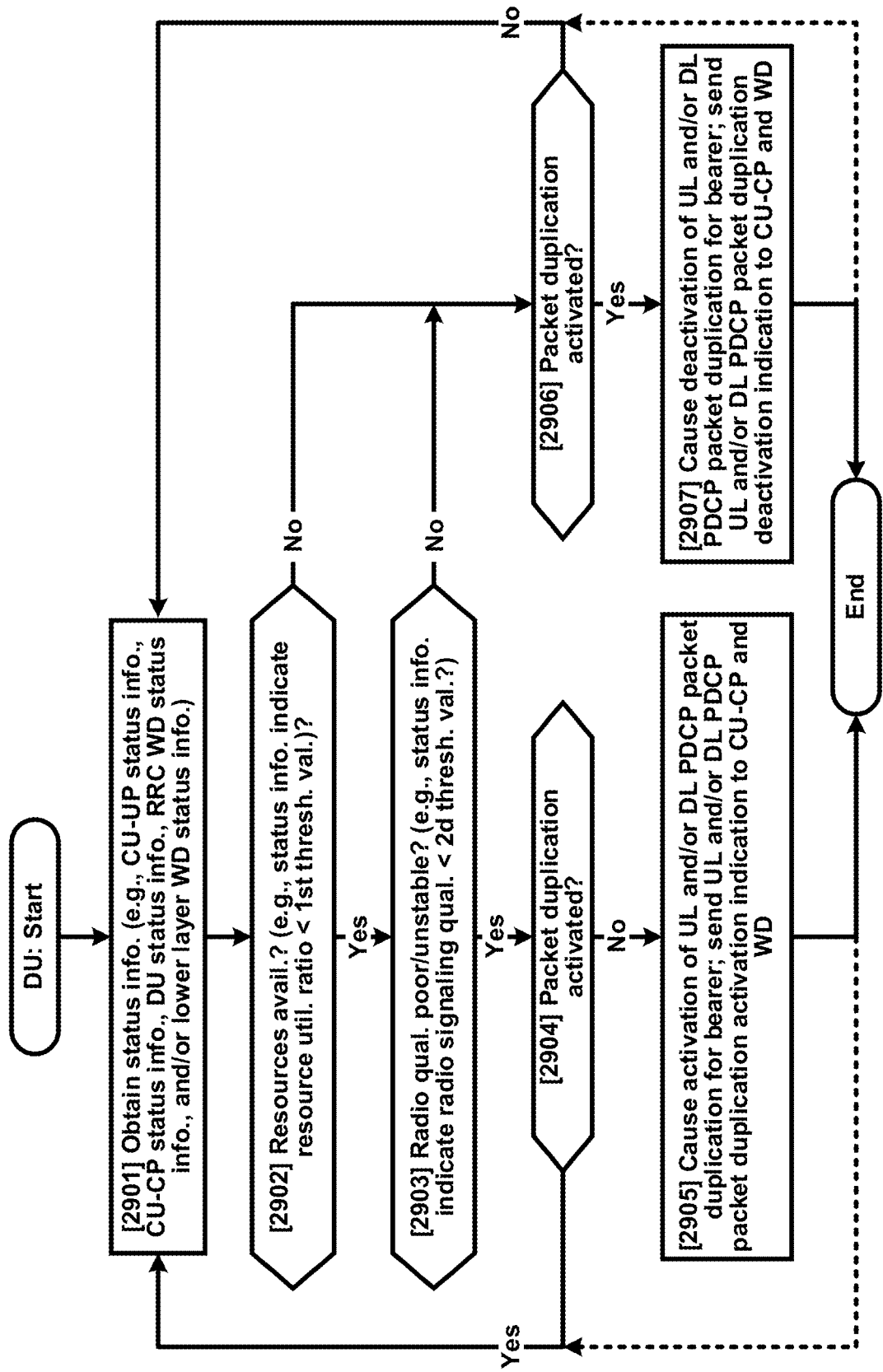
FIG. 29 shows an example method for activating and/or deactivating packet duplication.

FIG. 29 shows an example method that may, for example, be performed by a DU (e.g., the DU 1703). Status information may be received in step 2901. The status information may, for example, comprise status information from self-monitoring (e.g., the status information 2314), status information (e.g., the status information 2307) for a CU-CP node (e.g., the CU-CP node 1701) and/or a CU-UP node (e.g., the CU-UP node 1702), RRC wireless device (e.g., UE) status information, lower layer wireless device (e.g., UE) status information, and/or other information.

In step 2902, a determination, regarding the availability of resources to support packet duplication, may be made. The determination may be based on one or more parts of the status information received in step 2901 and may comprise, for example, determining whether a resource utilization ratio satisfies (e.g., is lower than) a first threshold value. The first threshold value may be predetermined. The first threshold value for the method of FIG. 29 may be the same as, or different from, the first threshold value for the method of FIG. 27, and/or may be the same as, or different from, the first threshold value for the method of FIG. 28. If it is determined in step 2902 that resources to support packet duplication are not available (e.g., if the utilization ratio does not satisfy (e.g., is not lower than) the first threshold value), step 2906 (described below) may be performed. If it is determined in step 2902 that resources to support packet duplication are available (e.g., if the utilization ratio satisfies (e.g., is lower than) the first threshold value), step 2903 may be performed.

In step 2903, a determination, of whether radio signaling quality is sufficiently poor and/or unstable so as to indicate a benefit from PDCP packet duplication, may be made. The determination may be based on one or more parts of the status information received in step 2901 and may comprise, for example, determining if a radio quality satisfies (e.g., is lower than) a second threshold value. The second threshold value may be predetermined. The second threshold value for the method of FIG. 29 may be the same as, or different from, the second threshold value for the method of FIG. 27, and/or may be the same as, or different from, the second threshold value for the method of FIG. 28. If it is determined in step 2903 that radio signaling quality is not sufficiently poor and/or unstable so as to indicate a benefit from PDCP packet duplication (e.g., if the radio quality does not satisfy (e.g., is not lower than) the second threshold value), step 2906 may be performed. If it is determined in step 2903 that radio signaling quality is sufficiently poor and/or unstable so as to indicate a benefit from PDCP packet duplication (e.g., if the radio quality does satisfy (e.g., is lower than) the second threshold value), step 2904 may be performed.

In step 2904, a determination, of whether PDCP packet duplication is activated, may be made. If PDCP packet duplication is activated, step 2901 may be repeated. If PDCP packet duplication is not activated, step 2905 may be performed. In step 2905, activation of UL PDCP packet duplication and/or of DL PADCP packet duplication may be caused. An indication of UL and/or DL PDCP packet duplication activation may, as part of step 2905, be sent to the CU-CP node and/or to a wireless device (e.g., to the wireless device 1704). The method may end. Alternatively, and as shown with a broken line, the method may begin again by repeating step 2901.

If it is determined in step 2903 that radio signaling quality is not sufficiently poor and/or unstable so as to indicate a benefit from PDCP packet duplication, step 2906 may be performed. In step 2906, a determination, of whether PDCP packet duplication is activated, may be made. If PDCP packet duplication is not activated, step 2901 may be repeated. If PDCP packet duplication is activated, step 2907 may be performed. In step 2907, deactivation of UL and/or DL PDCP packet duplication for a bearer may be caused. An indication of UL and/or DL PDCP packet duplication deactivation may, as part of step 2907, be sent to the CU-CP node and/or to the wireless device. The method may end. Alternatively, and as shown with a broken line, the method may begin again by repeating step 2901.

Figure 30:
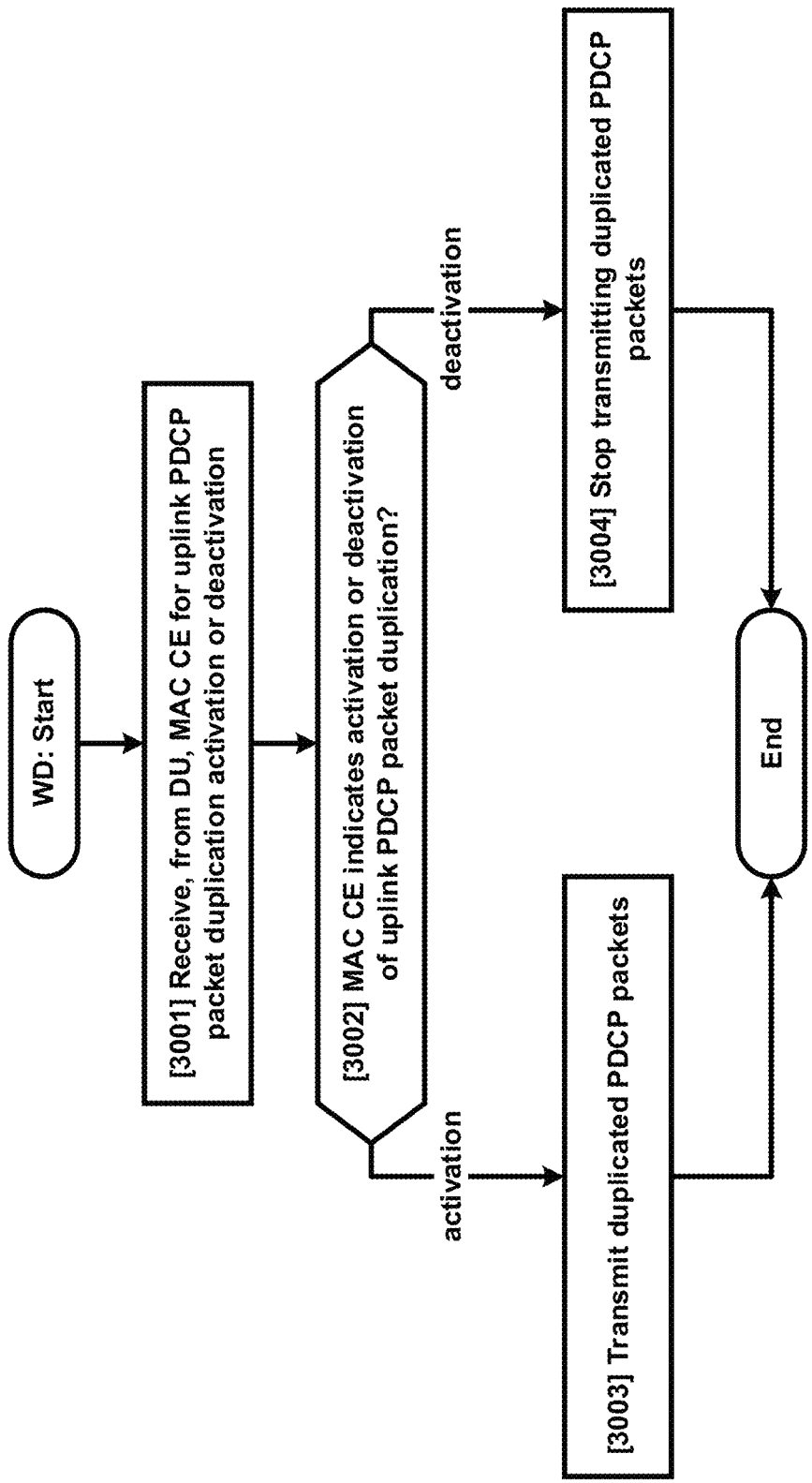
FIG. 30 shows an example method for operating a wireless device.

FIG. 30 shows an example method that may, for example, be performed by a wireless device (e.g., the wireless device 1704). In step 3001, a MAC CE indicating activation or deactivation of UL PDCP packet duplication may be received. The MAC CE may be received, for example, from a DU (e.g., the DU 1703). In step 3002, a determination, or whether the MAC CE indicates activation of PDCP packet duplication or deactivation of PDCP packet duplication, may be made. If the MAC CE indicates activation of PDCP packet duplication, and as shown in step 3003, the start of sending duplicated PDCP packets may be caused. If the MAC CE indicates deactivation of PDCP packet duplication, and as shown in step 3004, cessation of sending duplicated PDCP packets may be caused.

PDCP packet duplication may be activated (e.g., caused to be activated) by one of the CU-CP 1701, the CU-UP 1702, or the DU 1703, and may subsequently be deactivated (e.g., caused to be deactivated) by a different one of the CU-CP 1701, the CU-UP 1702, or the DU 1703. PDCP packet duplication may be activated (e.g., caused to be activated) by one of the CU-CP 1701, the CU-UP 1702, or the DU 1703, and at a different time may be activated (e.g., caused to be activated) by a different one of the CU-CP 1701, the CU-UP 1702, or the DU 1703. PDCP packet duplication may be deactivated (e.g., caused to be deactivated) by one of the CU-CP 1701, the CU-UP 1702, or the DU 1703, and at a different time may be deactivated (e.g., caused to be deactivated) by a different one of the CU-CP 1701, the CU-UP 1702, or the DU 1703.

A CU-CP (e.g., a CU-CP node) may transmit, to a CU-UP (e.g., a CU-UP node), a first message indicating a first bearer configuration request for a wireless device. The first message may comprise a first bearer identifier of a first bearer and/or a PDCP configuration parameter indicating that PDCP packet duplication is configured for the first bearer. The CU-CP may receive, from the CU-UP, a second message indicating that the PDCP packet duplication of the first bearer is set up (e.g., configured). The CU-UP may send (e.g., transmit), to the CU-UP, a third message indicating a first activation or a first deactivation of the PDCP packet duplication of the first bearer. The second message may comprise UL tunnel information of the first bearer. The UL tunnel information may comprise a first UL TEID and/or a second UL TEID.

The CU-CP may send (e.g., transmit), to a DU and based on (e.g., in response to) receiving the second message, a fourth message indicating a second bearer configuration request for the first bearer of the wireless device. The fourth message may comprise the UL tunnel information of the first bearer. The CU-CP may receive, from the DU and based on (e.g., in response to) the fourth message, a fifth message comprising DL tunnel information of the first bearer. The DL tunnel information may comprise a first DL TEID and/or a second DL TEID. The CU-CP may send (e.g., transmit), to the CU-UP, a sixth message comprising the DL tunnel information for the first bearer. A first base station may comprise the CU-CP, the CU-UP, and/or the DU.

The DU may, for example, send (e.g., transmit), to the wireless device, a MAC CE indicating a second activation or a second deactivation of the PDCP packet duplication. The second activation and the second deactivation may be associated with an UL PDCP packet duplication. The DU may receive, from the wireless device, duplicated PDCP packets of the first bearer if the MAC CE indicates the second activation. Based on (e.g., in response to) the third message: if the third message indicates the first activation, the CU-CP may transmit duplicated PDCP packets of the first bearer; and/or if the third message indicates the first deactivation, the CU-CP may stop transmitting duplicated PDCP packets of the first bearer. The CU-UP may, for example, discard duplicated PDCP packets of the first bearer received from the wireless device if the third message indicates the first activation. The first activation and/or the first deactivation may, for example, be associated with at least one of an UL PDCP packet duplication and/or a DL PDCP packet duplication.

The first message may, for example, further indicate and/or comprise an IE indicating a third activation or a third deactivation of the PDCP packet duplication. The third activation and the third deactivation may be associated with at least one of an UL PDCP packet duplication and/or a DL PDCP packet duplication. The CU-CP may, for example send (e.g., transmit), to the wireless device, an RRC message indicating that the PDCP packet duplication for the first bearer is configured. The wireless device may, for example, discard duplicated PDCP packets of the first bearer received from the CU-UP (and/or the DU) if the third message indicates the first activation. The first activation or the first deactivation may, for example, be based on at least one of: first status information received from a DU, the first status information comprising DU status information and/or lower layer wireless device status information; and/or second status information received from the wireless device, the second status information comprising RRC wireless device status information.

A CU-CP may, for example, send (e.g., transmit), to a CU-UP, a first message indicating a first bearer configuration request for a wireless device. The first message may comprise a first bearer identifier of a first bearer and/or a PDCP configuration parameter indicating that PDCP packet duplication is configured for the first bearer. The CU-CP may receive, from the CU-UP, a second message indicating that the PDCP packet duplication of the first bearer is set up (e.g., configured). The CU-CP may receive, from the CU-UP, a third message indicating a fourth activation or a fourth deactivation of the PDCP packet duplication of the first bearer. The CU-UP may initiate the fourth activation and the fourth deactivation. The fourth activation and the fourth deactivation may, for example, be associated with at least one of an UL PDCP packet duplication and/or a DL PDCP packet duplication.

Based on, for example, in response to, the third message: if the third message indicates the fourth activation, the CU-UP may transmit duplicated PDCP packets of the first bearer; and/or if the third message indicates the fourth deactivation, the CU-UP may stop transmitting duplicated PDCP packets of the first bearer. The CU-UP may, for example, discard duplicated PDCP packets of the first bearer received from the wireless device if the third message indicates the fourth activation. The wireless device may, for example, discard duplicated PDCP packets of the first bearer received from the CU-UP (and/or the DU) if the third message indicates the fourth activation.

The fourth activation or the fourth deactivation may be based on first status information received from a CU-CP. The first status information may comprise at least one of CU-CP status information, DU status information, RRC wireless device status information, and/or lower layer wireless device status information.

A method may comprise receiving, by a central unit user plane (CU-UP) node from a central unit control plane (CU-CP) node, one or more messages. The one or more messages may indicate: configuration of packet duplication for a bearer, and activation of the packet duplication. The method may comprise sending, by the CU-UP node and based on the one or more messages, packets for the bearer and duplicated versions of the packets. The one or more messages may comprise a configuration message indicating a bearer configuration request for a wireless device. The sending may comprise sending the packets and the duplicated versions of the packets, via a distributed unit of a base station, to a wireless device. The one or more messages may comprise logical channel information, for the bearer, comprising: a first logical channel identifier of a first logical channel for the packets, and a second logical channel identifier of a second logical channel for the duplicated versions of the packets. The method may comprise after receiving the one or more messages, sending, by the CU-UP node to the CU-CP node, one or more second messages comprising uplink tunnel information, for the bearer, comprising: a first uplink tunnel endpoint identifier for a first tunnel for uplink packets of the bearer, and a second uplink tunnel endpoint identifier for a second tunnel for duplicated uplink packets. The method may comprise after sending the one or more second messages, receiving, from the CU-CP node, a configuration update message indicating downlink tunnel information for the bearer. The method may comprise receiving, by the CU-UP node from the CU-CP node, one or more messages indicating deactivation of the packet duplication; and based on the one or more messages indicating the deactivation, discontinuing the sending of the duplicated versions of the packets. The method may comprise based on status information associated with the CU-CP node, deactivating, by the CU-UP node, the packet duplication. The method may comprise based on status information associated with a distributed unit of a base station, deactivating, by the CU-UP node, the packet duplication. The method may comprise based on status information received by the CU-UP node, deactivating the packet duplication, wherein the status information may comprise indications of one or more of: a hardware load, a load of an N2 interface between the CU-UP node and a core network entity, a load of an F1 interface between the CU-UP node and a distributed unit of a base station, a composite available capacity group, or a network slice overload. The method may comprise deactivating, by the CU-UP node, the packet duplication; and sending, by the CU-UP node to the CU-CP node, one or more messages indicating the deactivation of the packet duplication. The method may comprise activating, by the CU-UP node and based on status information received by the CU-UP node, packet duplication, wherein the status information may comprise one or more of: status information associated with the CU-CP node, or status information associated with a distributed unit of a base station; and sending by the CU-UP node to the CU-CP node, one or more messages indicating the activation by the CU-UP node. The packet duplication may comprise packet data convergence protocol (PDCP) packet duplication.

A method may comprise receiving, by a central unit user plane (CU-UP) node from a central unit control plane (CU-CP) node, one or more messages indicating activation of packet duplication for a bearer. The method may comprise sending, by the CU-UP node and based on the one or more messages, packets for the bearer and duplicated versions of the packets. The method may comprise receiving, by the CU-UP node from the CU-CP node, one or more messages indicating deactivation of the packet duplication. The method may comprise based on the one or more messages indicating the deactivation, discontinuing the sending of the duplicated versions of the packets. The method may comprise determining, by the CU-UP node and based on status information received by the CU-UP node after a second activation of the packet duplication, to perform a second deactivation of the packet duplication, wherein the status information may comprise status information associated with one or more of the CU-CP node or a distributed unit (DU) of a base station. The method may comprise activating, by the CU-UP node, the packet duplication; and sending by the CU-UP node to the CU-CP node, one or more messages indicating the activation by the CU-UP node. The method may comprise based on additional status information received by the CU-UP node, activating, by the CU-UP node, packet duplication, wherein the additional status information may comprise one or more of: additional status information associated with the CU-CP node, or additional status information associated with a distributed unit (DU) of a base station.

A method may comprise based on status information received by a central unit user plane (CU-UP) node, activating, by the CU-UP node, packet duplication. The status information may comprise one or more of: status information associated with a central unit control plane (CU-CP) node, or status information associated with a distributed unit (DU). The method may comprise sending, by the CU-UP node to the CU-CP node, one or more messages indicating the activation. The method may comprise based on the activation, sending, via the DU and to a wireless device, packets and duplicated versions of the packets. The status information may comprise indications of one or more of: a hardware load, a load of an N2 interface between the CU-UP node and a core network entity, a load of an F1 interface between the CU-UP node and the DU, a composite available capacity group, or a network slice overload. The method may comprise deactivating, by the CU-UP node, the packet duplication; and sending, by the CU-UP node to the CU-CP node, one or more messages indicating the deactivation of the packet duplication.

A method may comprise receiving, by a central unit user plane from a central unit control plane, a configuration message indicating a bearer configuration request for a wireless device. The configuration message may comprise: a bearer identifier of a bearer; a packet data convergence protocol (PDCP) duplication parameter indicating that PDCP packet duplication is configured for the bearer; and a duplication activation parameter indicating that the PDCP packet duplication is activated. The method may comprise transmitting, by the central unit user plane to the central unit control plane, a response message for the configuration message. The method may comprise transmitting, by the central unit user plane to the wireless device and based on the duplication activation parameter, packets for the bearer and duplicated packets of the packets. The configuration message may comprise logical channel information of the bearer, and the logical channel information may comprise: a first logical channel identifier of a first logical channel for packets of the bearer; and a second logical channel identifier of a second logical channel for duplication of the packets. The response message may comprise uplink tunnel information of the bearer, and the uplink tunnel information may comprise: a first uplink tunnel endpoint identifier for a first tunnel for uplink packets of the bearer; and a second uplink tunnel endpoint identifier for a second tunnel for duplication of the uplink packets. The method may comprise transmitting, by the central unit control plane to a distributed unit and in response to receiving the response message, a second configuration message indicating a second bearer configuration request for the bearer of the wireless device, the second configuration message comprising the uplink tunnel information of the bearer. The method may comprise receiving, by the central unit control plane from the distributed unit and in response to the message, a second response message comprising downlink tunnel information of the bearer, and the downlink tunnel information may comprise: a first downlink tunnel endpoint identifier for the first tunnel; and a second downlink tunnel endpoint identifier for the second tunnel. The method may comprise transmitting, by the central unit control plane to the central unit user plane, a configuration update message comprising the downlink tunnel information for the bearer. A base station may comprise: the central unit control plane; the central unit user plane; and the distributed unit. The method may comprise transmitting, by the distributed unit to the wireless device, a medium access control element indicating a second activation or a second deactivation of the PDCP packet duplication, wherein the second activation and the second deactivation are for an uplink PDCP packet duplication. The method may comprise receiving, by the distributed unit from the wireless device, duplicated PDCP packets of the bearer if the medium access control element indicates the second activation. The method may comprise receiving, by the central unit user plane from the central unit control plane, a third configuration message comprising a duplication deactivation parameter indicating that the PDCP packet duplication is deactivated. The method may comprise stopping, by the central unit user plane, transmitting duplicated packets of packets for the bearer. The method may comprise receiving, by the central unit user plane from the central unit control plane, a fourth configuration message comprising a second duplication activation parameter indicating that the PDCP packet duplication is deactivated. The method may comprise transmitting, by the central unit user plane to the wireless device and based on the second duplication activation parameter, second packets for the bearer and second duplicated packets of the second packets. The method may comprise receiving, by the central unit user plane from the wireless device, uplink packets for the bearer and uplink duplicated packets of the uplink packets. The method may comprise discarding, by the central unit user plane, at least one of the uplink packets or the uplink duplicated packets. The method may comprise discarding, by the wireless device, at least one of the packets for the bearer or the duplicated packets of the packets. The method may comprise transmitting, by the central unit control plan to the wireless device, a radio resource control message indicating that the PDCP packet duplication for the bearer is configured. The central unit control plane may determine the activation of the PDCP packet duplication based on at least one of: first status information received from a distributed unit (and the first status information may comprise at least one of: distributed unit status information; or lower layer wireless device status information of the wireless device); or second status information received from the wireless device (the second status information may comprise radio resource control wireless device status information). The distributed unit status information may comprise at least one of: a hardware load indicator; a F1 interface load indicator indicating load information of an interface between the central unit user plane and the distributed unit; a radio resource status information; a composite available capacity group; or a network slice overload indicator of the distributed unit. The lower layer wireless device status information may comprise at least one of: uplink radio signaling quality information; or downlink radio signaling quality information. The uplink radio signaling quality information may comprise at least one of: one or more sounding reference signals received from the wireless device; hybrid automatic repeat request (HARQ) retransmission number information; or buffer status information of one or more logical channels. The downlink radio signaling quality information may comprise a channel status information report received from the wireless device. The channel status information may comprise at least one of: a reference signal received power; or a reference signal received quality. The radio resource control wireless device status information comprises at least one of: a reference signal received power; a reference signal received quality; battery status information; a number of radio link control (RLC) retransmissions; a transport block transmission failure rate; a random access failure rate; a configured resource access failure rate; or PDCP delay information. The method may comprise determining, by the central unit user plane, deactivation of the PDCP packet duplication. The method may comprise stopping, by the central unit user plane and in response to determining the deactivation, transmitting duplicated packets of packets for the bearer. The determining the deactivation may be based on status information of the central unit control plane, the status information comprising at least one of: a hardware load; an N2 interface load of an N2 interface between the central unit user plane and a core network entity; an F1 interface load of an F1 interface between the central unit user plane and a distributed unit; a composite available capacity group; or a network slice overload. The method may comprise transmitting, by the central unit user plane to central unit control plane, a configuration update request message indicating the deactivation of the PDCP packet duplication.

A method may comprise sending, by a central unit control plane to a central unit user plane, a configuration message indicating a first bearer configuration request for a wireless device, and the configuration message may comprise: a bearer identifier of a bearer; and a packet data convergence protocol (PDCP) configuration parameter indicating that PDCP packet duplication is configured for the bearer. The method may comprise receiving, by the central unit control plane from a base station distributed unit, distributed unit status information. The method may comprise determining, by the central unit control plane, to activate the PDCP packet duplication based on the distributed unit status information. The method may comprise sending, by the central unit control plane to the central unit user plane, a configuration update message indicating activation of the PDCP packet duplication of the bearer.

A method may comprise determining, by a central unit control plane, to activate a packet data convergence protocol (PDCP) packet duplication for a bearer of a wireless device. The method may comprise sending, by a central unit control plane to a central unit user plane, a configuration message indicating a bearer configuration request for the wireless device. The configuration message may comprise: a bearer identifier of a bearer; a PDCP duplication parameter indicating that PDCP packet duplication is configured for the bearer; and a duplication activation parameter indicating that the PDCP packet duplication is activated. The method may comprise receiving, by the central unit control plane from a base station distributed unit, a response message for the configuration message.

A method may comprise receiving, by a central unit control plane from a core network node, a context setup message requesting configuration of a session for a wireless device. The method may comprise determining, by the central unit control plane: to configure packet data convergence protocol (PDCP) packet duplication for a bearer of the session; and to activate the PDCP duplication based on distributed unit status information. The method may comprise sending, by a central unit control plane to a central unit user plane, a configuration message indicating a bearer configuration request for the wireless device. The configuration message may comprise: a bearer identifier of the bearer; and PDCP configuration parameters. The PDCP configuration parameters may indicate that: the PDCP packet duplication is configured for the bearer; and the PDCP packet duplication is activated for the bearer. The method may comprise receiving, by the central unit control plane from a base station distributed unit, a response message for the configuration message. The response message may indicate that the PDCP configuration parameters are configured.

A method may comprise transmitting, by a central unit control plane to a central unit user plane, a first message indicating a bearer configuration request for a wireless device. The first message may comprise: a bearer identifier of a bearer; and a packet data convergence protocol (PDCP) configuration parameter indicating that PDCP packet duplication is configured for the bearer. The method may comprise receiving, by the central unit control plane from the central unit user plane, a second message indicating that the PDCP packet duplication of the bearer is set up. The method may comprise receiving, by the central unit control plane from the central unit user plane, a third message indicating an activation or a deactivation of the PDCP packet duplication of the bearer. The activation and the deactivation may be initiated by the central unit user plane. The activation and the deactivation may be associated with at least one of: an uplink PDCP packet duplication; or a downlink PDCP packet duplication. The method may comprise, in response to the third message: if the third message indicates the activation, transmitting, by the central unit user plane, duplicated PDCP packets of the bearer; and if the third message indicates the deactivation, stopping, by the central unit user plane, transmitting duplicated PDCP packets of the bearer. The method may comprise discarding, by the central unit user plane, duplicated PDCP packets of the bearer received from the wireless device if the third message indicates the activation. The method may comprise discarding, by the wireless device, at least one of PDCP packets of the bearer or duplicated PDCP packets of the PDCP packets received from the central unit user plane. The activation or the deactivation may be based on at least one of status information received from a central unit control plane. The status information may comprise at least one of: central unit control plane status information; distributed unit status information; radio resource control wireless device status information; or lower layer wireless device status information.

Figure 31:
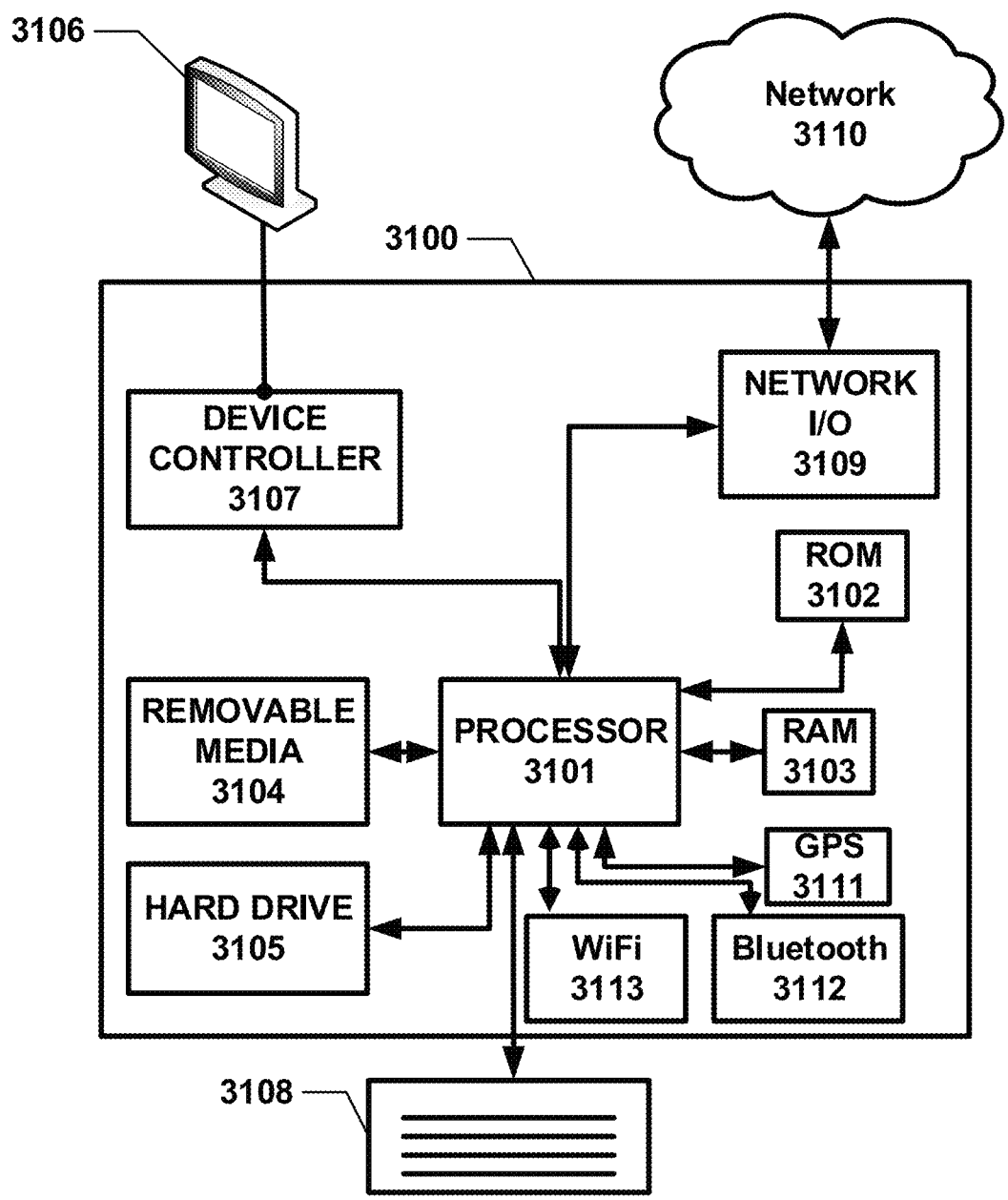
FIG. 31 shows example elements of a computing device that may be used to implement any of the various devices described herein.

FIG. 31 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3100 may include one or more processors 3101, which may execute instructions stored in the random access memory (RAM) 3103, the removable media 3104 (such as a Universal Serial Bus (USB) drive, compact disk (CD) or digital versatile disk (DVD), or floppy disk drive), or any other desired storage medium. Instructions may also be stored in an attached (or internal) hard drive 3105. The computing device 3100 may also include a security processor (not shown), which may execute instructions of one or more computer programs to monitor the processes executing on the processor 3101 and any process that requests access to any hardware and/or software components of the computing device 3100 (e.g., ROM 3102, RAM 3103, the removable media 3104, the hard drive 3105, the device controller 3107, a network interface 3109, a GPS 3111, a Bluetooth interface 3112, a WiFi interface 3113, etc.). The computing device 3100 may include one or more output devices, such as the display 3106 (e.g., a screen, a display device, a monitor, a television, etc.), and may include one or more output device controllers 3107, such as a video processor. There may also be one or more user input devices 3108, such as a remote control, keyboard, mouse, touch screen, microphone, etc. The computing device 3100 may also include one or more network interfaces, such as a network interface 3109, which may be a wired interface, a wireless interface, or a combination of the two. The network interface 3109 may provide an interface for the computing device 3100 to communicate with a network 3110 (e.g., a RAN, or any other network). The network interface 3109 may include a modem (e.g., a cable modem), and the external network 3110 may include communication links, an external network, an in-home network, a provider's wireless, coaxial, fiber, or hybrid fiber/coaxial distribution system (e.g., a DOCSIS network), or any other desired network. Additionally, the computing device 3100 may include a location-detecting device, such as a global positioning system (GPS) microprocessor 3111, which may be configured to receive and process global positioning signals and determine, with possible assistance from an external server and antenna, a geographic position of the computing device 3100.

The example in FIG. 31 may be a hardware configuration, although the components shown may be implemented as software as well. Modifications may be made to add, remove, combine, divide, etc. components of the computing device 3100 as desired. Additionally, the components may be implemented using basic computing devices and components, and the same components (e.g., processor 3101, ROM storage 3102, display 3106, etc.) may be used to implement any of the other computing devices and components described herein. For example, the various components described herein may be implemented using computing devices having components such as a processor executing computer-executable instructions stored on a computer-readable medium, as shown in FIG. 31. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
    sending, by a central unit control plane (CU-CP) node to a central unit user plane (CU-UP) node, a message comprising:
        a first field indicating configuration of packet duplication for a bearer associated with a wireless device, and
        a second field indicating a packet duplication state, wherein the packet duplication state is one of activated or deactivated; and
    receiving, by the CU-CP node from the CU-UP node and based on the message, a response.

2. The method of claim 1, wherein the message further comprises a bearer configuration request for the wireless device.

3. The method of claim 1, wherein the message further comprises logical channel information for the bearer, the logical channel information comprising:
    a first logical channel identifier of a first logical channel for at least one packet, and
    a second logical channel identifier of a second logical channel for at least one duplicated version of the at least one packet.

4. The method of claim 1, further comprising:
after sending the message, receiving, by the CU-CP node from the CU-UP node, at least one second message comprising uplink tunnel information for the bearer, the uplink tunnel information comprising:
a first uplink tunnel endpoint identifier for a first tunnel for at least one uplink packet, and
a second uplink tunnel endpoint identifier for a second tunnel for at least one duplicated uplink packet.

5. The method of claim 4, further comprising:
after receiving the at least one second message, sending, to the CU-UP node, a configuration update message indicating downlink tunnel information for the bearer.

6. The method of claim 1, further comprising:
sending, to the CU-UP node, status information comprising an indication of at least one of:
a hardware load,
a load of an N2 interface between the CU-UP node and a core network entity,
a load of an F1 interface between the CU-UP node and at least one distributed unit (DU) node,
status information associated with the CU-CP node,
status information associated with the at least one DU node,
a composite available capacity group, or
a network slice overload.

7. The method of claim 1, wherein the response comprises an indication of an activation or a deactivation of the packet duplication.

8. The method of claim 1, wherein the configuration of the packet duplication comprises configuration of packet data convergence protocol (PDCP) packet duplication.

9. The method of claim 1, wherein the packet duplication state is activated.

10. A central unit control plane (CU-CP) node comprising:
one or more processors; and
memory storing instructions that, when executed by the one or more processors, configure the CU-CP node to:
send, to a central unit user plane (CU-UP) node, a message comprising:
a first field indicating configuration of packet duplication for a bearer associated with a wireless device, and
a second field indicating a packet duplication state, wherein the packet duplication state is one of activated or deactivated; and
receive, from the CU-UP node and based on the message, a response.

11. The CU-CP node of claim 10, wherein the message further comprises a bearer configuration request for the wireless device.

12. The CU-CP node of claim 10, wherein the message further comprises logical channel information for the bearer, the logical channel information comprising:
a first logical channel identifier of a first logical channel for at least one packet, and
a second logical channel identifier of a second logical channel for at least one duplicated version of the at least one packet.

13. The CU-CP node of claim 10, wherein the instructions, when executed by the one or more processors, further configure the CU-CP node to:
after sending the message, receive, from the CU-UP node, at least one second message comprising uplink tunnel information for the bearer, the uplink tunnel information comprising:
a first uplink tunnel endpoint identifier for a first tunnel for at least one uplink packet, and
a second uplink tunnel endpoint identifier for a second tunnel for at least one duplicated uplink packet.

14. The CU-CP node of claim 13, wherein the instructions, when executed by the one or more processors, further configure the CU-CP node to:
after receiving the at least one second message, send, to the CU-UP node, a configuration update message indicating downlink tunnel information for the bearer.

15. The CU-CP node of claim 10, wherein the instructions, when executed by the one or more processors, further configure the CU-CP node to:
send, to the CU-UP node, status information comprising an indication of at least one of:
a hardware load,
a load of an N2 interface between the CU-UP node and a core network entity,
a load of an F1 interface between the CU-UP node and at least one distributed unit (DU) node,
status information associated with the CU-CP node,
status information associated with the at least one DU node,
a composite available capacity group, or
a network slice overload.

16. The CU-CP node of claim 10, wherein the response comprises an indication of an activation or a deactivation of the packet duplication.

17. The CU-CP node of claim 10, wherein the configuration of the packet duplication comprises configuration of packet data convergence protocol (PDCP) packet duplication.

18. The CU-CP node of claim 10, wherein the packet duplication state is activated.

19. A non-transitory computer-readable medium storing instructions that, when executed, cause:
sending, by a central unit control plane (CU-CP) node to a central unit user plane (CU-UP) node, a message comprising:
a first field indicating configuration of packet duplication for a bearer associated with a wireless device, and
a second field indicating a packet duplication state, wherein the packet duplication state is one of activated or deactivated; and
receiving, by the CU-CP node from the CU-UP node and based on the message, a response.

20. The non-transitory computer-readable medium of claim 19, wherein the message further comprises a bearer configuration request for the wireless device.

21. The non-transitory computer-readable medium of claim 19, wherein the message further comprises logical channel information for the bearer, the logical channel information comprising:
a first logical channel identifier of a first logical channel for at least one packet, and
a second logical channel identifier of a second logical channel for at least one duplicated version of the at least one packet.

22. The non-transitory computer-readable medium of claim 19, wherein the instructions, when executed, further cause:
after sending the message, receiving, by the CU-CP node from the CU-UP node, at least one second message comprising uplink tunnel information for the bearer, the uplink tunnel information comprising:

a first uplink tunnel endpoint identifier for a first tunnel for at least one uplink packet, and
a second uplink tunnel endpoint identifier for a second tunnel for at least one duplicated uplink packet.

23. The non-transitory computer-readable medium of claim 22, wherein the instructions, when executed, further cause:
after receiving the at least one second message, sending, to the CU-UP node, a configuration update message indicating downlink tunnel information for the bearer.

24. The non-transitory computer-readable medium of claim 19, wherein the instructions, when executed, further cause:
sending, to the CU-UP node, status information comprising an indication of at least one of:
a hardware load,
a load of an N2 interface between the CU-UP node and a core network entity,
a load of an F1 interface between the CU-UP node and at least one distributed unit (DU) node,
status information associated with the CU-CP node,
status information associated with the at least one DU node,
a composite available capacity group, or
a network slice overload.

25. The non-transitory computer-readable medium of claim 19, wherein the response comprises an indication of an activation or a deactivation of the packet duplication.

26. The non-transitory computer-readable medium of claim 19, wherein the configuration of the packet duplication comprises configuration of packet data convergence protocol (PDCP) packet duplication.

27. The non-transitory computer-readable medium of claim 19, wherein the packet duplication state is activated.

28. A system comprising:
a central unit control plane (CU-CP) node; and
a central unit user plane (CU-UP) node,
wherein the CU-CP node is configured to:
send, to the CU-UP node, a message comprising:
a first field indicating configuration of packet duplication for a bearer associated with a wireless device, and
a second field indicating a packet duplication state, wherein the packet duplication state is one of activated or deactivated, and
wherein the CU-UP node is configured to:
send, to the CU-CP node and based on the message, a response.

29. The system of claim 28, wherein the message further comprises a bearer configuration request for the wireless device.

30. The system of claim 28, wherein the message further comprises logical channel information for the bearer, the logical channel information comprising:
a first logical channel identifier of a first logical channel for at least one packet, and
a second logical channel identifier of a second logical channel for at least one duplicated version of the at least one packet.

31. The system of claim 28, wherein the CU-UP node is further configured to:
after the message is sent, send, to the CU-CP node, at least one second message comprising uplink tunnel information for the bearer, the uplink tunnel information comprising:
a first uplink tunnel endpoint identifier for a first tunnel for at least one uplink packet, and
a second uplink tunnel endpoint identifier for a second tunnel for at least one duplicated uplink packet.

32. The system of claim 31, wherein the CU-CP node is further configured to:
after receiving the at least one second message, send, to the CU-UP node, a configuration update message indicating downlink tunnel information for the bearer.

33. The system of claim 28, wherein the CU-CP node is further configured to:
send, to the CU-UP node, status information comprising an indication of at least one of:
a hardware load,
a load of an N2 interface between the CU-UP node and a core network entity,
a load of an F1 interface between the CU-UP node and at least one distributed unit (DU) node,
status information associated with the CU-CP node,
status information associated with the at least one DU node,
a composite available capacity group, or
a network slice overload.

34. The system of claim 28, wherein the response comprises an indication of an activation or a deactivation of the packet duplication.

35. The system of claim 28, wherein the configuration of the packet duplication comprises configuration of packet data convergence protocol (PDCP) packet duplication.

36. The system of claim 28, wherein the packet duplication state is activated.

* * * * *